US012565586B2

(12) United States Patent
Enoki et al.

(10) Patent No.: US 12,565,586 B2
(45) Date of Patent: Mar. 3, 2026

(54) SILOXANE POLYMER, SILOXANE POLYMER COMPOSITION, AND MOLDED ARTICLE

(71) Applicant: JNC CORPORATION, Tokyo (JP)

(72) Inventors: Nobuo Enoki, Chiba (JP); Kazuya Suwa, Chiba (JP); Ayaka Kiya, Chiba (JP); Mikio Yamahiro, Chiba (JP); Takeshi Matsushita, Chiba (JP); Taro Ishikawa, Chiba (JP); Hisao Oikawa, Chiba (JP)

(73) Assignee: JNC CORPORATION, Tokyo (JP)

( * ) Notice: Subject to any disclaimer, the term of this patent is extended or adjusted under 35 U.S.C. 154(b) by 515 days.

(21) Appl. No.: 18/016,859

(22) PCT Filed: Jul. 29, 2021

(86) PCT No.: PCT/JP2021/028078
§ 371 (c)(1),
(2) Date: Jan. 18, 2023

(87) PCT Pub. No.: WO2022/030354
PCT Pub. Date: Feb. 10, 2022

(65) Prior Publication Data

US 2023/0295427 A1 Sep. 21, 2023

(30) Foreign Application Priority Data

Aug. 6, 2020 (JP) ................................ 2020-133718

(51) Int. Cl.
*C08L 83/04* (2006.01)
*C08G 77/385* (2006.01)
(Continued)

(52) U.S. Cl.
CPC ............ *C08L 83/04* (2013.01); *C08G 77/385* (2013.01); *C08G 77/44* (2013.01); *C08L 83/10* (2013.01);
(Continued)

(58) Field of Classification Search
None
See application file for complete search history.

(56) References Cited

U.S. PATENT DOCUMENTS

2013/0096249 A1 4/2013 Kawabata et al.
2015/0065643 A1 3/2015 Kawabata et al.

FOREIGN PATENT DOCUMENTS

CN 105237775 1/2016
JP 2004004612 1/2004
(Continued)

OTHER PUBLICATIONS

"Search Report of Europe Counterpart Application", issued on Jan. 3, 2024, p. 1-p. 6.
(Continued)

*Primary Examiner* — Eli D. Strah
(74) *Attorney, Agent, or Firm* — JCIPRNET

(57) ABSTRACT

A siloxane polymer contains a silsesquioxane unit and a linear siloxane unit in its main chain and has a cage-type silsesquioxane structure in its side chain. A highly transparent and flexible film having a small linear thermal expansion coefficient is produced by utilizing the cohesion force (physical crosslinking) of the cage-type silsesquioxane in the side chain. The siloxane polymer has repeating units respectively represented by formulae (1) and (4), and has terminal groups respectively represented by formulae (5L) and (5R) at its right and left terminals, wherein A represents a structure shown below.

(1)

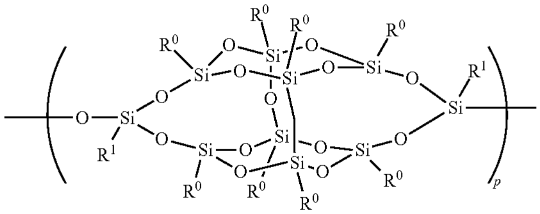

(4)

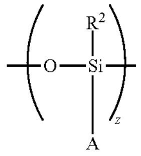

(5L)

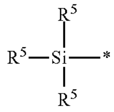

(5R)

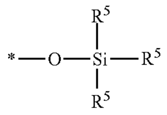

A

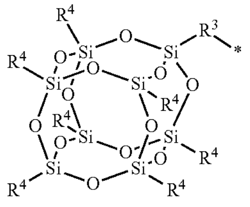

19 Claims, No Drawings

(51) Int. Cl.
*C08G 77/44* (2006.01)
*C08L 83/10* (2006.01)
*C08G 77/24* (2006.01)

(52) U.S. Cl.
CPC .......... *C08G 77/24* (2013.01); *C08L 2201/10* (2013.01); *C08L 2203/16* (2013.01); *C08L 2203/20* (2013.01)

(56) References Cited

FOREIGN PATENT DOCUMENTS

| | | | | |
|---|---|---|---|---|
| JP | 2006022207 | | 1/2006 | |
| JP | 2006265514 | | 10/2006 | |
| JP | 2008280420 | | 11/2008 | |
| JP | 2010116462 | | 5/2010 | |
| JP | 2010116462 | A * | 5/2010 | |
| JP | 2010116464 | | 5/2010 | |
| JP | 2010120901 | | 6/2010 | |
| JP | 2017014320 | | 1/2017 | |
| WO | 2005070988 | | 8/2005 | |
| WO | WO-2019163686 | A1 * | 8/2019 | ............. H01L 23/29 |

OTHER PUBLICATIONS

Takayuki Maegawa et al., "Synthesis and Polymerization of a para-Disubstituted T8-caged Hexaisobutyl-POSS Monomer," Chemistry Letters, Jun. 2014, pp. 1532-1534.
T. Maegawa et al., "Synthesis and properties of polyimides containinghexaisobutyl-substituted T8 cages in their main chains," RSC Advances, Mar. 2016, pp. 31751-31757.
Shunichi Fujii et al., "Beads-on-String-Shaped Poly(azomethine) Applicable for Solution Processing of Bilayer Devices Using a Same Solvent" submit with English abstract only, ACS Macro Letters, May 2018, pp. 1-1.
Takayuki Maegawa et al., "para-Bisvinylhexaisobutyl-substituted T8 caged monomer: synthesis and hydrosilylation polymerization," Polymer Chemistry, Oct. 2015, pp. 1-6.
Shouming Wu et al., "Synthesis and Characterization of Semiaromatic Polyimides Containing POSS in Main Chain Derived from Double-Decker-Shaped Silsesquioxane," Macromolecules, Jul. 2007, pp. 5698-5705.
Shouming Wu et al., "Synthesis and Characterization of Organosoluble Aromatic Polyimides Containing POSS in Main Chain Derived from Double-Decker-Shaped Silsesquioxane," Macromolecules, Apr. 2008, pp. 3481-3487.
Md. Asadul Hoque et al., "Polysiloxanes with Periodically Distributed Isomeric Double-Decker Silsesquioxane in the Main Chain," Macromolecules, Apr. 2009, pp. 3309-3315.
Marie Yoshimatsu et al., "Necklace-shaped Dimethylsiloxane Polymers Bearing a Polyhedral Oligomeric Silsesquioxane Cage Prepared by Polycondensation and Ring-opening Polymerization," Chemistry Letters, May 2012, pp. 622-624.
Naohiro Katsuta et al., "Necklace-shaped dimethylsiloxane polymers bearing polyhedral oligomeric silsesquioxane cages with alternating length chains," Polymer, Aug. 2017, pp. 8-14.
Rapheepraew Sodkhomkhum et al., "Synthesis of poly(siloxane/double-decker silsesquioxane) via dehydrocarbonative condensation reaction and its functionalization," Polymer, Jan. 2016, pp. 113-119.
Wei-Cheng Chen et al., "Ortho-Imide and Allyl Groups Effect on Highly Thermally Stable Polybenzoxazine/Double-Decker-Shaped Polyhedral Silsesquioxane Hybrids," Macromolecules, Nov. 2018, pp. 9602-9612.
Kun Wei et al., "Organic-inorganic polyurethanes with 3, 13-dihydroxypropyloctaphenyl double-decker silsesquioxane chain extender," Polymer Chemistry, Dec. 2012, pp. 1491-1501.
Beata Dudziec et al., "Double-decker Silsesquioxanes: Current Chemistry and Applications," Current Organic Chemistry, Dec. 2015, pp. 2794-2813.
Mingyue Wang et al., "Progress in the Synthesis of Bifunctionalized Polyhedral Oligomeric Silsesquioxane," Polymers, Dec. 2019, pp. 1-20.
"International Search Report (Form PCT/ISA/210) of PCT/JP2021/028078," mailed on Oct. 5, 2021, with English translation thereof, pp. 1-4.

* cited by examiner

SILOXANE POLYMER, SILOXANE POLYMER COMPOSITION, AND MOLDED ARTICLE

CROSS-REFERENCE TO RELATED APPLICATION

This application is a 371 application of the International PCT application serial no. PCT/JP2021/028078, filed on Jul. 29, 2021, which claims priority benefits of Japanese Patent Application No. 2020-133718, filed on Aug. 6, 2020. The entirety of each of the above-mentioned patent applications is hereby incorporated by reference herein and made a part of this specification.

TECHNICAL FIELD

This invention relates to a novel siloxane polymer in which a cage-type silsesquioxane is introduced into the side chain of a siloxane polymer composed of a double decker type silsesquioxane and a chain-like siloxane, which is one cage-type silsesquioxane, a siloxane polymer composition containing the same, and a molded article. In addition, this invention relates to a siloxane polymer compound that functions as an intermediate for producing the siloxane polymer.

BACKGROUND ART

Cage-type silsesquioxanes and double decker type silsesquioxanes, which are obtained by hydrolyzing and condensing trialkoxysilanes and trichlorosilanes, have rigid inorganic frameworks similar to basic constituent units of silica composed of Si—O bonds, and have structures in which organic groups are bonded to respective silicon atoms. In addition, organic groups (reactive groups and non-reactive groups) bonded to silicon atoms can be selected according to the purpose such as improvement in affinity with various polymer materials and resin modification according to the reaction, and thus it has become an attractive research subject in the organic-inorganic hybrid field.

Polymers containing a cage-type silsesquioxane framework in the main chain can significantly improve heat resistance, transparency, hydrophobicity and the like which could not be achieved with organic polymers alone, and a polyimide type (refer to Non-Patent Literature 1 and 2), a polyazomethine type (refer to Non-Patent Literature 3), a polysiloxane type (refer to Non-Patent Literature 4) and the like are known.

Many polymers containing a double decker type silsesquioxane framework in the main chain, which is one cage-type silsesquioxane, such as a polyimide type (refer to Non-Patent Literature 5 and 6), a polysiloxane type (refer to Patent Literature 1 to 5 and Non-Patent Literature 7 to 10), a polybenzoxazine type (refer to Non-Patent Literature 11), and a polyurethane type (refer to Non-Patent Literature 12) are known (refer to Non-Patent Literature 13 and 14). In particular, in the polysiloxane type, a crosslinkable functional group is introduced into the molecular structure and chemical crosslinking is performed with a crosslinking agent, and thus a molded article having excellent transparency and heat resistance has been developed (refer to Patent Literature 3 to 5).

CITATION LIST

Patent Literature

Patent Literature 1: Japanese Patent Laid-Open No. 2010-120901
Patent Literature 2: Japanese Patent Laid-Open No. 2006-22207
Patent Literature 3: Japanese Patent Laid-Open No. 2008-280420
Patent Literature 4: Japanese Patent Laid-Open No. 2010-116464
Patent Literature 5: Japanese Patent Laid-Open No. 2010-116462

Non-Patent Literature

Non-Patent Literature 1: *Chemistry Letters* 2014, 43, 1532-1534
Non-Patent Literature 2: *RSC Advances* 2016, 6, 31751-31757
Non-Patent Literature 3: *ACS Macro Letters* 2018, 7, 641-645
Non-Patent Literature 4: *Polymer Chemistry* 2015, 6, 7500-7504
Non-Patent Literature 5: *Macromolecules* 2007, 40, 5698-5705
Non-Patent Literature 6: *Macromolecules* 2008, 41, 3481-3487
Non-Patent Literature 7: *Macromolecules* 2009, 42, 3309-3315
Non-Patent Literature 8: *Chemistry Letters* 2012, 41, 622-624
Non-Patent Literature 9: *Polymer* 2017, 127, 8-14
Non-Patent Literature 10: *Polymer* 2016, 86, 113-119
Non-Patent Literature 11: *Macromolecules* 2018, 51, 9602-9612
Non-Patent Literature 12: *Polymer Chemistry* 2013, 4, 1491-1501
Non-Patent Literature 13: *Current Organic Chemistry* 2017, 21, 2794-2813
Non-Patent Literature 14: *Polymers* 2019, 11, 2098

SUMMARY OF INVENTION

Technical Problem

Flexible electronic devices in which a heat-resistant transparent plastic film is used as a substrate not only offer a larger degree of freedom in the shape and expand the range of device designs, but also have heat resistance in the device production process, and thus they are increasingly mounted in next-generation devices such as smartphones, tablets, and organic EL displays for which reduction in thickness and reduction in weight are required. Not only transparent polyimides, polyamides, and polyetheretherketones, but also polymers containing a cage-type silsesquioxane framework in the main chain are being vigorously developed, but many challenges such as improvement in transparency, heat resistance, coefficient of linear expansion, and smoothness still remain.

For example, in Non-Patent Literature 1 and 2, it is reported that a polyimide containing a cage-type silsesquioxane framework in the main chain was successfully synthesized and it exhibited excellent heat resistance (To: 483° C.), low linear expansion (81.3 ppm/K, room temperature to 350° C.), but the transmittance at 360 nm remained at a level of 80%, and slight yellow coloration was confirmed. In Non-Patent Literature 6, it is reported that a polyimide containing a double decker type silsesquioxane framework in the main chain, which is one cage-type silsesquioxane, was successfully synthesized, and it exhibited excellent heat resistance ($T_{d5}$: 500° C.), a low dielectric constant (1 MHz:

2.63, 100 KHz: 2.65) and a low water absorption (40 to 80° C.: <1%), but yellow coloration indicating the presence of a charge transfer complex was observed. In Patent Literature 3 to 5, a siloxane polymer containing a double decker type silsesquioxane framework in the main chain was successfully synthesized, and when a crosslinkable functional group was introduced into the molecular structure, and an intermolecular chemical crosslinking or crosslinking agent was used in combination, and thus a colorless and transparent molded article having excellent heat resistance ($T_{d5}$: 467 to 540° C.) was developed, but in addition to high transparency (haze: <1%, total light transmittance: >90%) required for flexible electronic devices, which requires time for reacting with an intermolecular chemical crosslinking or crosslinking agent, many technical challenges such as a low linear expansion (<200 ppm) still remain.

Solution to Problem

In order to produce a siloxane polymer containing a double decker type silsesquioxane framework in the main chain and having high transparency and low linear expansion, which does not require chemical crosslinking, the inventors conducted extensive studies regarding the measures, and as result, discovered that molecule movement is restricted and intermolecular cohesion force strengthened by introducing a cage-type silsesquioxane framework into the side chain of the siloxane polymer. That is, the above problems are solved by this invention.

Embodiments of this invention include the following configurations.

[1] is a siloxane polymer having repeating units represented by Formulae (1) and (4) and terminal groups represented by Formulae (5L) and (5R) at left and right terminals:

(1)

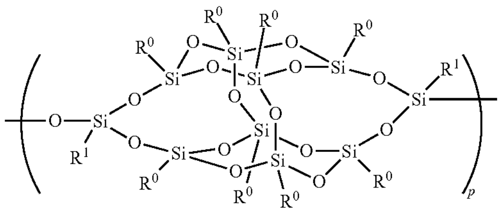

(4)

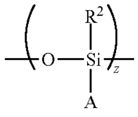

(5L)

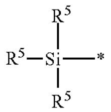

(5R)

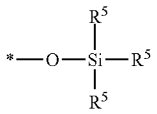

Formula (5L) represents a terminal group bonded to the left side of the formula and Formula (5R) represents a terminal group bonded to the right side;

A represents the following structure;

A

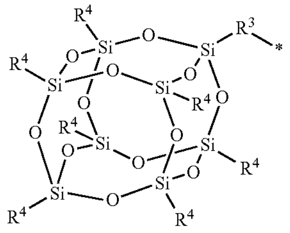

each $R^0$ independently represents an aryl group having 6 to 20 carbons or a cycloalkyl group having 5 to 6 carbons, and in the aryl group having 6 to 20 carbons and the cycloalkyl group having 5 to 6 carbons, arbitrary hydrogen atom may be independently substituted with a fluorine atom or an alkyl group having 1 to 20 carbons;

each $R^1$ independently represents a hydrogen atom, an aryl group having 6 to 20 carbons, a cycloalkyl group having 5 to 6 carbons, an arylalkyl group having 7 to 40 carbons, or an alkyl group having 1 to 40 carbons, and in the aryl group in the aryl group having 6 to 20 carbons, the cycloalkyl group having 5 to 6 carbons and the arylalkyl group having 7 to 40 carbons, arbitrary hydrogen atom may be independently substituted with a fluorine atom or an alkyl group having 1 to 20 carbons, and in an alkylene group in the arylalkyl group having 7 to 40 carbons, arbitrary hydrogen atom may be substituted with a fluorine atom, and arbitrary $—CH_2—$ may be independently substituted with —O—, —CH═CH—, or a cycloalkylene group having 5 to 20 carbons, and in the alkyl group having 1 to 40 carbons, arbitrary hydrogen atom may be independently substituted with a fluorine atom, and arbitrary $—CH_2—$ may be independently substituted with —O— or a cycloalkylene group having 5 to 20 carbons;

each $R^2$ independently represents a hydroxyl group, an aryl group having 6 to 20 carbons, a cycloalkyl group having 5 to 6 carbons, an arylalkyl group having 7 to 40 carbons, or an alkyl group having 1 to 40 carbons, and in the aryl group in the aryl group having 6 to 20 carbons, the cycloalkyl group having 5 to 6 carbons and the arylalkyl group having 7 to 40 carbons, arbitrary hydrogen atom may be independently substituted with a fluorine atom or an alkyl group having 1 to 20 carbons, and in an alkylene group in the arylalkyl group having 7 to 40 carbons, arbitrary hydrogen atom may be substituted with a fluorine atom, and arbitrary $—CH_2—$ may be independently substituted with —O—, —CH═CH—, or a cycloalkylene group having 5 to 20 carbons, and in the alkyl group having 1 to 40 carbons, arbitrary hydrogen atom may be independently substituted with a fluorine atom, and arbitrary $—CH_2—$ may be independently substituted with —O— or a cycloalkylene group having 5 to 20 carbons;

each $R^3$ independently represents an alkylene group having 1 to 40 carbons, and in the alkylene group having 1 to 40 carbons, arbitrary $—CH_2—$ may be independently substituted with —O— or a cycloalkylene group having 5 to 20 carbons;

each $R^4$ independently represents an aryl group having 6 to 20 carbons, a cycloalkyl group having 5 to 6 carbons, an arylalkyl group having 7 to 40 carbons, or an alkyl group having 1 to 40 carbons, and in the aryl group in the aryl group having 6 to 20 carbons, the cycloalkyl group having 5 to 6 carbons and the arylalkyl group having 7 to 40 carbons, arbitrary hydrogen atom may be independently substituted with a fluorine atom or an alkyl group having 1 to 20 carbons, and in an alkylene group in the arylalkyl group having 7 to 40 carbons, arbitrary hydrogen atom may be substituted with a fluorine atom, and arbitrary $—CH_2—$ may be independently substituted with —O—, —CH=CH—, or a cycloalkylene group having 5 to 20 carbons, and in the alkyl group having 1 to 40 carbons, arbitrary hydrogen atom may be independently substituted with a fluorine atom, and arbitrary $—CH_2—$ may be independently substituted with —O— or a cycloalkylene group having 5 to 20 carbons;

each $R^5$ independently represents a crosslinkable functional group which is a hydroxyl group, hydrogen or an alkenyl group having 2 to 40 carbons, an alkyl group having 1 to 40 carbons, a halogen atom, an acyl group having 1 to 15 carbons, an alkoxyl group having 1 to 15 carbons, an oxime having 1 to 15 carbons, an amino group which may have a substituent, an amide having 1 to 15 carbons which may have a substituent, an aminoxy group which may have a substituent, or a vinyl alcohol residue having 2 to 15 carbons which may have a substituent, and in the amino and aminoxy groups which have a substituent, the substituent has 1 to 15 carbons;

p represents a real number of 1 or more, and z represents a positive real number; and

* indicates a binding position.

[2] is the siloxane polymer of [1] which further includes repeating unit(s) represented by Formula (2) and/or (3):

(2)

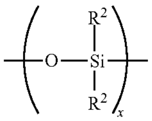

(3)

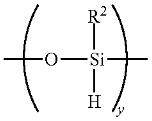

$R^2$ represents the same as $R^2$ in Formula (4) in [1]; and x and y each independently represent a positive real number.

[3] is the siloxane polymer of [1] which includes repeating unit(s) represented by Formula (2+4) and/or (4+2):

(2+4)

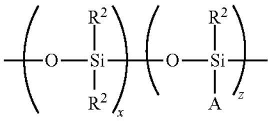

(4+2)

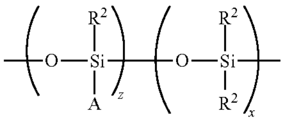

$R^2$ represents the same as $R^2$ in Formula (4) in [1]; and x and z each independently represent a positive real number.

[4] is the siloxane polymer of [1] or [3] which includes at least one selected from repeating units represented by Formula (4+2+3), (2+4+3), (2+3+4), (4+3+2), (3+4+2) and (3+2+4):

(4+2+3)

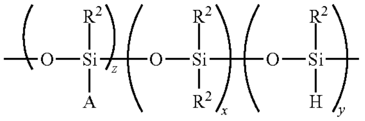

(2+4+3)

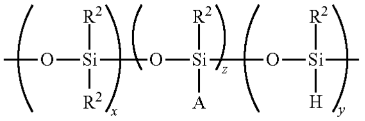

(2+3+4)

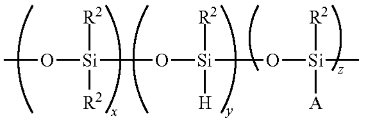

(4+3+2)

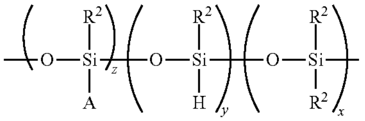

(3+4+2)

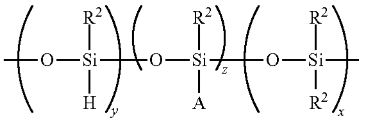

(3+2+4)

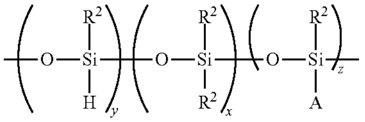

$R^2$ represents the same as $R^2$ in Formula (4) in [1]; and x, y and z each independently represent a positive real number.

[5] is the siloxane polymer of any one of [1] to [4] in which each $R^2$ independently represents methyl or phenyl, and each $R^4$ independently represents a phenyl, isobutyl, cyclopentyl, cyclohexyl, trifluoropropyl, nonafluorohexyl or pentafluorophenyl.

[6] is the siloxane polymer of any one of [1] to [5] which has a weight average molecular weight of 2,000 to 10,000,000.

[7] is a siloxane polymer composition comprising: the siloxane polymer of any one of [1] to [6], and a solvent.

[8] is a molded article obtained by curing the siloxane polymer of any one of [1] to [6] or the siloxane polymer composition of [7].

[9] is the molded article of [8] which has a haze value of 1% or less, a thermal decomposition temperature in a range of 350 to 450° C., and a coefficient of linear expansion of 200 ppm or less.

[10] is the molded article of [8] which has electric insulation.

[11] is a molded article comprising: a cured product obtained by curing the siloxane polymer of any one of

[1] to [6] or the siloxane polymer composition of [7], and a base covered by the cured product.

[12] is the molded article of [11] which has a coefficient of linear expansion is 200 ppm or less, wherein the difference in haze value between the molded article and the base is 1% or less.

[13] is the molded article of [11] which has electric insulation.

Advantageous Effects of Invention

According to this invention, there are provided a siloxane polymer containing a silsesquioxane unit and a chain siloxane unit in the main chain and a cage-type silsesquioxane structure in the side chain, and a method of producing the siloxane polymer. In addition, when a composition in which the siloxane polymer is dissolved in an organic solvent is applied to a base, fired and then peeled off from the base, a highly transparent and flexible film having a low coefficient of thermal expansion using the cohesion force (physical crosslinking) of the cage-type silsesquioxane in the side chain can be obtained.

DESCRIPTION OF EMBODIMENTS

While embodiments of this invention will be described below in detail, the following description includes examples (typical examples) of the embodiments of this invention, and this invention is not limited to these details. In addition, the embodiments of this invention can be appropriately combined.

Here, the terms used in this specification are defined as follows. Alkyl and alkylene groups may be linear groups or branched groups in any case. The same applies when arbitrary hydrogen atom in these groups is substituted with a halogen atom or a cyclic group, and when arbitrary $—CH_2—$ is substituted with —O—, —CH═CH—, a cycloalkylene group, a cycloalkenylene group, or a phenylene group. The term "any" used in this invention indicates that not only the position but also the number of components is arbitrary. Here, when the number is plural, the components may be substituted with different groups. For example, when two $—CH_2—$'s in the alkyl group are substituted with —O— and —CH═CH—, it indicates an alkoxyalkenyl or alkenyloxyalkyl group. Any of alkoxy, alkenylene, alkenyl and alkylene groups in this case may be a linear group or a branched group. However, when it is described that arbitrary $—CH_2—$ is substituted with —O—, a plurality of consecutive $—CH_2—$'s are not substituted with —O—. That is, for example, $—CH_2—CH_2—$ is not substituted with —O—O—.

A siloxane polymer according to one embodiment of this invention has repeating units represented by Formulae (1) and (4) and terminal groups represented by Formulae (5L) and (5R) at left and right terminals. Here, "left and right terminals" is an expression applied in the case in which the siloxane polymer of this invention is represented by a structural formula.

(1)

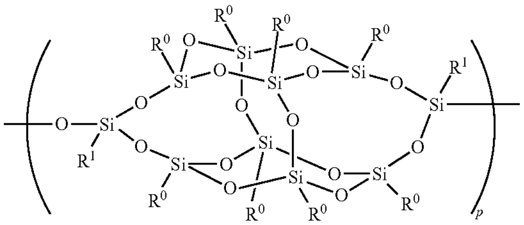

(4)

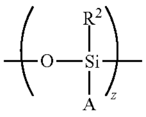

(5L)

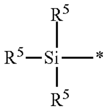

(5R)

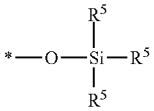

Formula (5L) represents a terminal group bonded to the left side of the formula, Formula (5R) represents a terminal group bonded to the right side, and A represents the following structure.

A

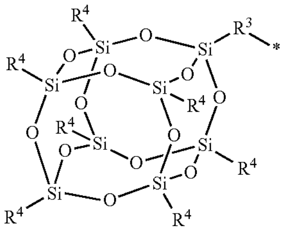

The siloxane polymer of this invention may further include repeating units represented by Formula (2) and/or (3).

(2)

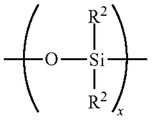

(3)

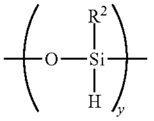

The symbols in the formulae are the same as described in the above [1] to [2], and will be described below in detail.

The siloxane polymer of this invention has repeating units represented by Formulae (1) and (4), and this structure functions as a "main chain." This main chain may further include repeating units represented by Formula (2) and/or (3). Terminal groups represented by Formulae (5L) and (5R) are bonded to both terminals of the main chain. Formula (5L) represents a terminal group bonded to the left side of the formula, and Formula (5R) represents a terminal group bonded to the right side. Among these, A in Formula (4) is bonded as a "side chain."

The side chain represented by A has the following structure.

A

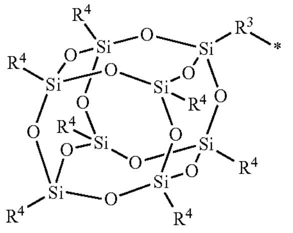

1. "Main Chain" of Siloxane Polymer

Focusing on the structure of the "main chain" of the siloxane polymer of this invention, the structure is exemplified. The siloxane polymer of this invention includes, for example, siloxane polymers having main chain structures represented by the following Formulae (Main chain 1), (Main chain 2-1) to (Main chain 2-8), (Main chain 3-1) to (Main chain 3-12), (Main chain 4-1) to (Main chain 4-48) and (Main chain 5-1) to (Main chain 5-36). In these formulae, m represents a real number of 1 or more, x', y' and z' each independently have the same meanings as x, y and z, and the meanings of the other symbols are the same as described in the above [1] to [2].

(Main chain 1)

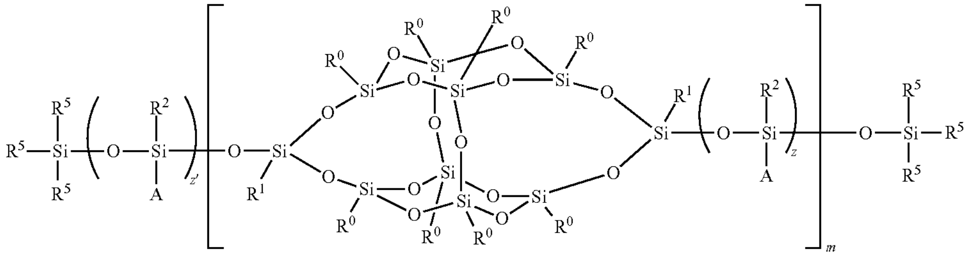

(Main chain 2-1)

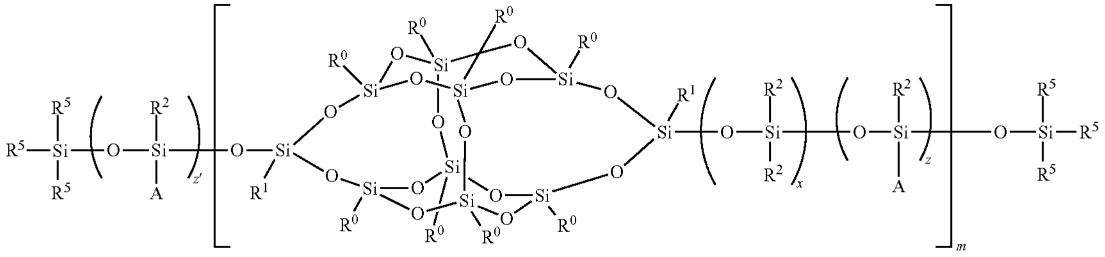

(Main chain 2-2)

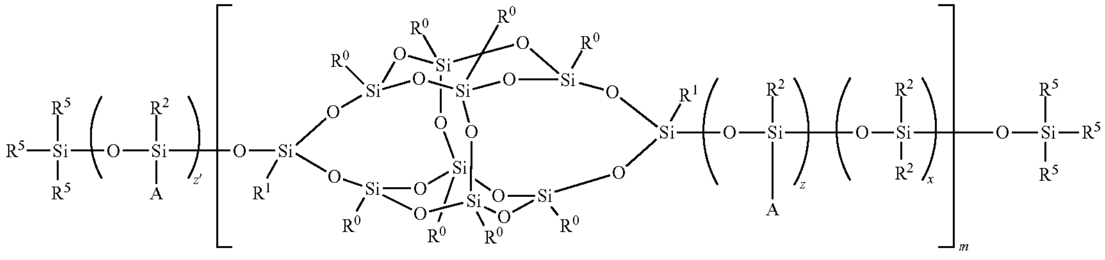

(Main chain 2-3)

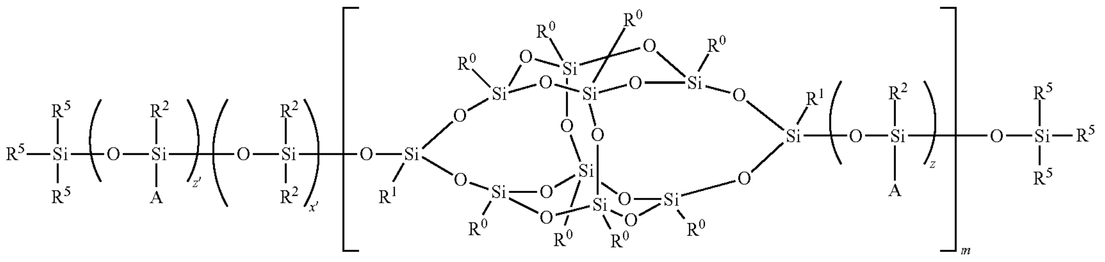

-continued
(Main chain 2-4)
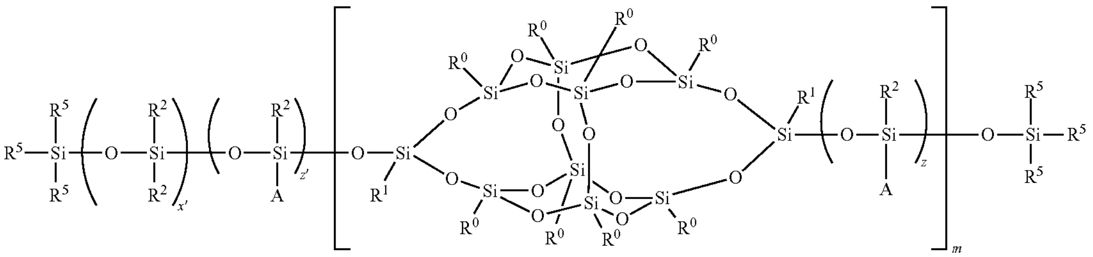
(Main chain 2-5)
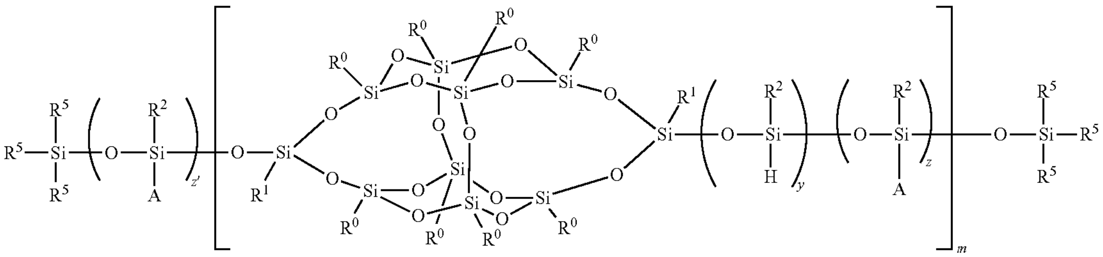
(Main chain 2-6)
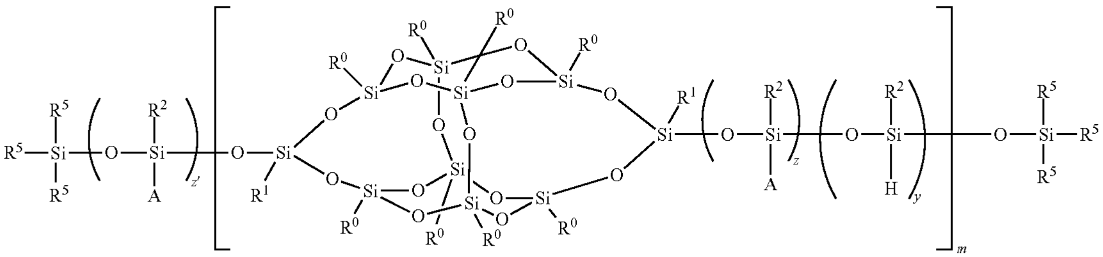
(Main chain 2-7)
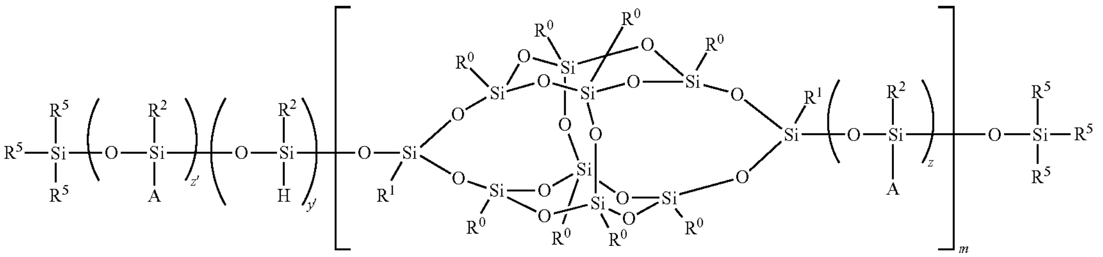
(Main chain 2-8)
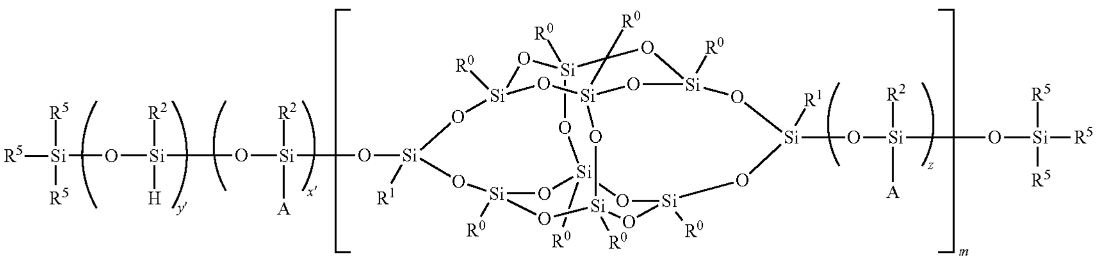

-continued
(Main chain 3-1)
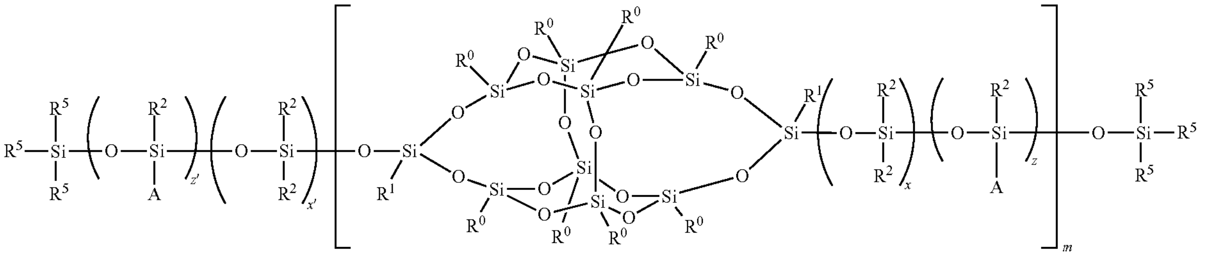
(Main chain 3-2)
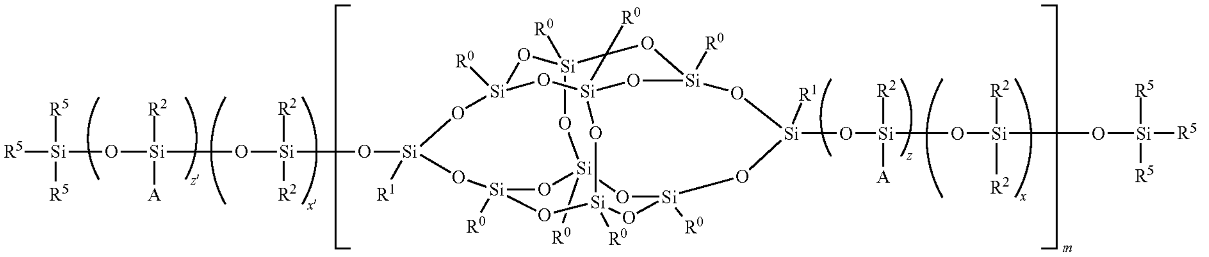
(Main chain 3-3)
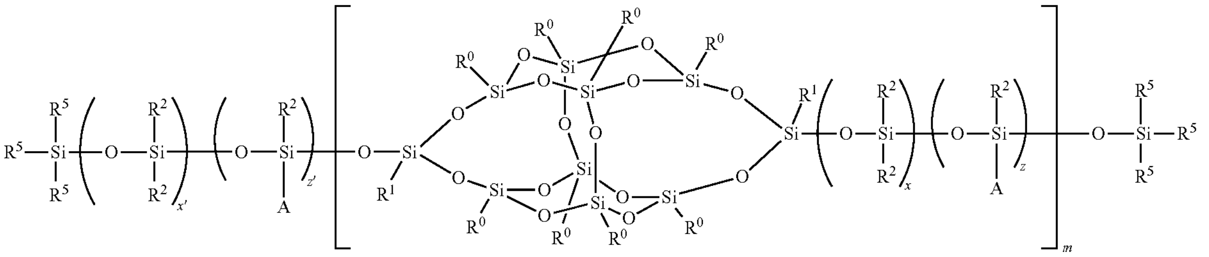
(Main chain 3-4)
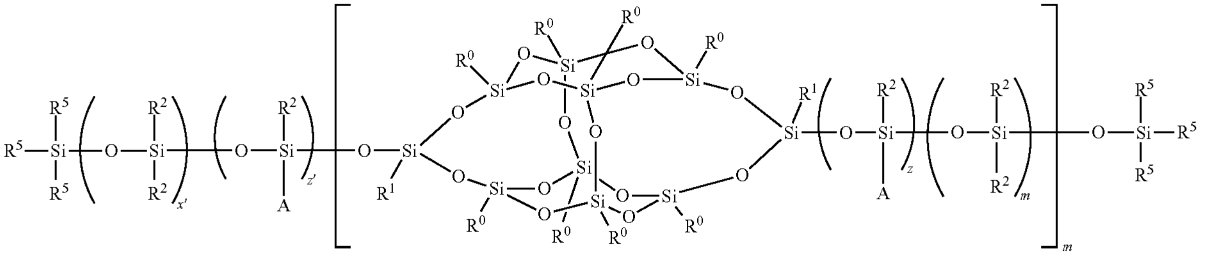
(Main chain 3-5)
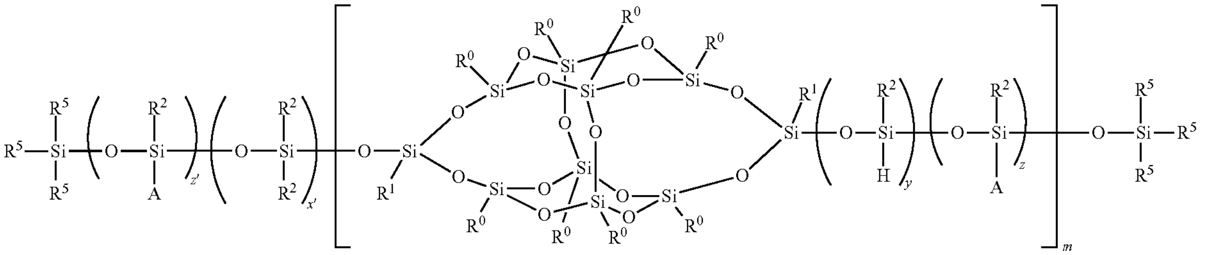

-continued
(Main chain 3-6)
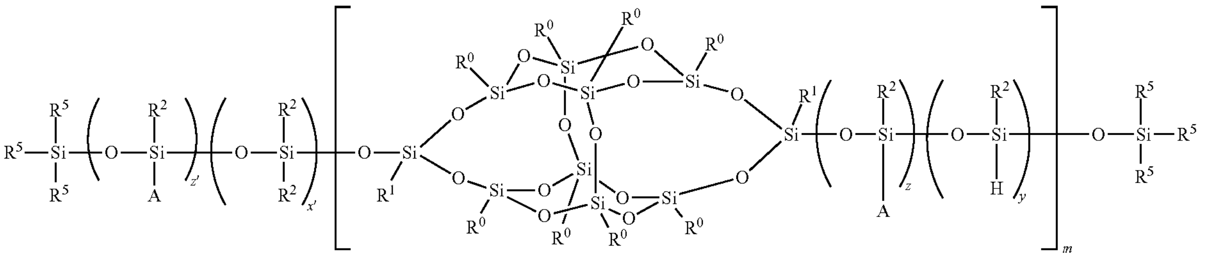
(Main chain 3-7)
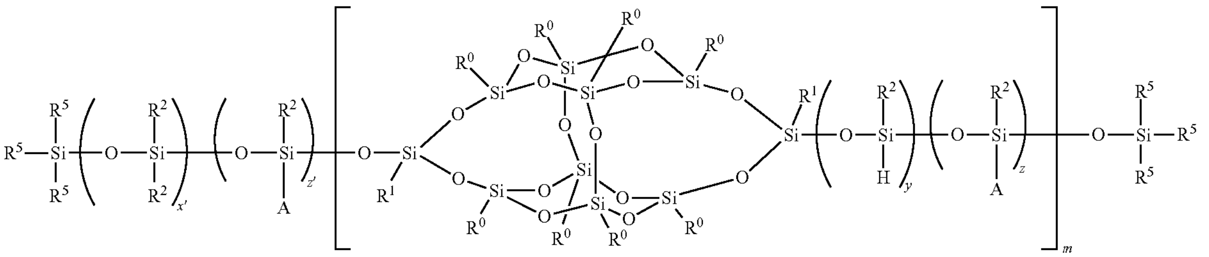
(Main chain 3-8)
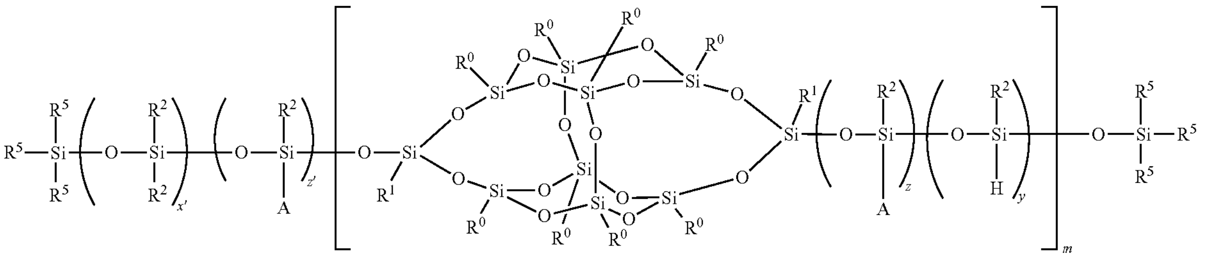
(Main chain 3-9)
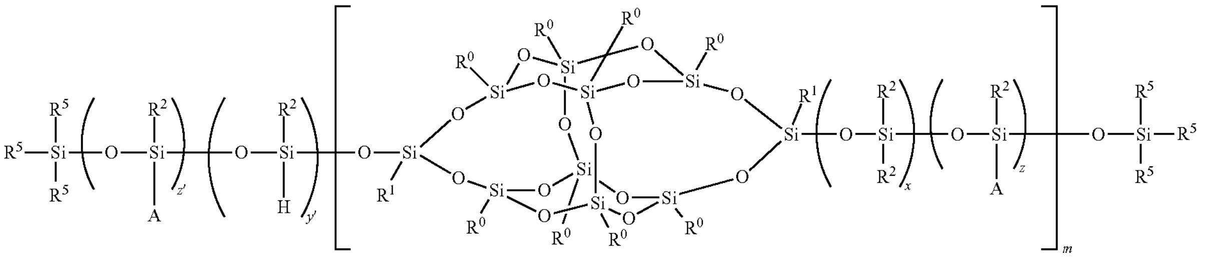
(Main chain 3-10)
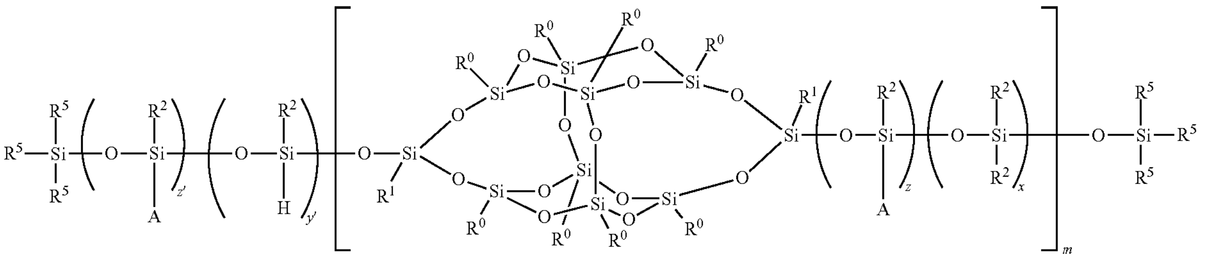

-continued
(Main chain 3-11)
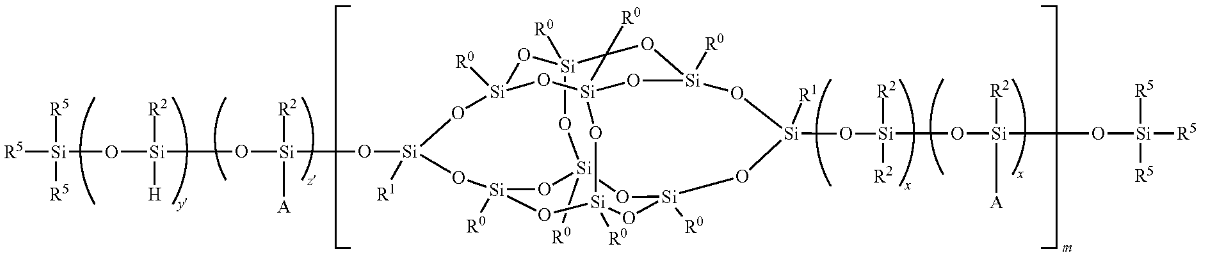
(Main chain 3-12)
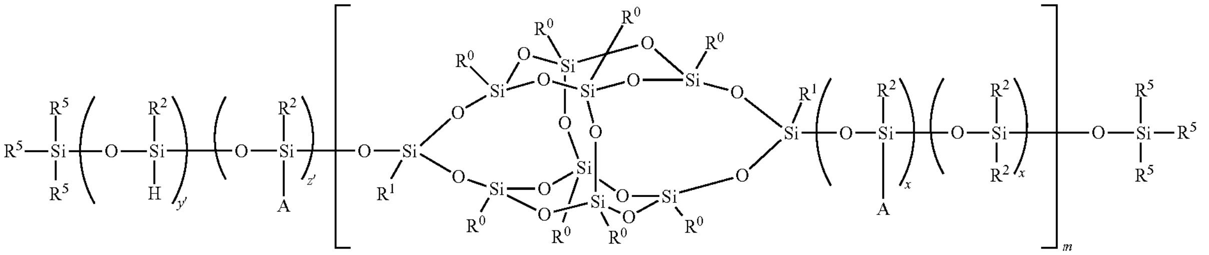
(Main chain 4-1)
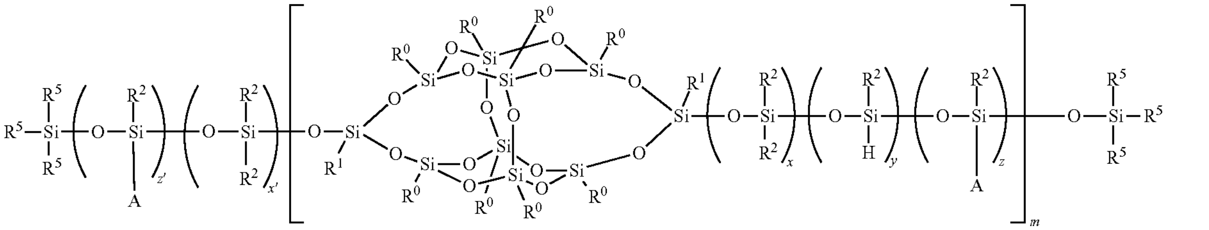
(Main chain 4-2)
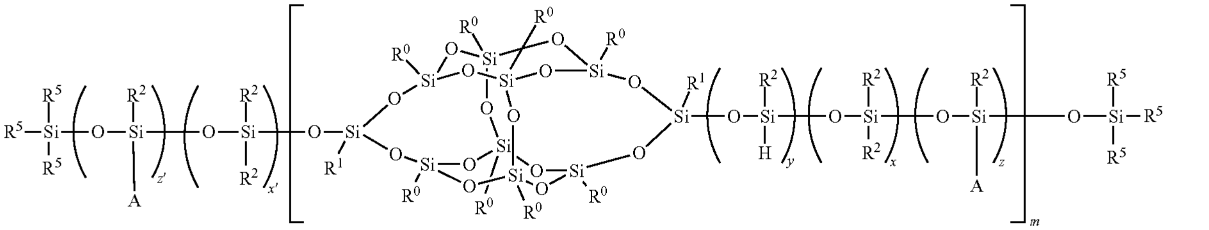
(Main chain 4-3)
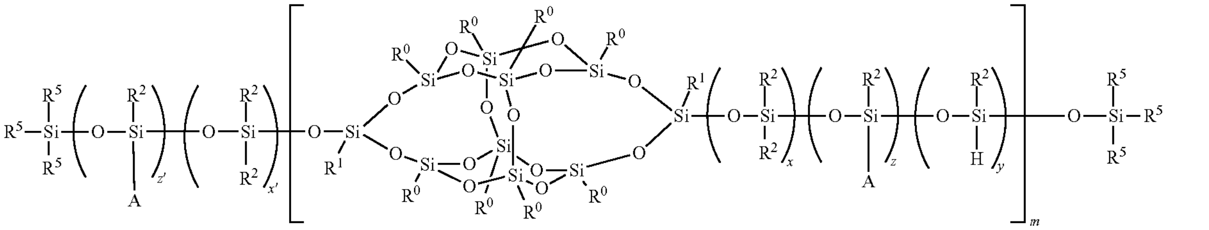
(Main chain 4-4)
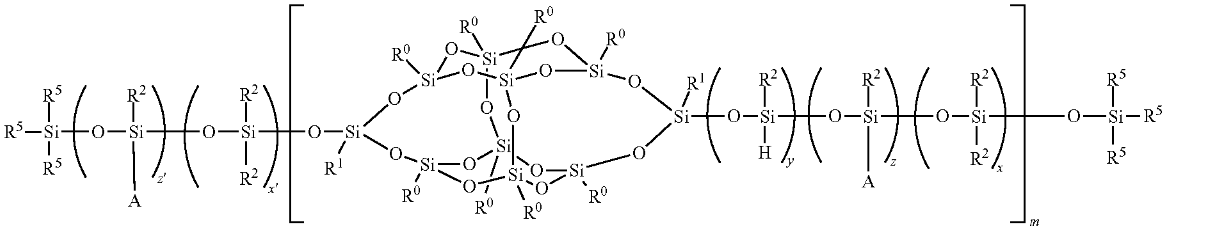

-continued
(Main chain 4-5)
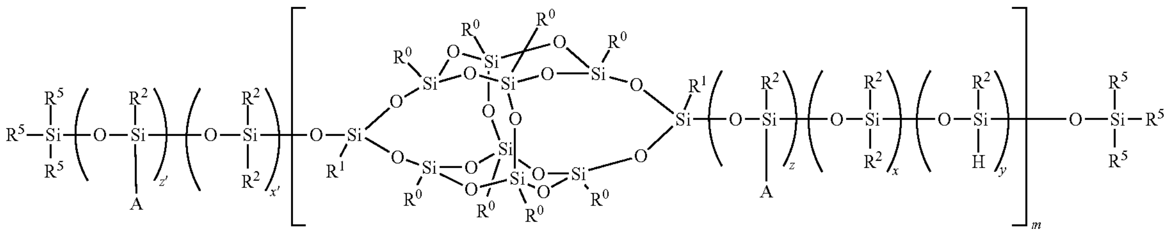
(Main chain 4-6)
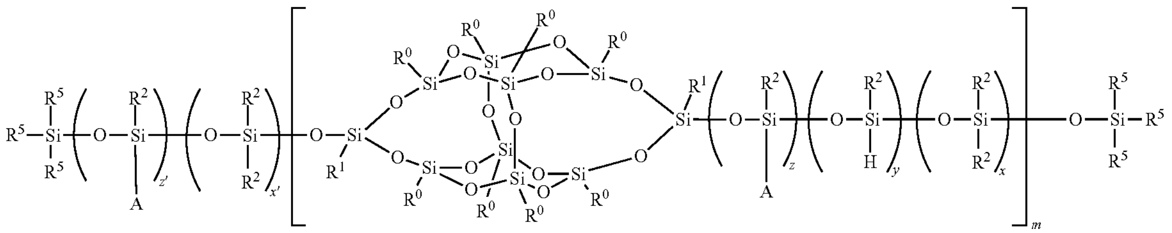
(Main chain 4-7)
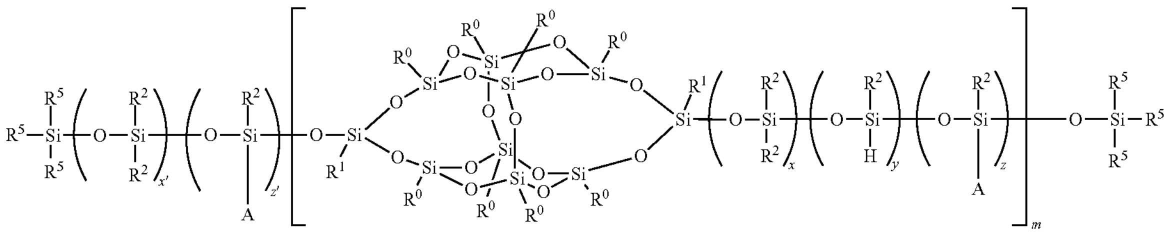
(Main chain 4-8)
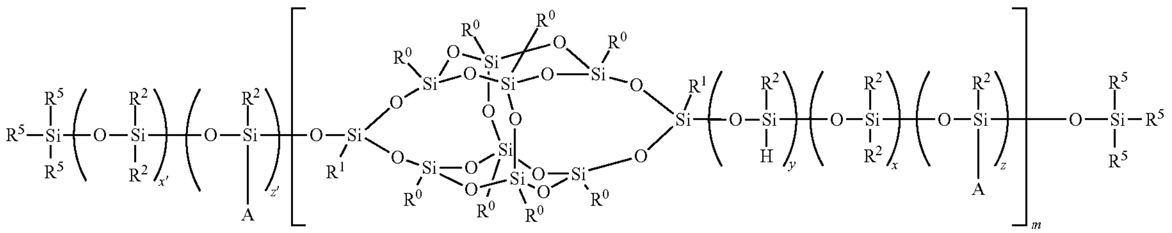
(Main chain 4-9)
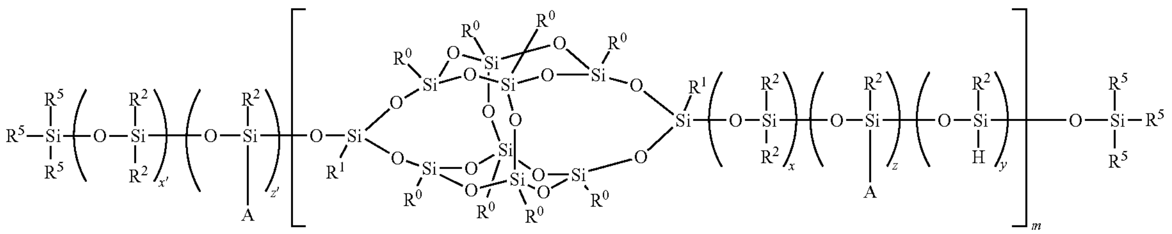
(Main chain 4-10)
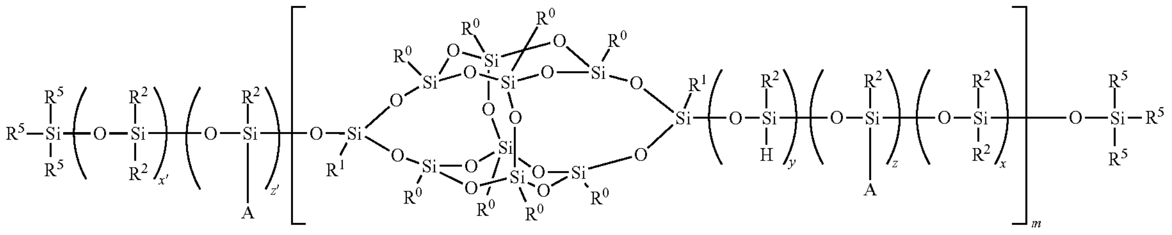

-continued
(Main chain 4-11)
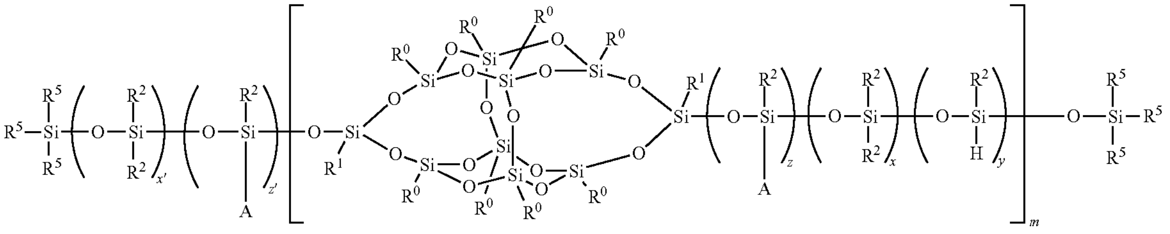
(Main chain 4-12)
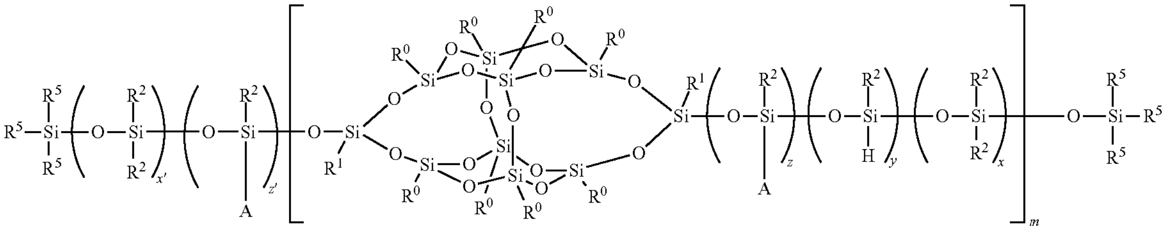
(Main chain 4-13)
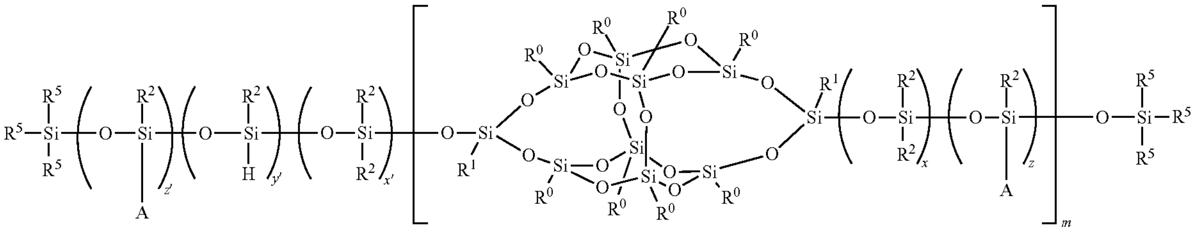
(Main chain 4-14)
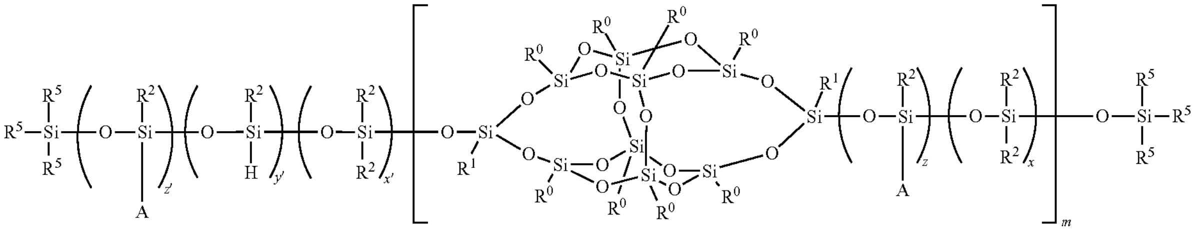
(Main chain 4-15)
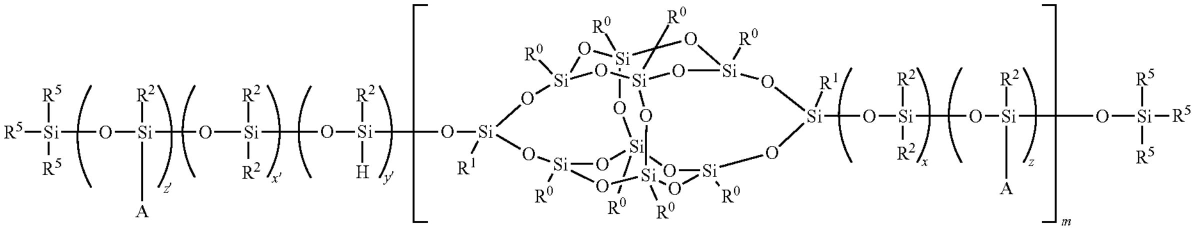
(Main chain 4-16)
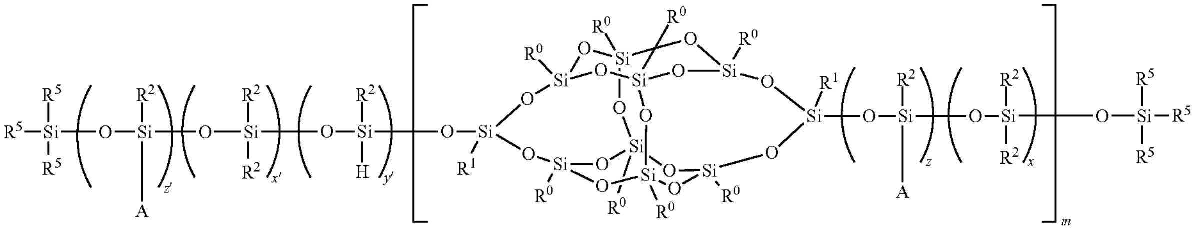

-continued
(Main chain 4-17)
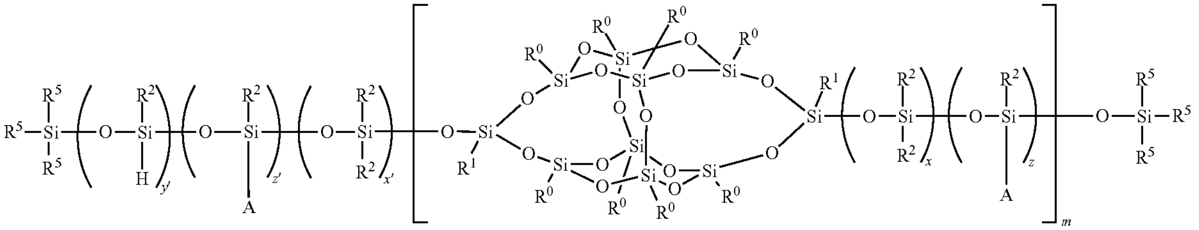
(Main chain 4-18)
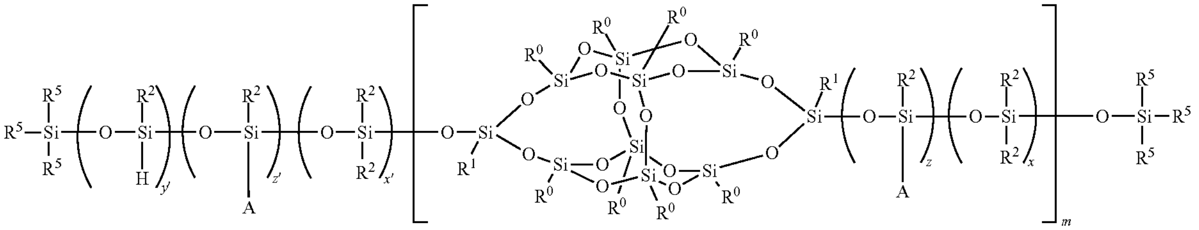
(Main chain 4-19)
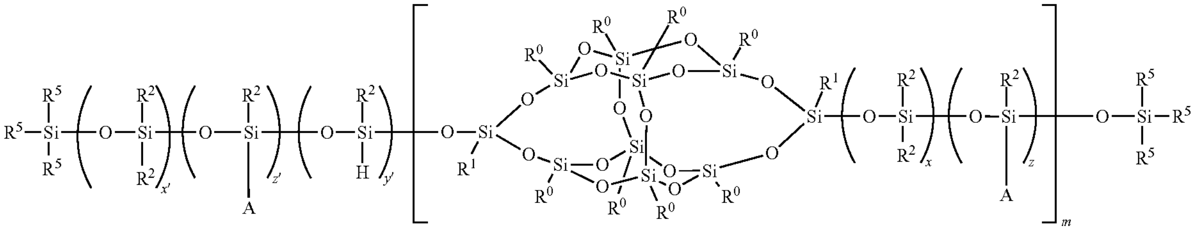
(Main chain 4-20)
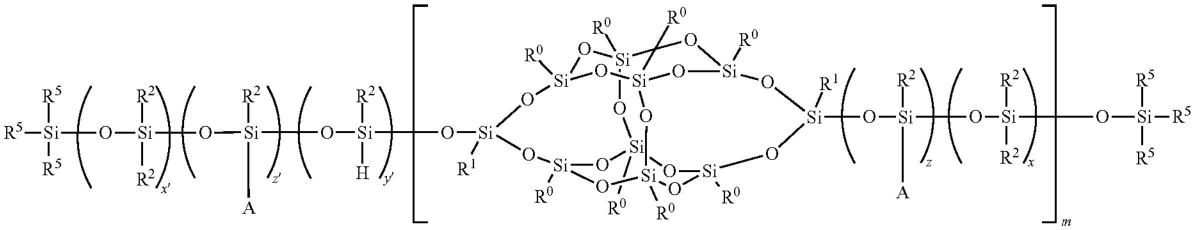
(Main chain 4-21)
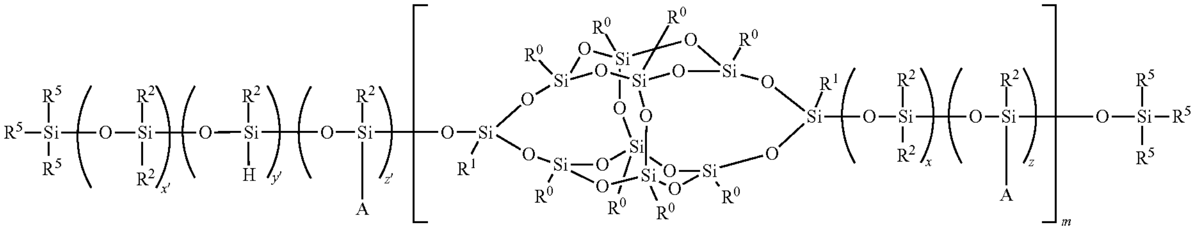
(Main chain 4-22)
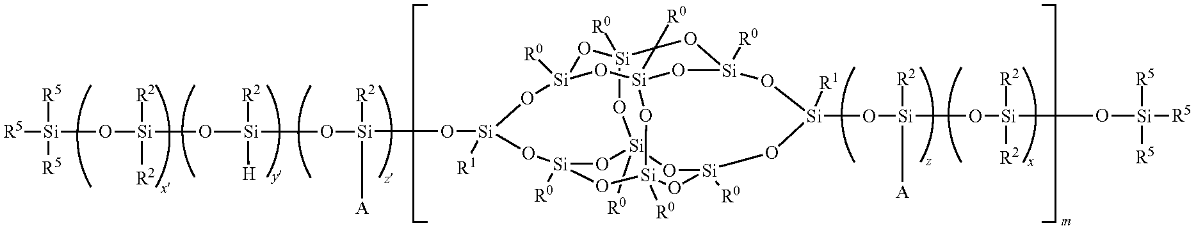

-continued
(Main chain 4-23)
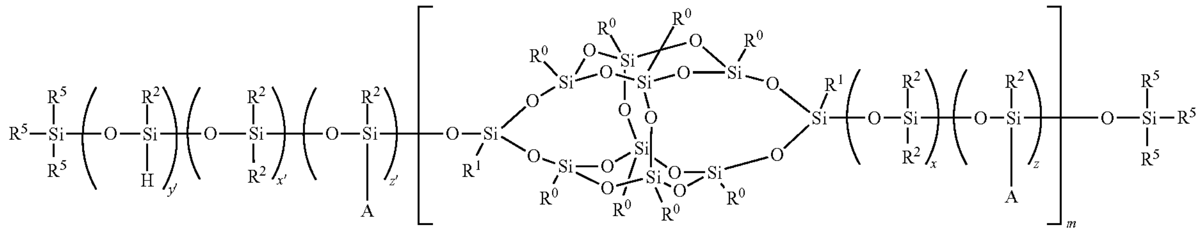
(Main chain 4-24)
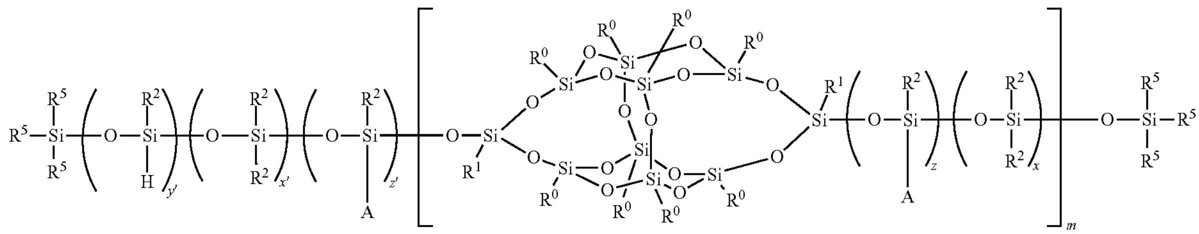
(Main chain 4-25)
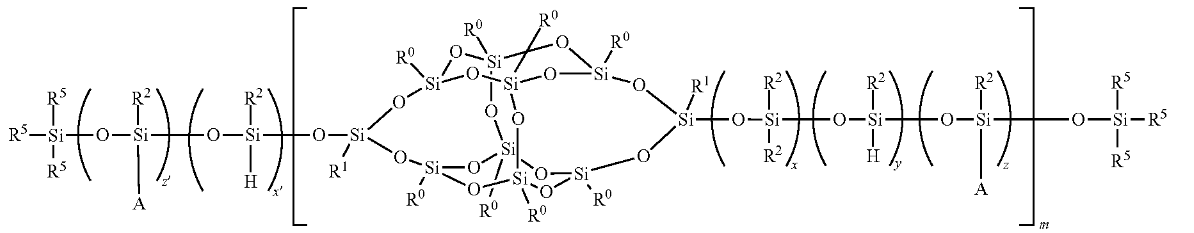
(Main chain 4-26)
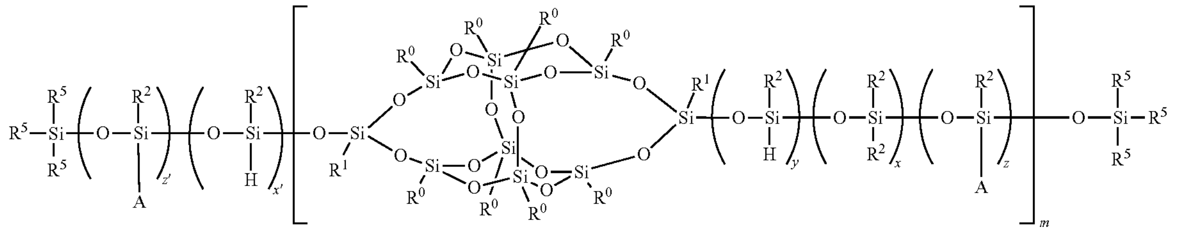
(Main chain 4-27)
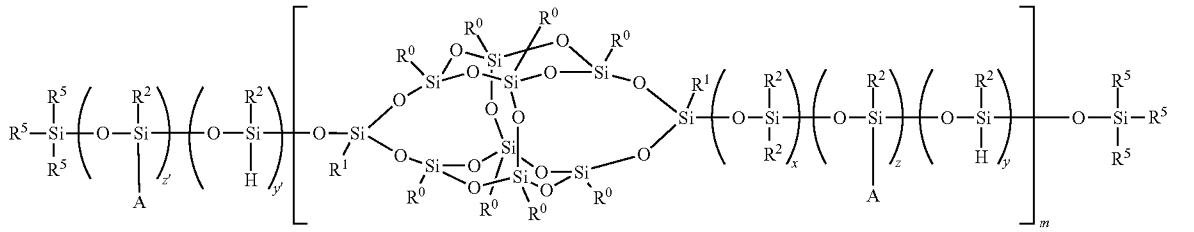
(Main chain 4-28)
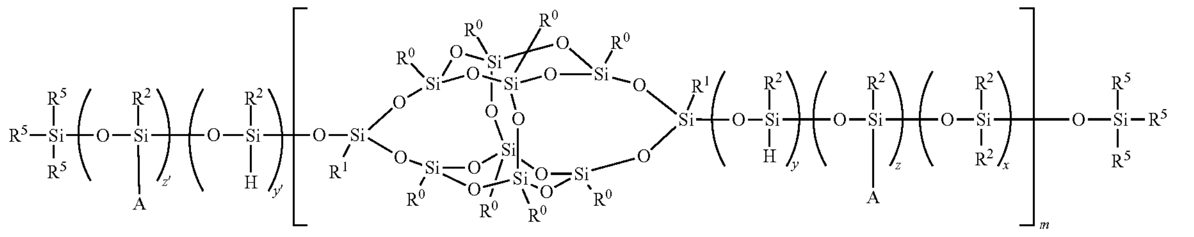

-continued
(Main chain 4-29)
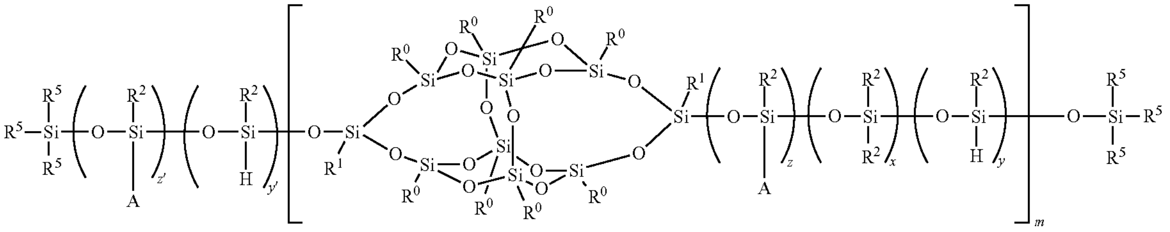
(Main chain 4-30)
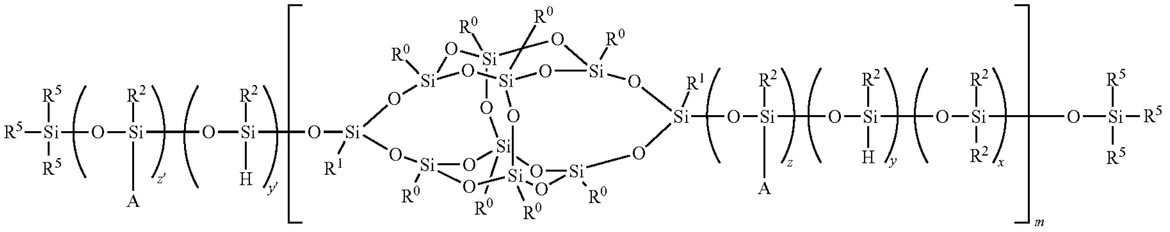
(Main chain 4-31)
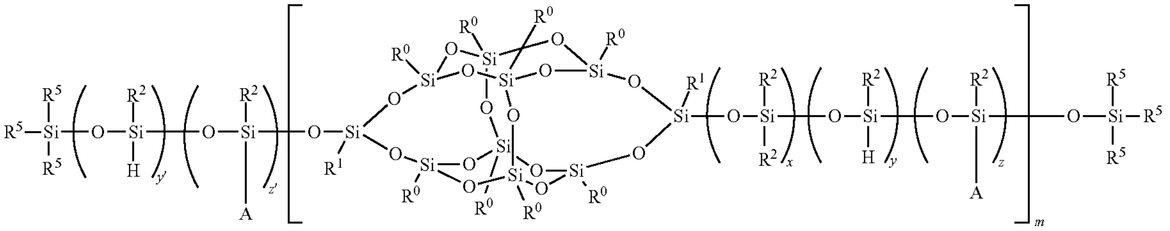
(Main chain 4-32)
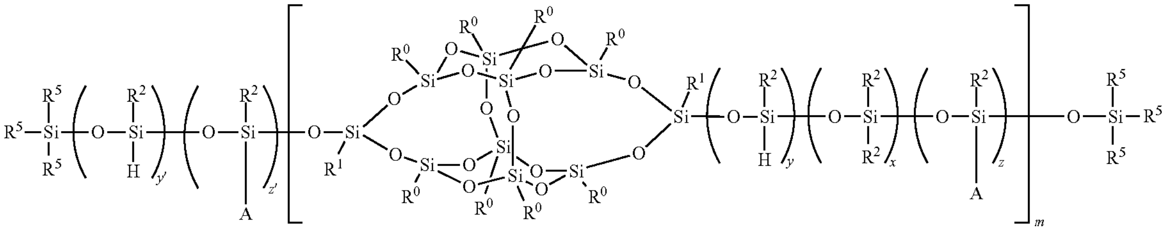
(Main chain 4-33)
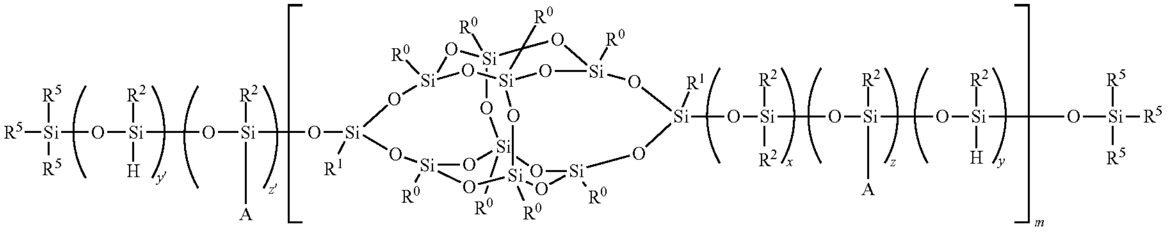
(Main chain 4-34)
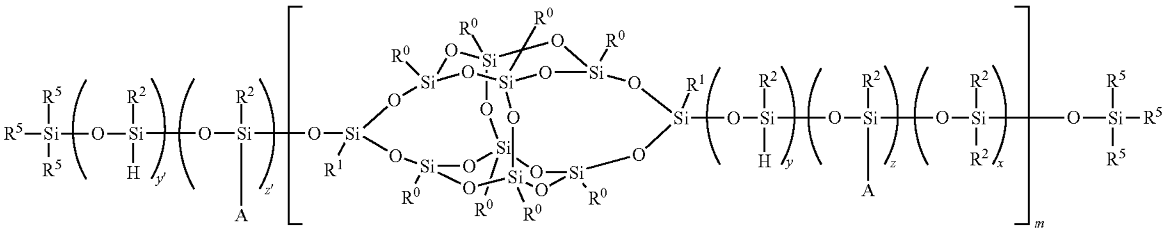

-continued
(Main chain 4-35)
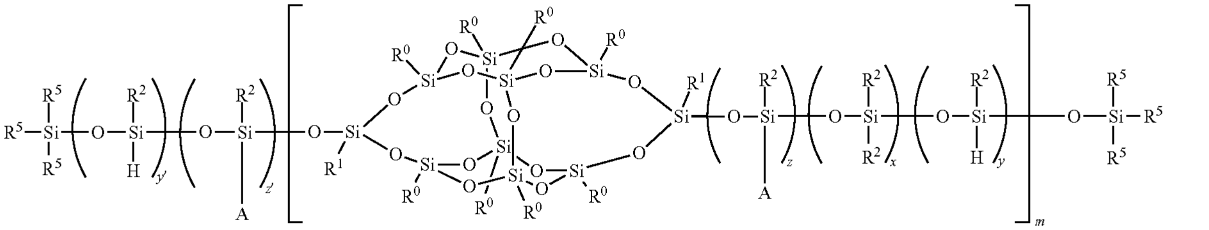
(Main chain 4-36)
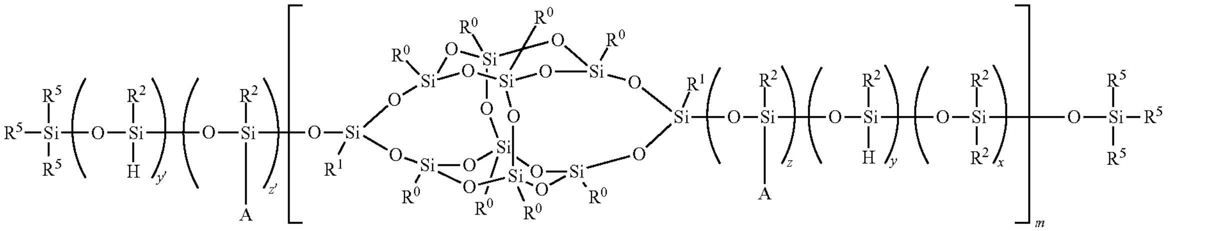
(Main chain 4-37)
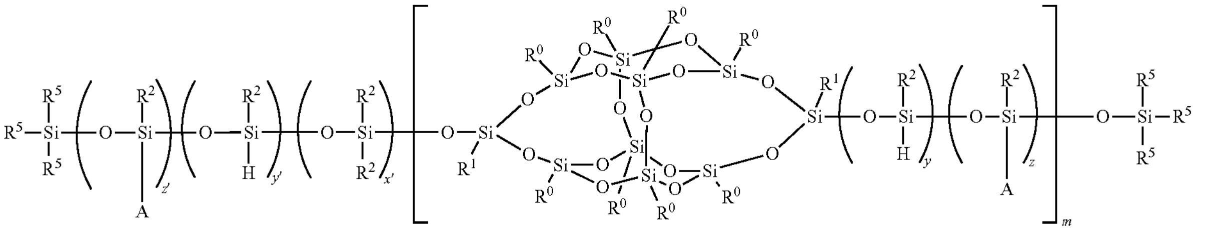
(Main chain 4-38)
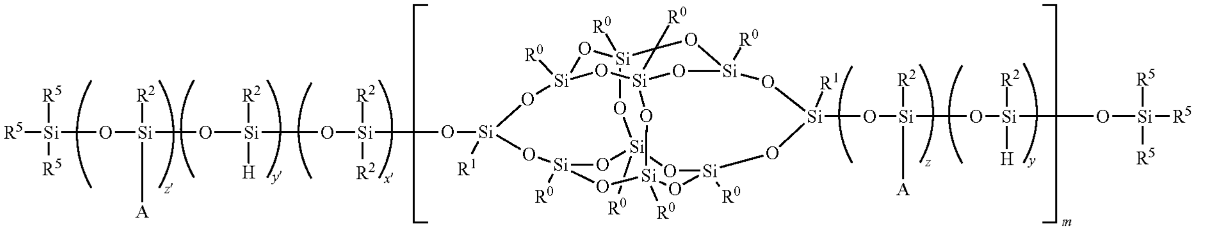
(Main chain 4-39)
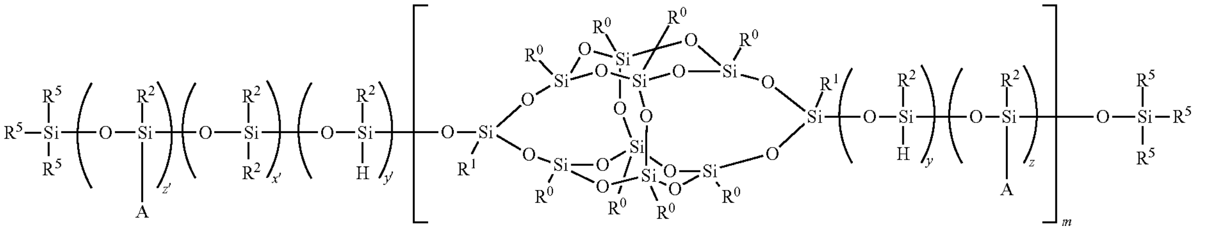
(Main chain 4-40)
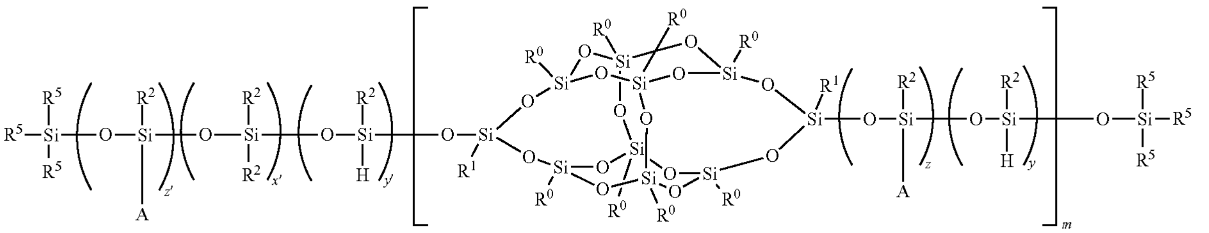

-continued
(Main chain 4-41)
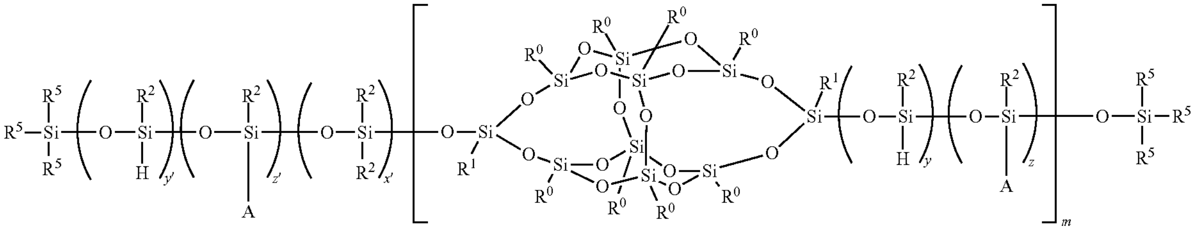
(Main chain 4-42)
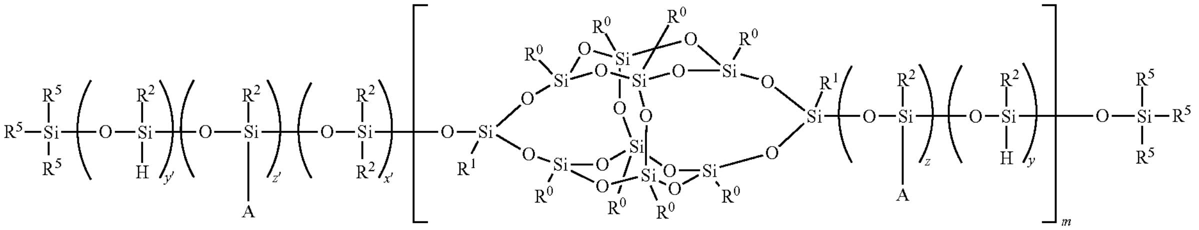
(Main chain 4-43)
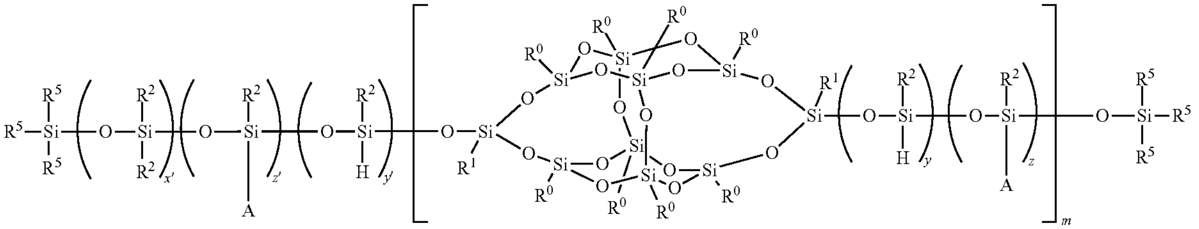
(Main chain 4-44)
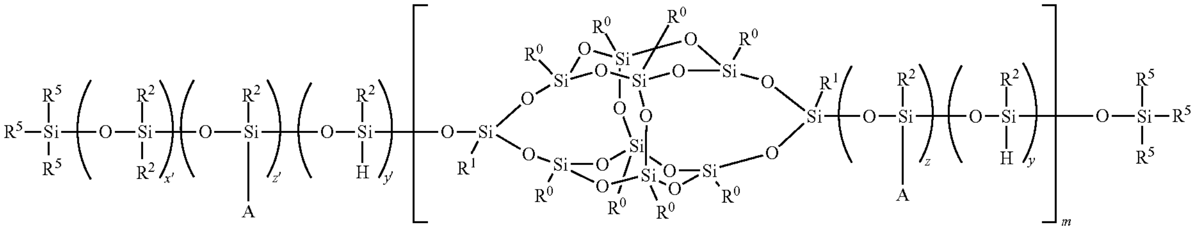
(Main chain 4-45)
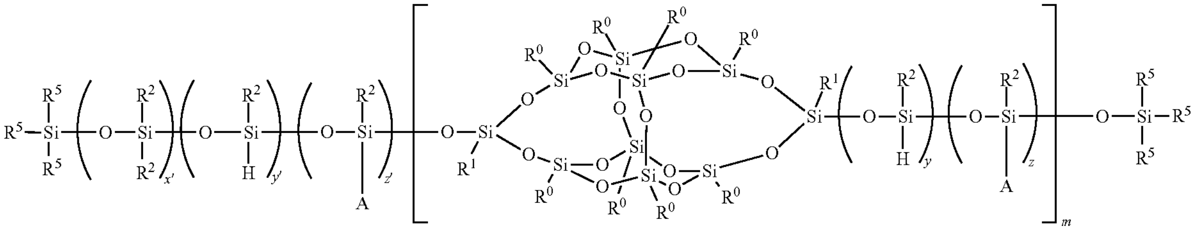
(Main chain 4-46)
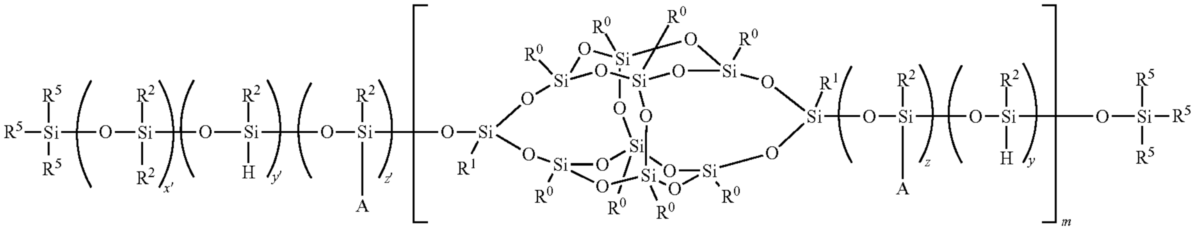

-continued
(Main chain 4-47)
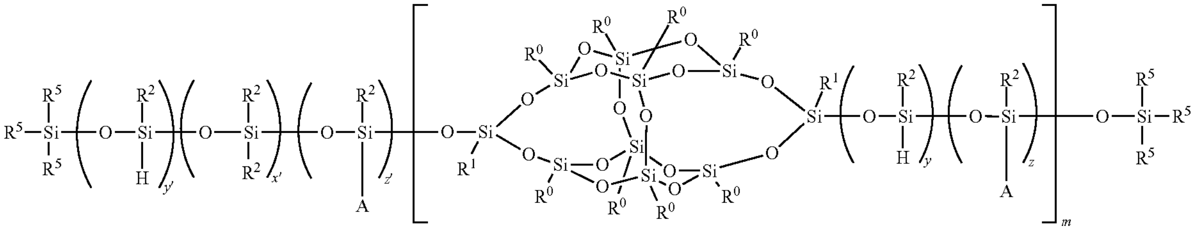
(Main chain 4-48)
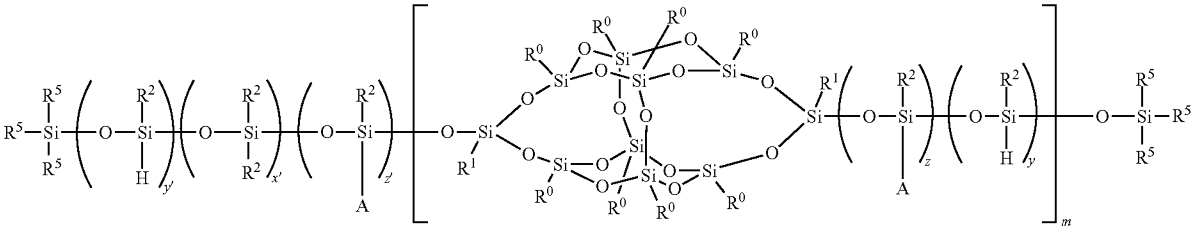
(Main chain 5-1)
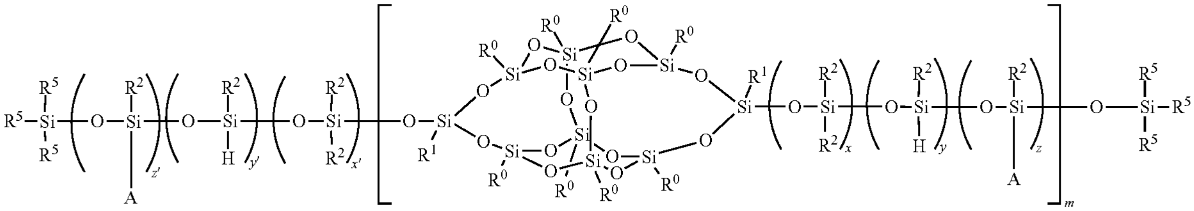
(Main chain 5-2)
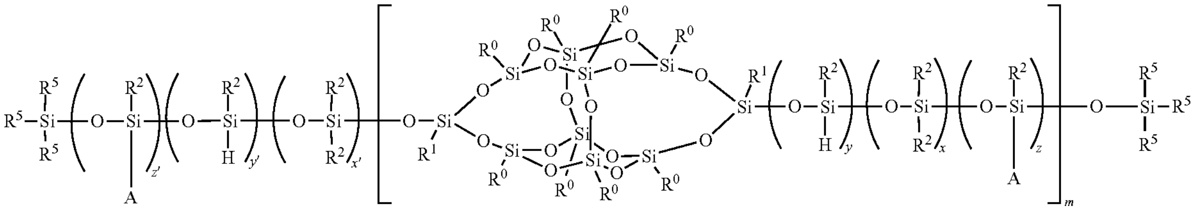
(Main chain 5-3)
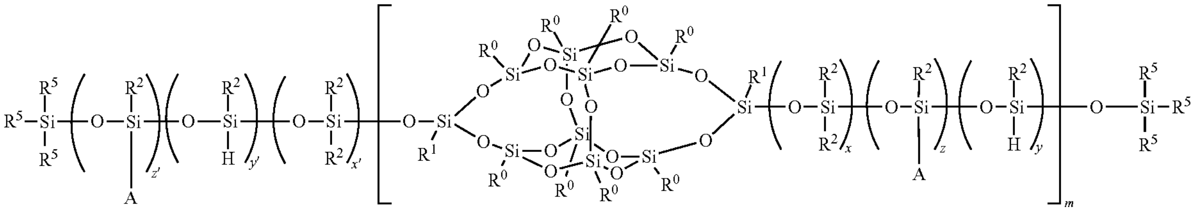
(Main chain 5-4)
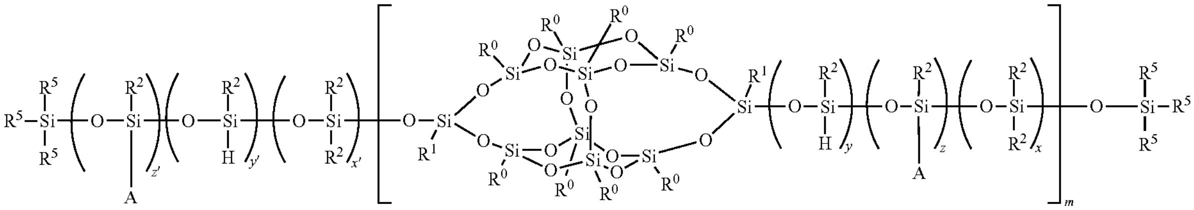

-continued
(Main chain 5-5)
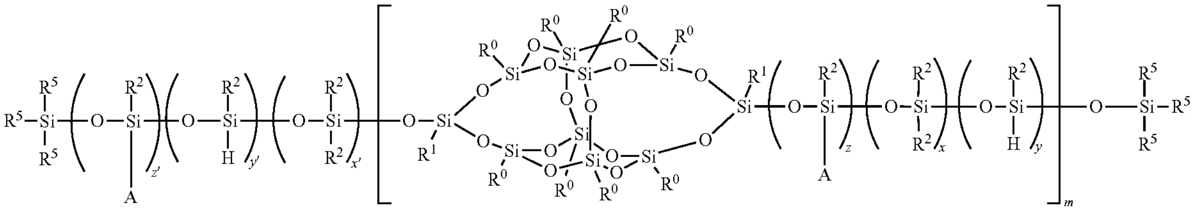
(Main chain 5-6)
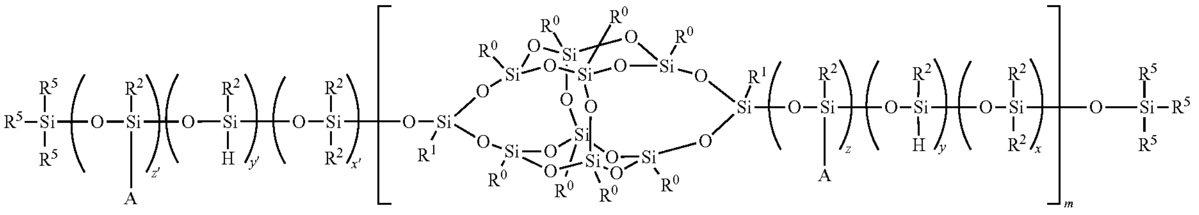
(Main chain 5-7)
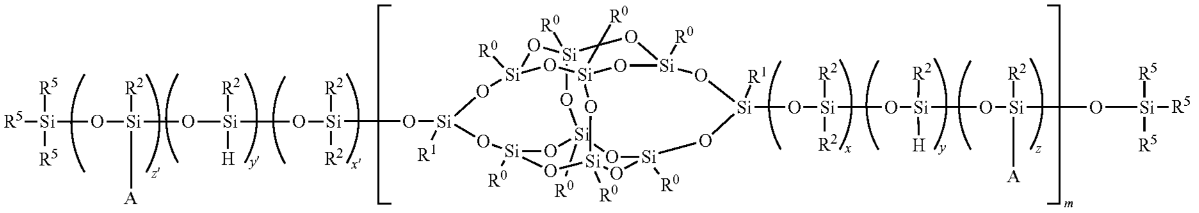
(Main chain 5-8)
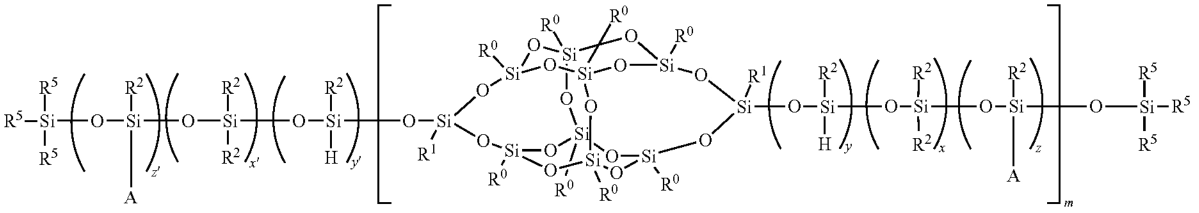
(Main chain 5-9)
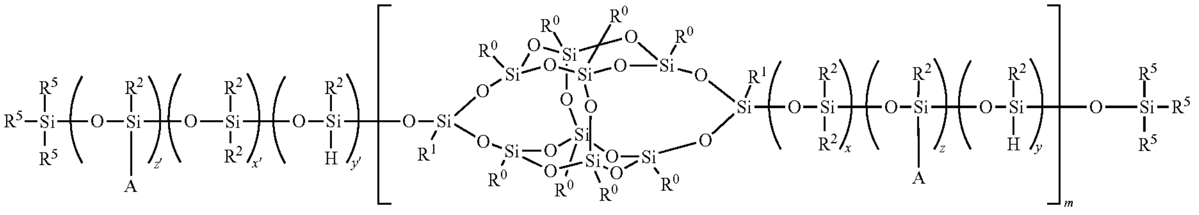
(Main chain 5-10)
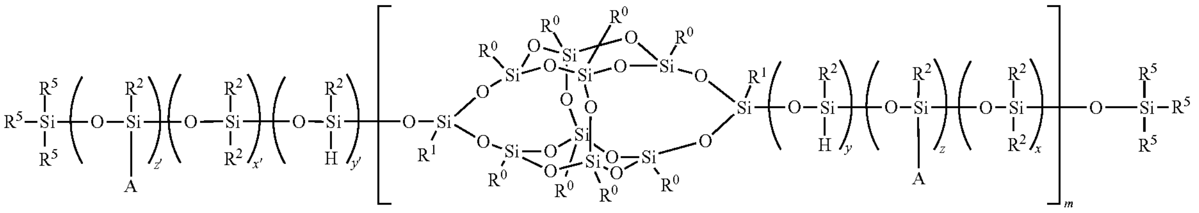

-continued
(Main chain 5-11)
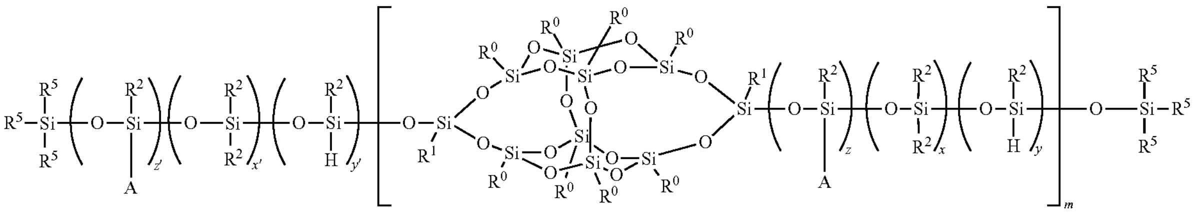
(Main chain 5-12)
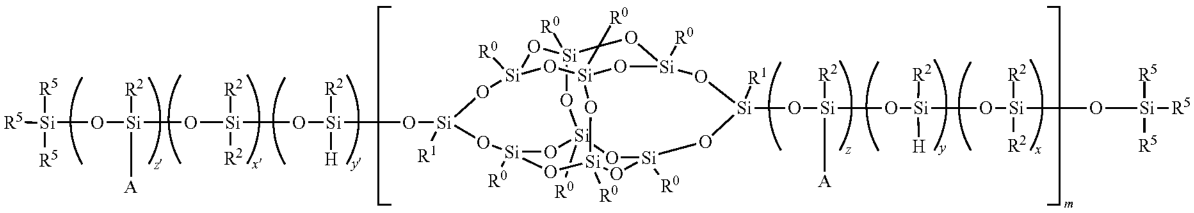
(Main chain 5-13)
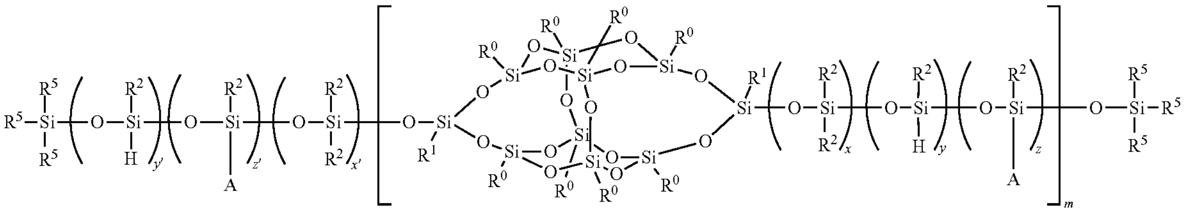
(Main chain 5-14)
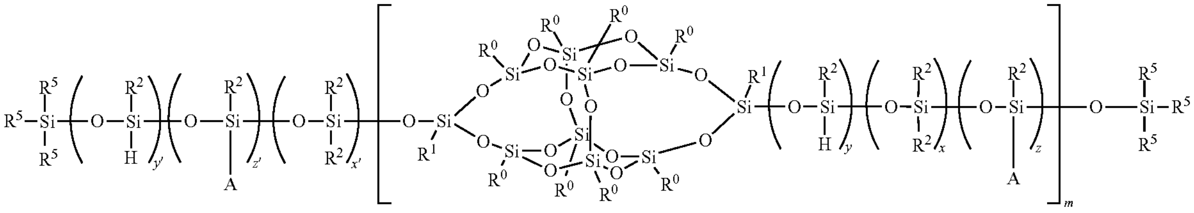
(Main chain 5-15)
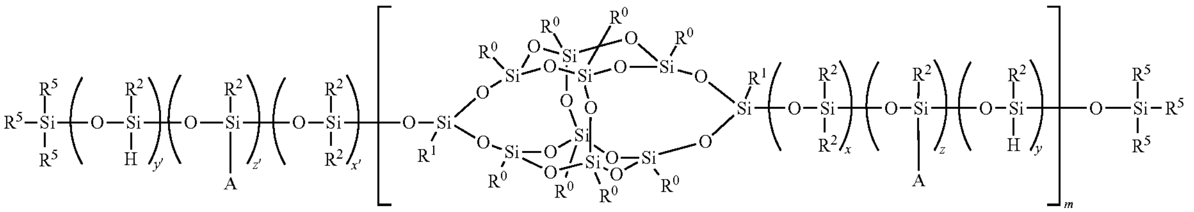
(Main chain 5-16)
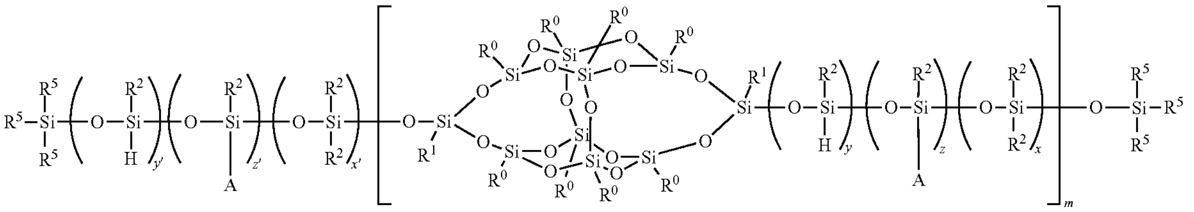

-continued
(Main chain 5-17)
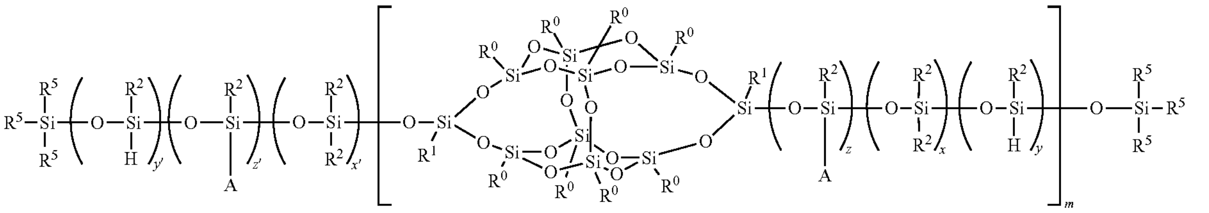
(Main chain 5-18)
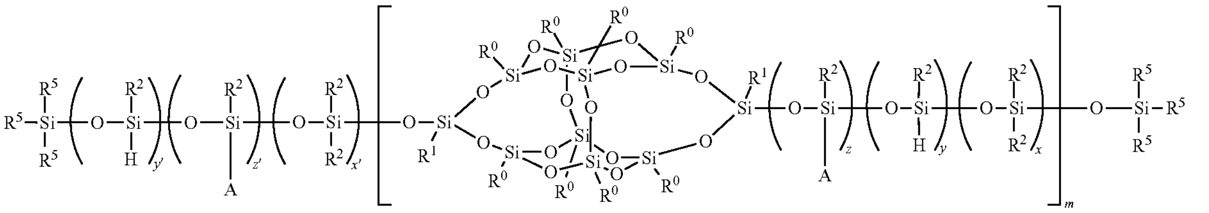
(Main chain 5-19)
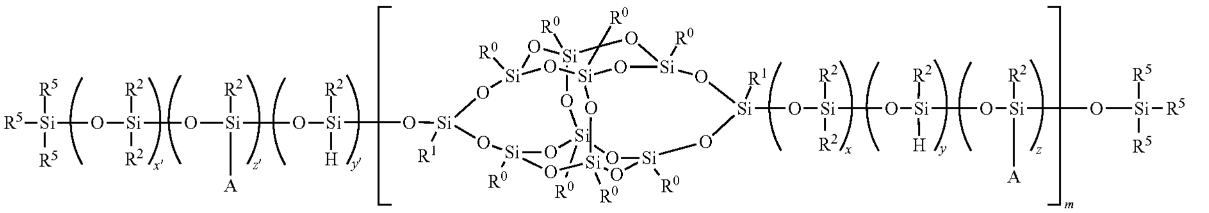
(Main chain 5-20)
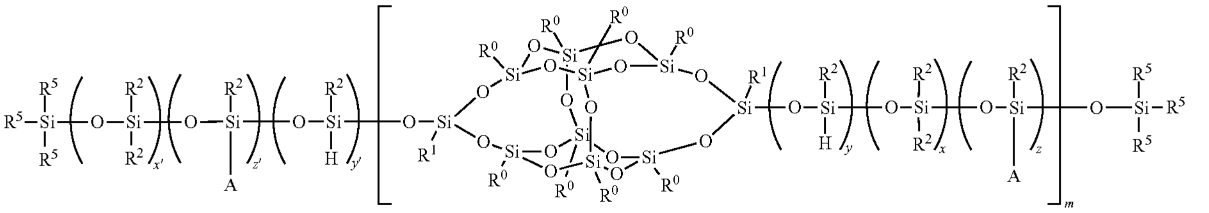
(Main chain 5-21)
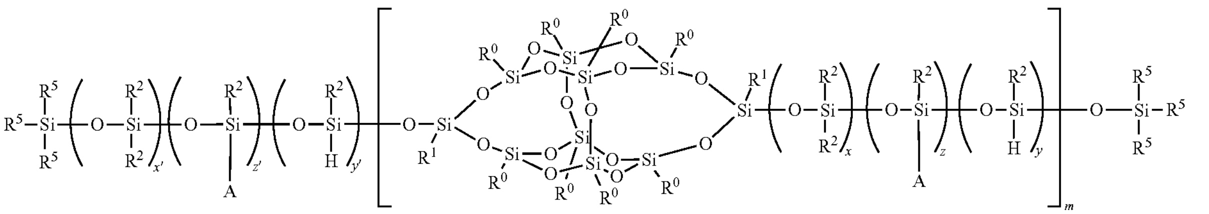
(Main chain 5-22)
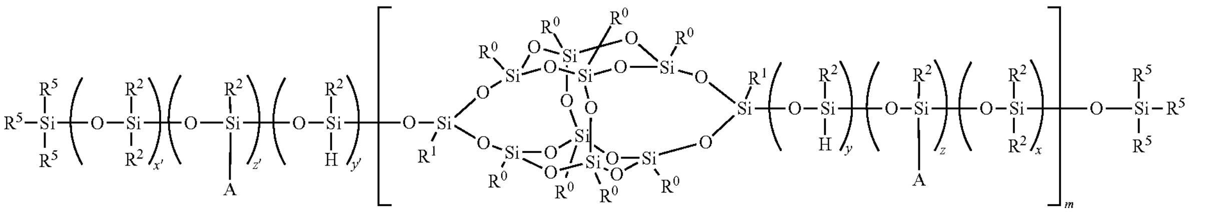

-continued
(Main chain 5-23)
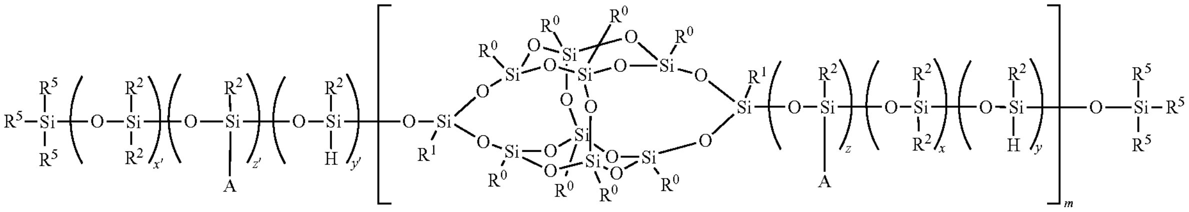
(Main chain 5-24)
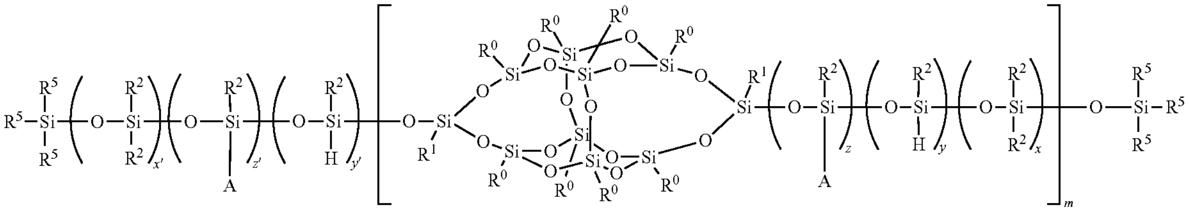
(Main chain 5-25)
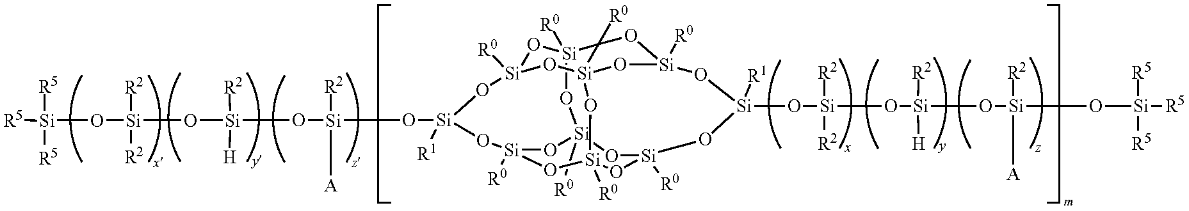
(Main chain 5-26)
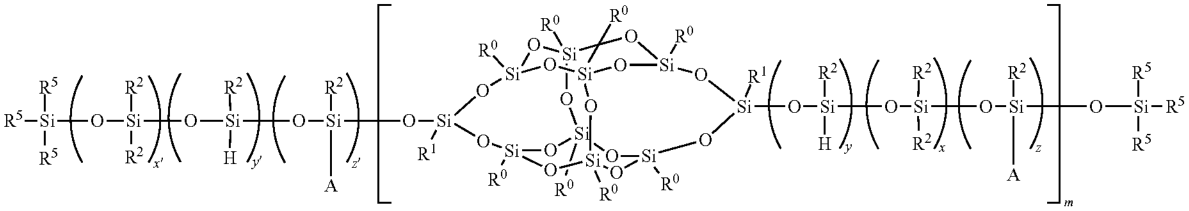
(Main chain 5-27)
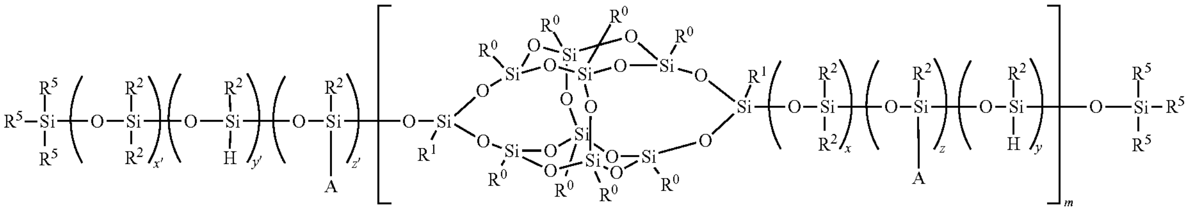
(Main chain 5-28)
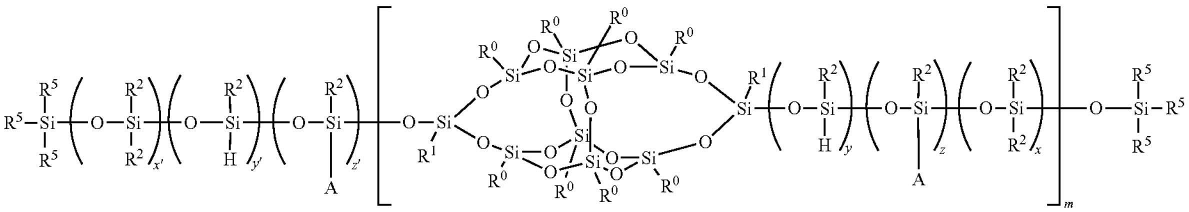

-continued
(Main chain 5-29)
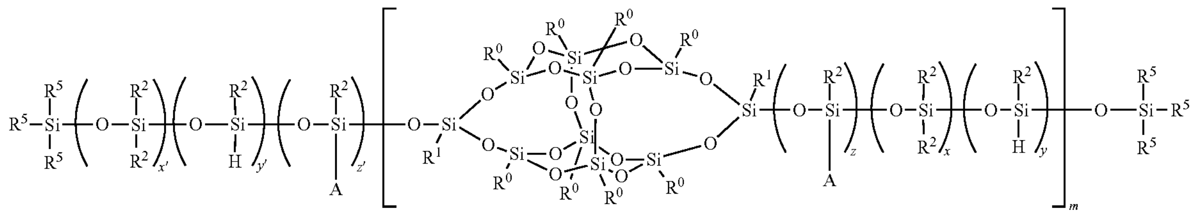
(Main chain 5-30)
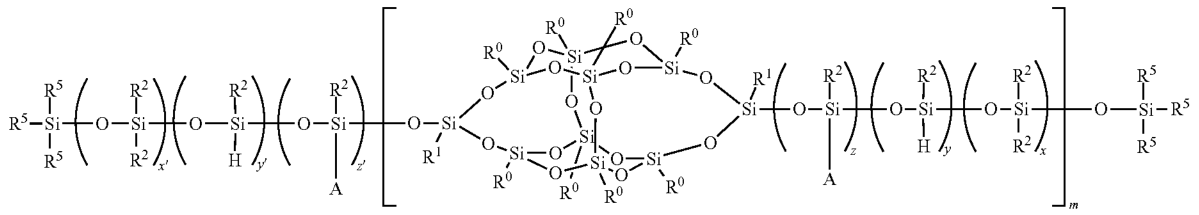
(Main chain 5-31)
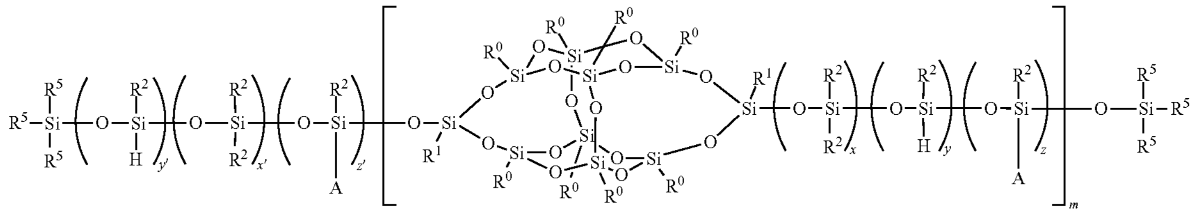
(Main chain 5-32)
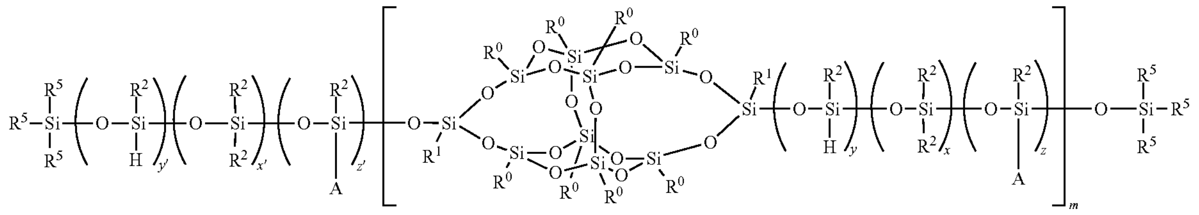
(Main chain 5-33)
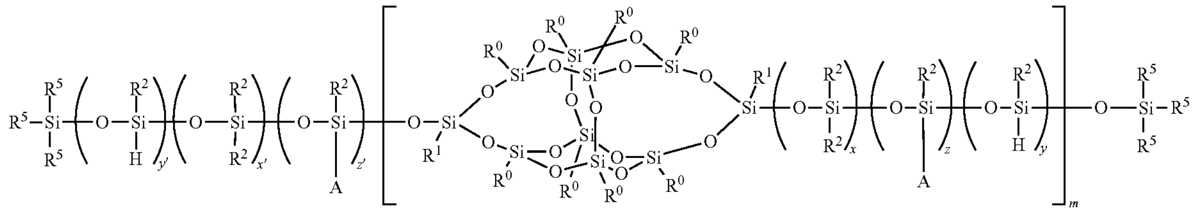
(Main chain 5-34)
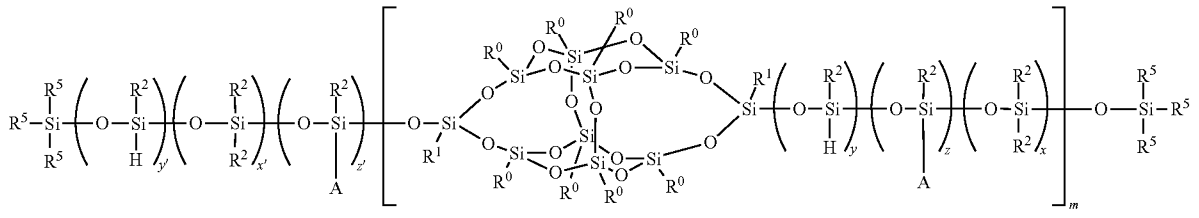

-continued (Main chain 5-35)

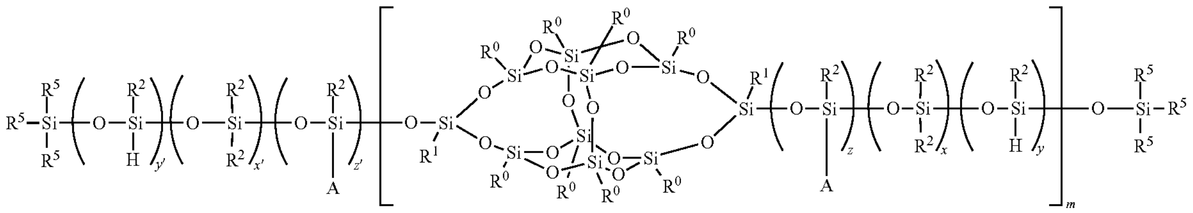

(Main chain 5-36)

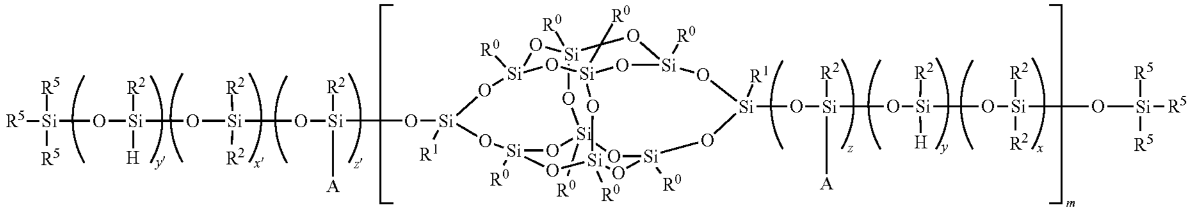

2. "Side Chain" of Siloxane Polymer

In this invention, the partial structure represented by A is called a "side chain." $R^4$ and $R^3$ in the side chain A are the same as described in the above [1].

A

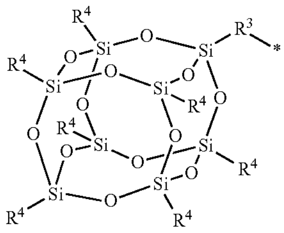

Specifically, the side chain represented by A includes structures (A-1) to (A-8) exemplified below.

Structure (A-1) in which, in A, $R^3$ is —$CH_2CH_2CH_2$—, and $R^4$ is —$CH_2CH_2CF_3$.

(A-1)

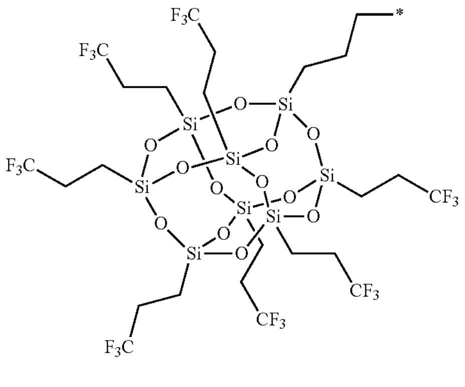

Structure (A-2) in which, in A, $R^3$ is —$CH_2CH_2CH_2$—, and $R^4$ is a phenyl group.

(A-2)

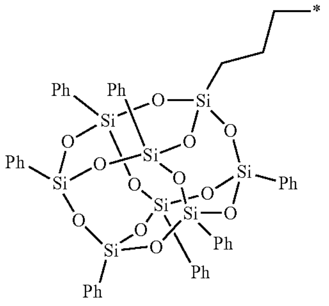

Structure (A-3) in which, in A, $R^3$ is —$CH_2CH_2CH_2$—, and $R^4$ is a cyclohexyl group.

(A-3)

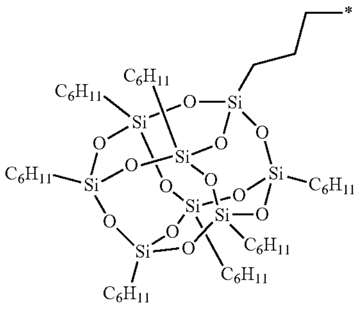

Structure (A-4) in which, in A, $R^3$ is —$CH_2CH_2CH_2$—, and $R^4$ is an isobutyl group.

(A-4)

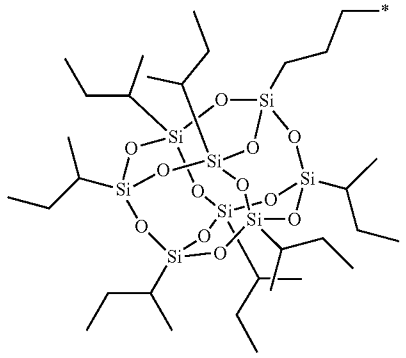

Structure (A-5) in which, in A, $R^3$ is $-CH_2CH_2-$, and $R^4$ is $-CH_2CH_2CF_3$.

(A-5)

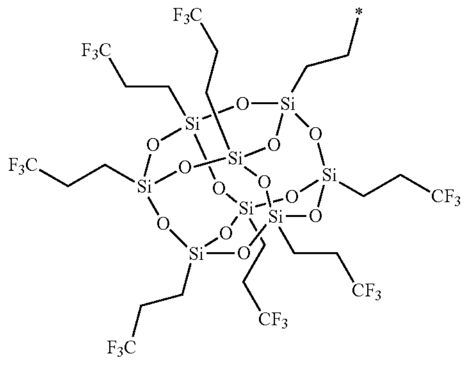

Structure (A-6) in which, in A, $R^3$ is $-CH_2CH_2-$, and $R^4$ is a phenyl group.

(A-6)

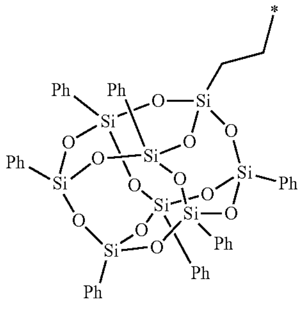

Structure (A-7) in which, in A, $R^3$ is $-CH_2CH_2-$, and $R^4$ is a cyclohexyl group.

(A-7)

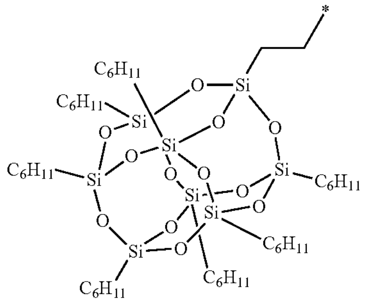

Structure (A-8) in which, in A, $R^3$ is $-CH_2CH_2-$, and $R^4$ is an isobutyl group.

(A-8)

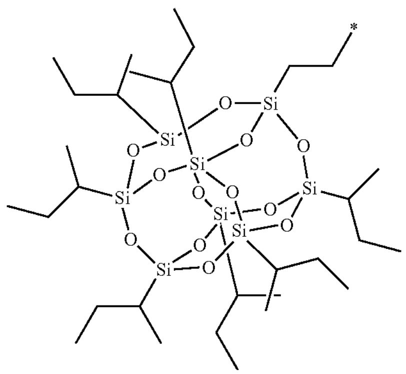

While examples in which $R^3$ is $-CH_2CH_2-$ or $-CH_2CH_2CH_2-$ have been described above, the structure of $R^3$ is not limited thereto. Other preferable examples of $R^3$ include $-CH_2-$,
$-CH_2CH_2CH_2CH_2-$,
$-CH_2CH_2CH_2CH_2CH_2-$,
$-CH_2CH_2CH_2CH_2CH_2CH_2-$,
$-CH_2CH_2CH_2CH_2CH_2CH_2CH_2-$,
$-CH_2CH_2CH_2CH_2CH_2CH_2CH_2CH_2-$,
$-CH_2CH_2CH_2CH_2CH_2CH_2CH_2CH_2CH_2-$,
$-CH_2CH_2CH_2CH_2CH_2CH_2CH_2CH_2CH_2CH_2-$,
$-CH_2CH_2CH_2CH_2CH_2CH_2CH_2CH_2CH_2CH_2CH_2-$,
and
$-CH_2CH_2CH_2CH_2CH_2CH_2CH_2CH_2CH_2CH_2CH_2CH_2-$.

In addition, in addition to the above (A-1) to (A-8), structures in which $R^4$ is a nonafluorohexyl or pentafluorophenyl group may be exemplified, or structures having a fluorinated polyether structure in $R^4$ may be exemplified.

3. Partial Structure of Siloxane Polymer 3-1. ($R^0$)

$R^0$ independently represents an aryl group having 6 to 20 carbons or a cycloalkyl group having 5 to 6 carbons.

Examples of aryl groups having 6 to 20 carbons include a phenyl, naphthyl, anthryl, phenanthryl, triphenylenyl, pyrenyl, chrysenyl, naphthacenyl, and perylenyl group. Among these, a phenyl, naphthyl, anthryl, and phenanthryl group are preferable, and a phenyl, naphthyl and anthryl group are more preferable.

Examples of cycloalkyl groups having 5 to 6 carbons include a cyclopentyl and cyclohexyl group.

In the aryl group having 6 to 20 carbons and the cycloalkyl group having 5 to 6 carbons, arbitrary hydrogen atom may be independently substituted with a fluorine atom or an alkyl group having 1 to 20 carbons.

$R^0$ is preferably a phenyl or cyclohexyl group.

3-2. ($R^1$)

each $R^1$ independently represents a hydrogen atom, an aryl group having 6 to 20 carbons, a cycloalkyl group having 5 to 6 carbons, an arylalkyl group having 7 to 40 carbons, or an alkyl group having 1 to 40 carbons. Examples of aryl groups having 6 to 20 carbons and cycloalkyl groups having 5 to 6 carbons include the same as those described for $R^0$.

Examples of arylalkyl groups having 7 to 40 carbons include a benzyl, phenethyl, diphenylmethyl, triphenylmethyl, 1-naphthylmethyl, 2-naphthylmethyl, 2,2-diphenylethyl, 3-phenylpropyl, 4-phenylbutyl, and 5-phenylpentyl group.

Examples of alkyl groups having 1 to 40 carbons include a methyl, ethyl, n-propyl, iso-propyl, n-butyl, sec-butyl, iso-butyl, tert-butyl, n-pentyl, sec-pentyl, iso-pentyl, tert-pentyl, neopentyl, hexyl, heptyl, octyl, nonyl, dodecyl, and octadecyl group.

In the aryl group in the aryl group having 6 to 20 carbons, the cycloalkyl group having 5 to 6 carbons and the arylalkyl group having 7 to 40 carbons, arbitrary hydrogen atom may be independently substituted with a fluorine atom or an alkyl group having 1 to 20 carbons, and in an alkylene group in the arylalkyl group having 7 to 40 carbons, arbitrary hydrogen atom may be substituted with a fluorine atom, and arbitrary —$CH_2$— may be independently substituted with —O—, —CH═CH—, or a cycloalkylene group having 5 to 20 carbons, and in the alkyl group having 1 to 40 carbons, arbitrary hydrogen atom may be independently substituted with a fluorine atom, and arbitrary —$CH_2$— may be independently substituted with —O— or a cycloalkylene group having 5 to 20 carbons.

$R^1$ is preferably selected from among a hydrogen atom, a phenyl group, a cyclohexyl group, and an alkyl group having 1 to 5 carbons, and more preferably selected from among alkyl groups having 1 to 5 carbons.

3-3. ($R^2$, $R^5$)

$R^2$ and $R^5$ independently represent a hydroxyl group, an aryl group having 6 to 20 carbons, a cycloalkyl group having 5 to 6 carbons, an arylalkyl group having 7 to 40 carbons, or an alkyl group having 1 to 40 carbons.

Examples of aryl groups having 6 to 20 carbons, a cycloalkyl group having 5 to 6 carbons include the same as those described for $R^0$.

Examples of arylalkyl groups having 7 to 40 carbons include the same as those described for $R^1$.

Examples of alkyl groups having 1 to 40 carbons include the same as those described for $R^1$.

In the aryl group in the aryl group having 6 to 20 carbons, the cycloalkyl group having 5 to 6 carbons and the arylalkyl group having 7 to 40 carbons, arbitrary hydrogen atom may be independently substituted with a fluorine atom or an alkyl group having 1 to 20 carbons, and in an alkylene group in the arylalkyl group having 7 to 40 carbons, arbitrary hydrogen atom may be substituted with a fluorine atom, and arbitrary —$CH_2$— may be independently substituted with —O—, —CH═CH—, or a cycloalkylene group having 5 to 20 carbons, and in the alkyl group having 1 to 40 carbons, arbitrary hydrogen atom may be independently substituted with a fluorine atom, and arbitrary —$CH_2$— may be independently substituted with —O— or a cycloalkylene group having 5 to 20 carbons.

$R^2$ and $R^5$ are preferably selected from among a phenyl and cyclohexyl group and an alkyl group having 1 to 40 carbons, and more preferably selected from among alkyl groups having 1 to 5 carbons.

3-4. (p)

The value p represents a real number of 1 or more. In consideration of production, p is preferably 1 or more and 3,000 or less, and more preferably 1 or more and 300 or less.

3-5. (x, y)

The value x is a value that depends on the amount of repeating units having the structure of Formula (2) contained in the main chain of the siloxane polymer, and is 0 when the structure of Formula (2) is not contained. The content of the repeating unit of Formula (2) varies depending on the amount of the moiety corresponding to the same structure prepared as the raw material of the siloxane polymer, and physical properties of the siloxane polymer can be controlled by adjusting this amount. A preferable range of x is 0.5 to 10.

The value y represents a repeating unit (structure represented by Formula (3)) contained in a certain proportion in the intermediate in the step of producing the siloxane polymer of this invention, and the structure of the side chain A is introduced into the —Si—H moiety according to an addition reaction (the method of producing a siloxane polymer of this invention will be described below in detail). Therefore, it is a value that depends on the proportion of the structure of the side chain A introduced. The value of y becomes 0 when the structure of the side chain A is introduced into all of the —Si—H moieties of the intermediate. A preferable range of y is 0.1 to 8.

3-6. (z)

The value z is a value determined according to the amount of the structure of A introduced into the side chain of the siloxane polymer. A preferable range of z is 0.2 to 5.

4. Method of Producing Siloxane Polymer

A method of producing a siloxane polymer of this invention will be described. First, a siloxane polymer having a structure in which the moiety represented by A in the siloxane polymer of this invention is substituted with a hydrogen atom is prepared. This siloxane polymer is referred to as an "intermediate (α)" in this specification. A compound (β) corresponding to the structure of A is introduced into the —Si—H moiety of the intermediate (α) according to an addition reaction, an elimination reaction or a substitution reaction.

For example, as in the following reaction formula, a siloxane polymer can be produced by introducing the compound represented by Formula (β) into the siloxane polymer intermediate represented by Formula (α) according to an addition reaction.

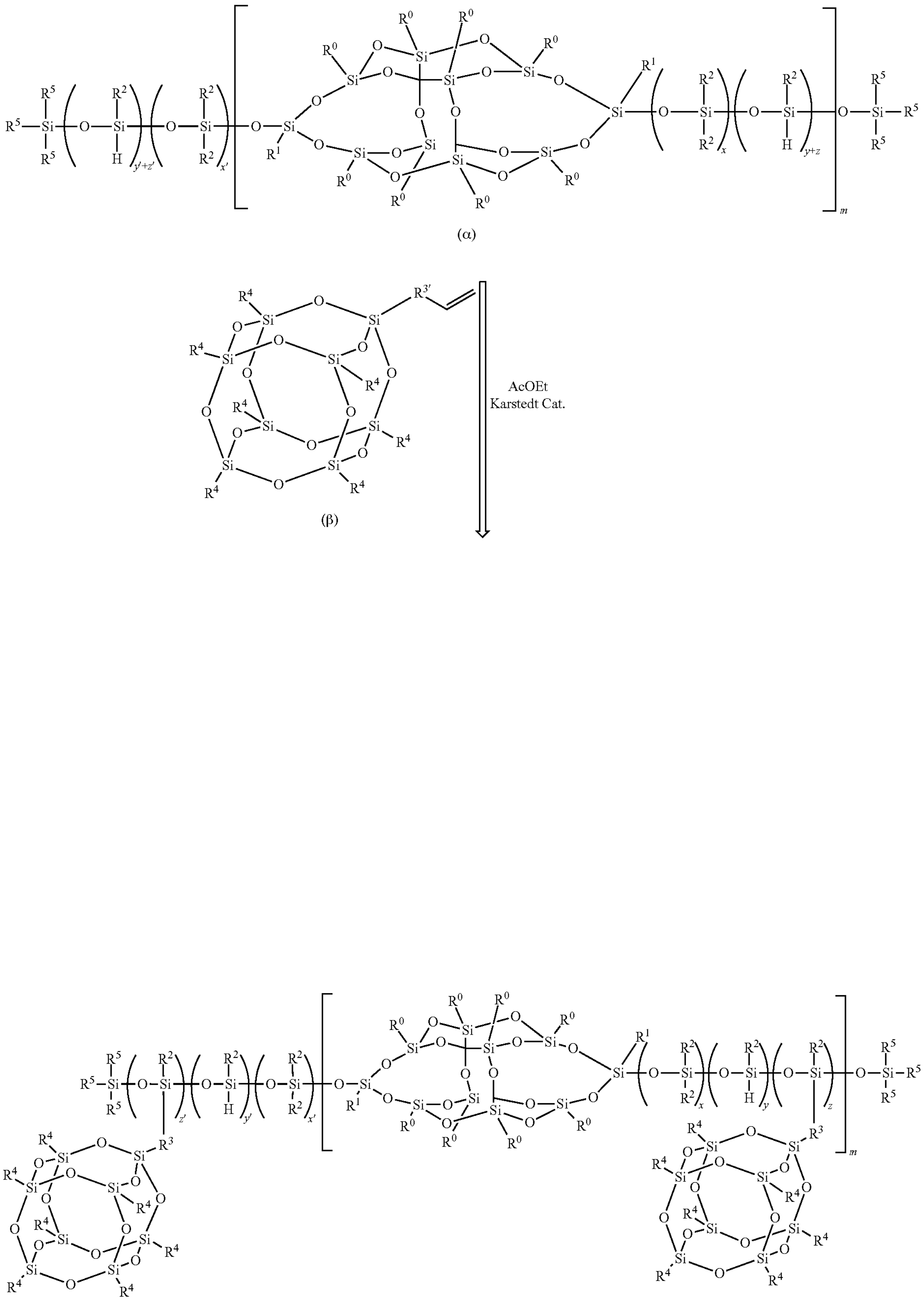
(α)
(β)

The compound (β) corresponds to the side chain A, and in this example, the terminal double bond undergoes an addition reaction with silicon atoms of the siloxane polymer intermediate (α). In this example, the structure of $R^{3'}$ of the compound (β) is a structure in which two carbon atoms are reduced from $R^3$ (two carbon atoms form $—CH{=}CH_2$ and participate in an addition reaction).

The compounds (β) corresponding to the above side chains A(A-1) to (A-8) are the following (β-1) to (β-8).

(β-1)

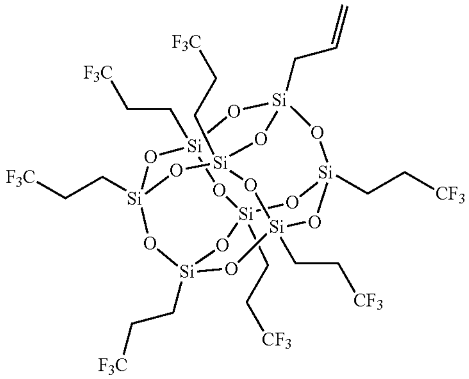

(β-2)

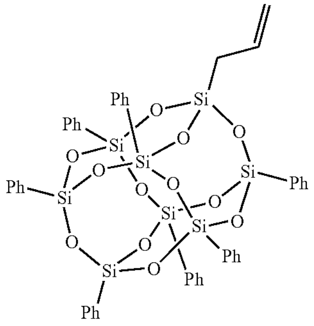

(β-3)

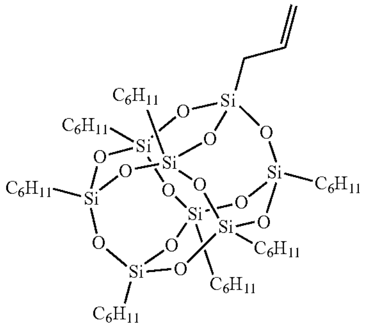

(β-4)

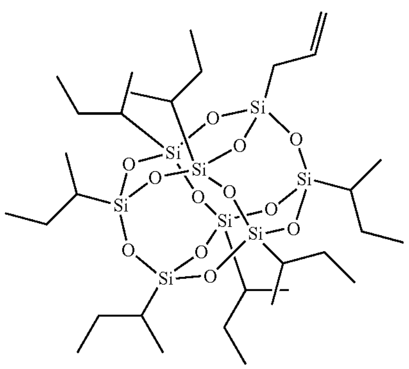

-continued (β-5)

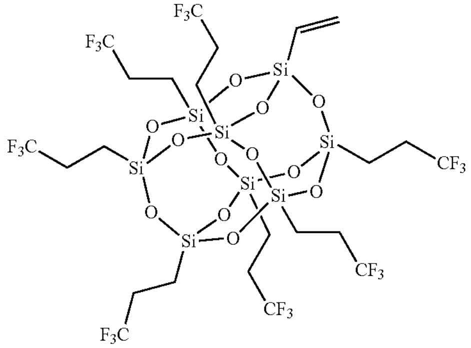

(β-6)

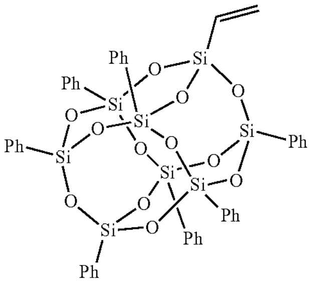

(β-7)

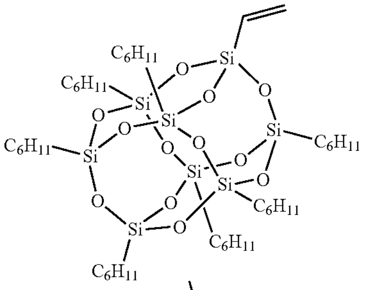

(β-8)

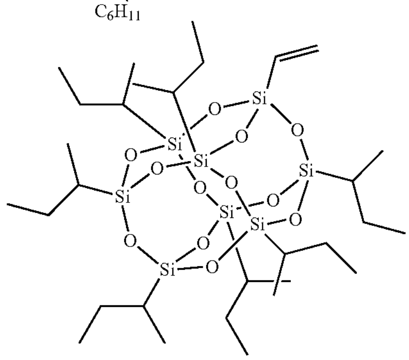

In the above examples, cases in which the structure of the moiety corresponding to $R^3$ in the compound β is $—CH{=}CH_2$ and $—CH_2CH{=}CH_2$ have been exemplified, but when it is desired to introduce an alkylene group having 4 to 12 carbons as $R^3$, the following groups correspond thereto.

$—CH_2CH_2CH{=}CH_2$,
$—CH_2CH_2CH_2CH{=}CH_2$,
$—CH_2CH_2CH_2CH_2CH{=}CH_2$,
$—CH_2CH_2CH_2CH_2CH_2CH{=}CH_2$,
$—CH_2CH_2CH_2CH_2CH_2CH_2CH{=}CH_2$,
$—CH_2CH_2CH_2CH_2CH_2CH_2CH_2CH{=}CH_2$,
$—CH_2CH_2CH_2CH_2CH_2CH_2CH_2CH_2CH{=}CH_2$,
$—CH_2CH_2CH_2CH_2CH_2CH_2CH_2CH_2CH_2CH{=}CH_2$, and
$—CH_2CH_2CH_2CH_2CH_2CH_2CH_2CH_2CH_2CH_2CH{=}CH_2$.

The siloxane polymer of this invention can be produced according to an addition reaction between these compounds (β) and a siloxane polymer intermediate (α). As a preferable example of the addition reaction, a hydrosilylation reaction using a Karstedt's catalyst is known.

In addition, when a side chain in which $R^3$ is —$CH_2$— is introduced, the following compounds can be selected as raw materials for (β).

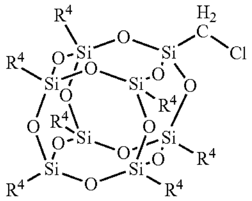

($\beta_{C1\text{-}Cl}$)

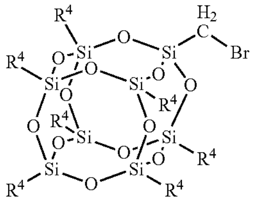

($\beta_{C1\text{-}Br}$)

In addition, when a side chain in which $R^3$ is —O— is introduced, the siloxane polymer can be produced by introducing a compound represented by the compound (β) into the siloxane polymer intermediate (α) according to a dehydrogenation reaction as in the following reaction formula.

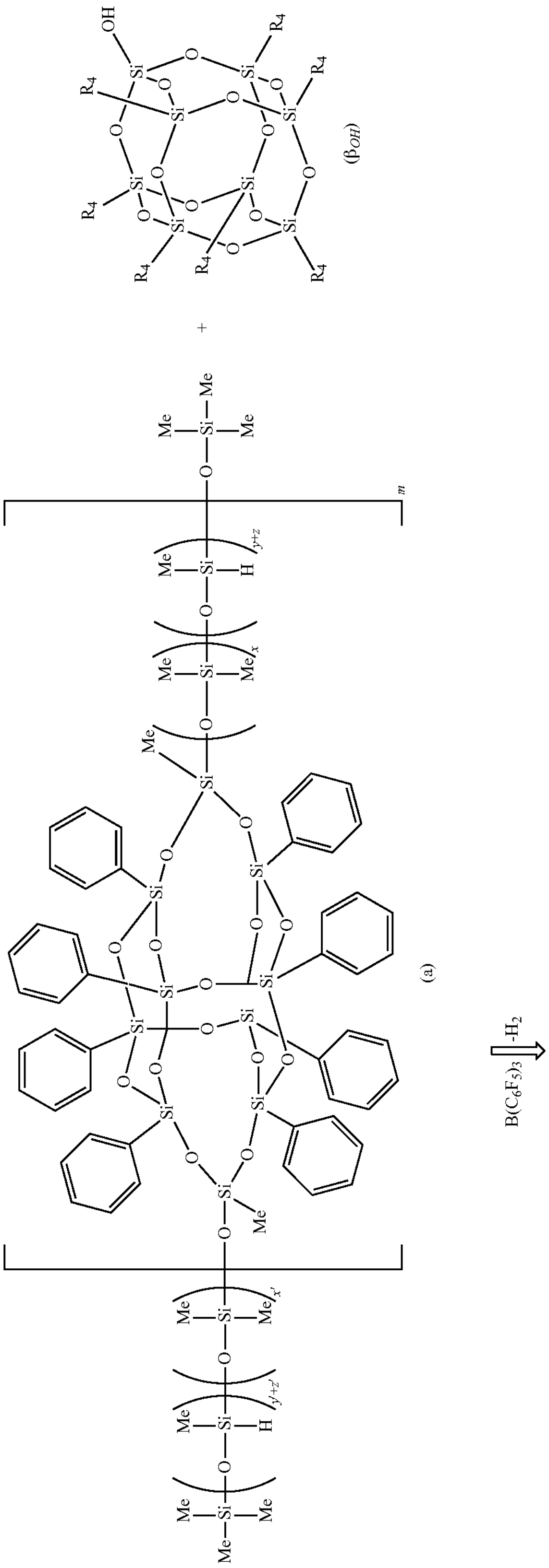
(a)
($\beta_{OH}$)

-continued
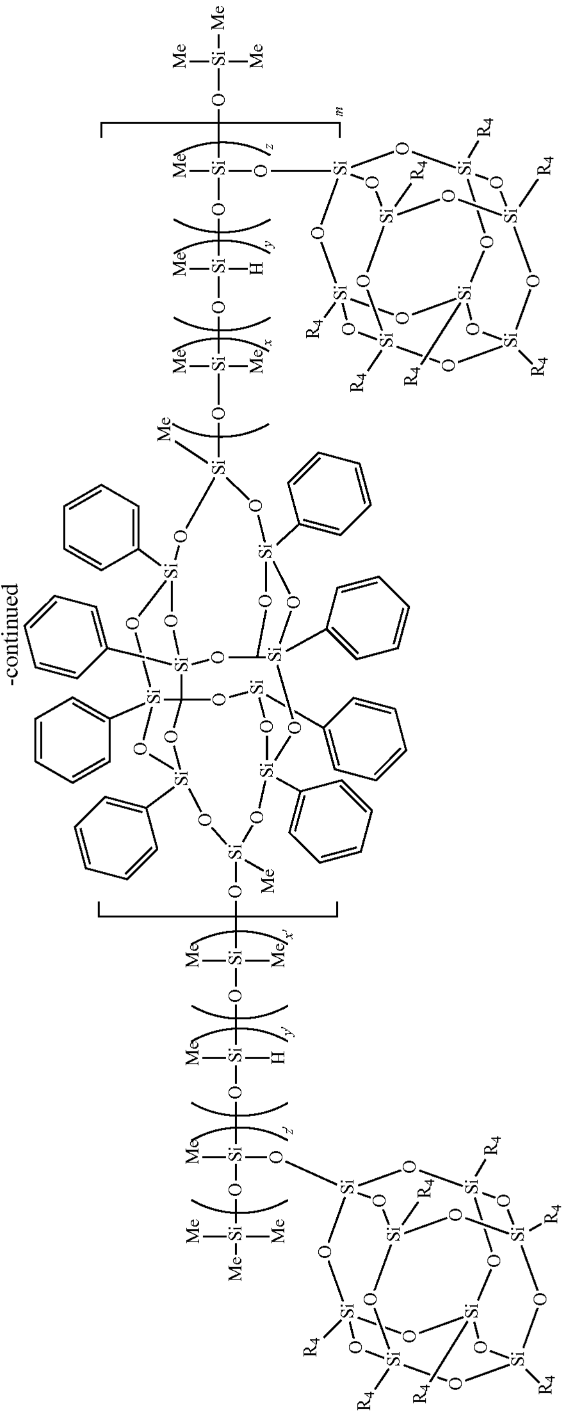

The above compound ($\beta_{OH}$) corresponds to the side chain A, and in this example, the terminal silanol group undergoes a dehydrogenation reaction with the hydrosilyl group of the siloxane polymer intermediate ($\alpha$) in the presence of a boron compound catalyst.

In addition, the siloxane polymer of this invention can be produced according to an elimination reaction or a substitution reaction between the siloxane polymer intermediate ($\alpha_{OH}$) in which some of $R^2$'s are hydroxyl groups and the compound ($\beta$).

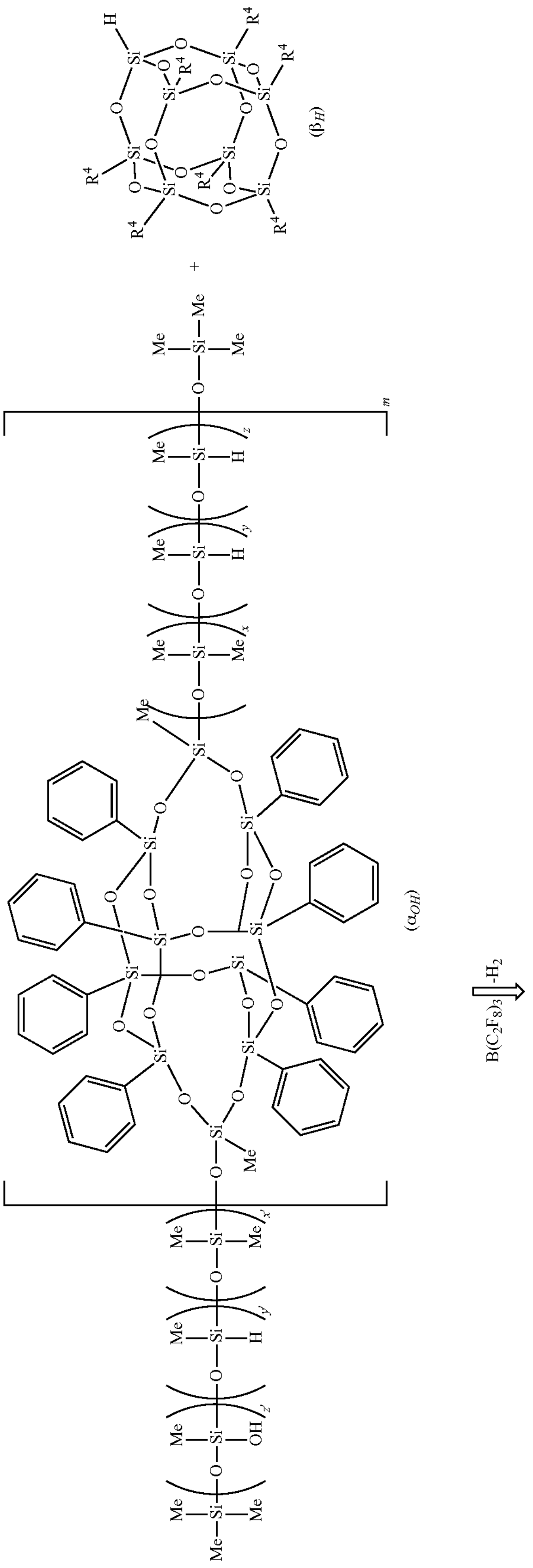
($\alpha_{OH}$) ($\beta_H$)

-continued
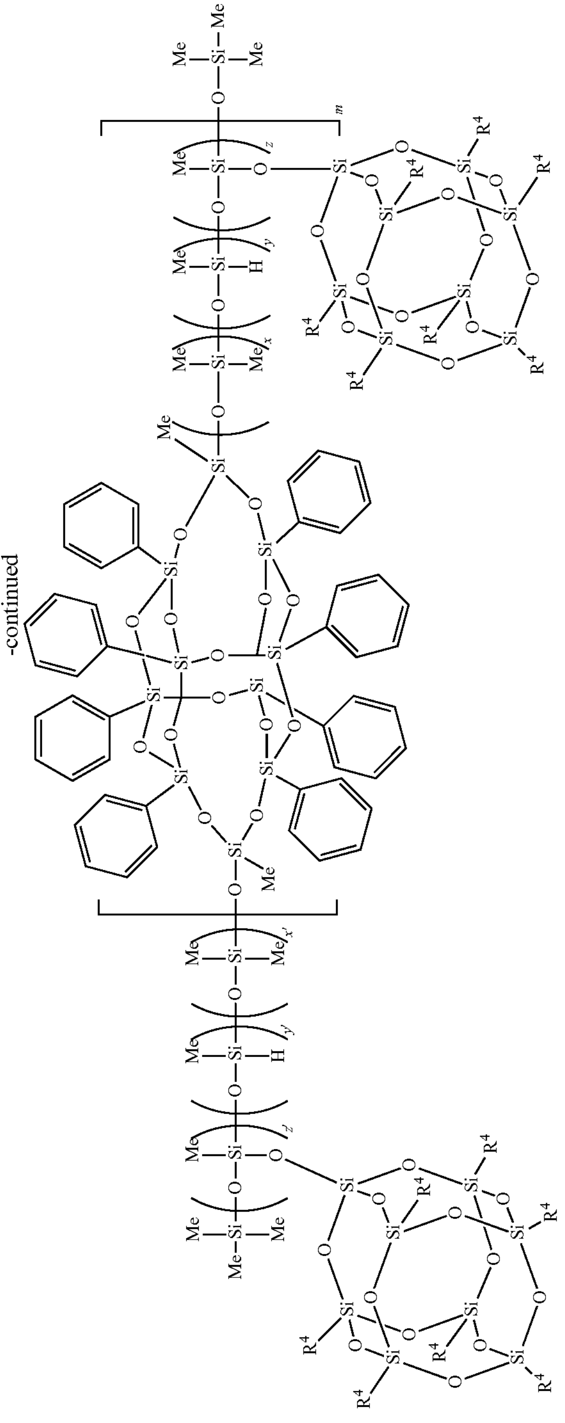

The compound ($\beta_H$) corresponds to the side chain A, and in this example, the terminal hydrosilyl group undergoes a dehydrogenation reaction with the silanol group of the siloxane polymer intermediate ($\alpha_{OH}$) in the presence of a boron compound catalyst.

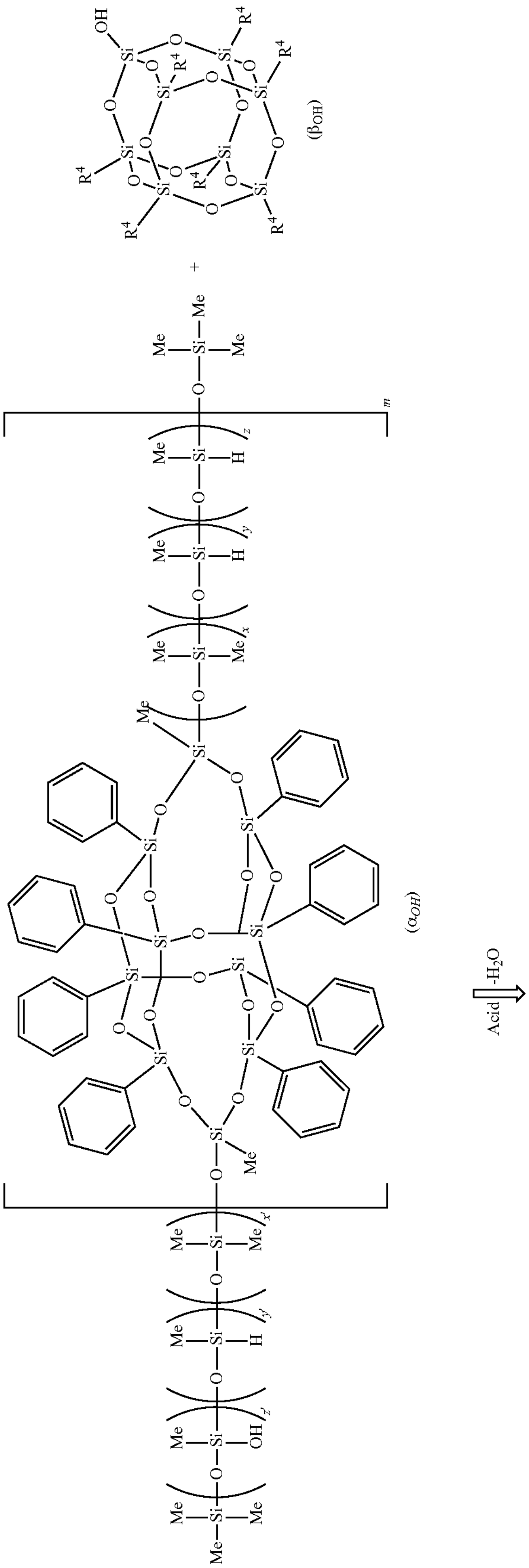
($\alpha_{OH}$)
($\beta_{OH}$)

-continued
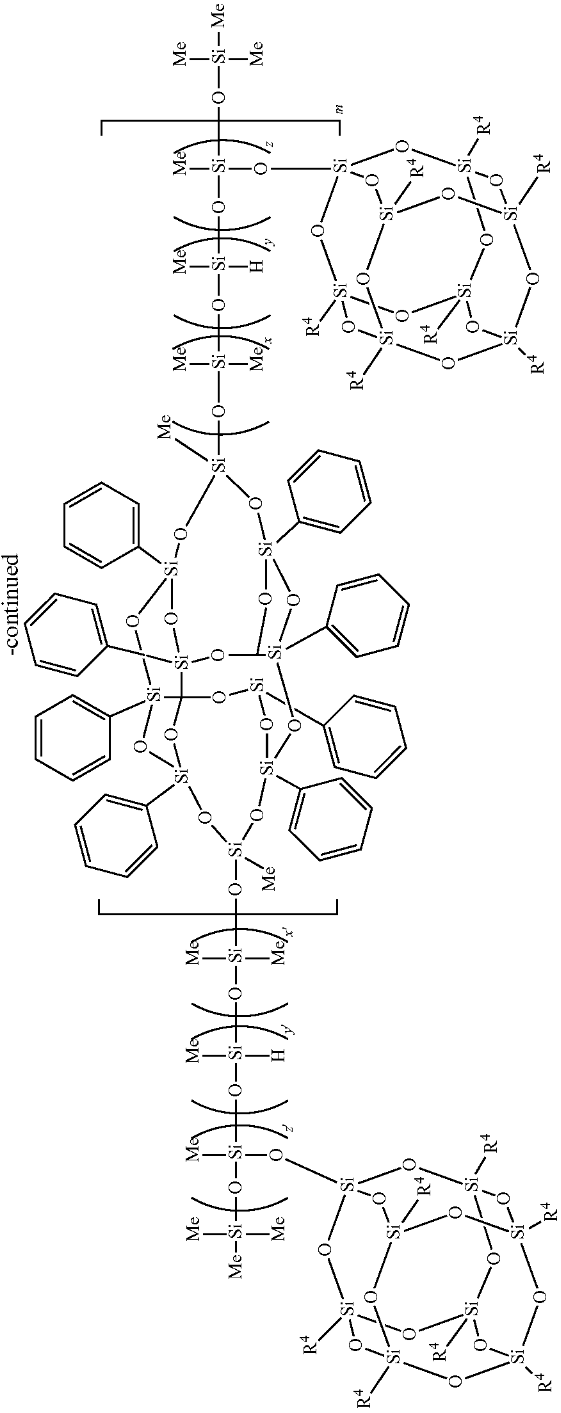

The compound ($\beta_{OH}$) corresponds to the side chain A, and in this example, the terminal silanol group undergoes a dehydration condensation with the silanol group of the siloxane polymer intermediate ($\alpha_{OH}$) under acidic conditions.

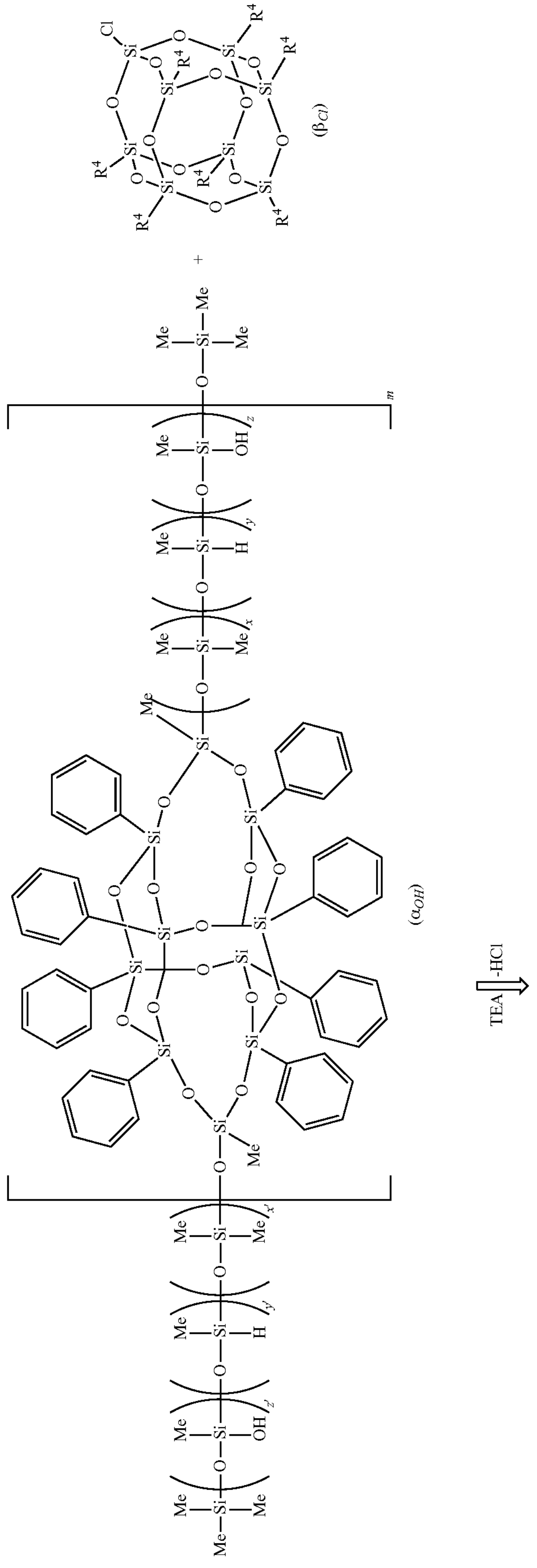
($\alpha_{OH}$)
($\beta_{Cl}$)

-continued
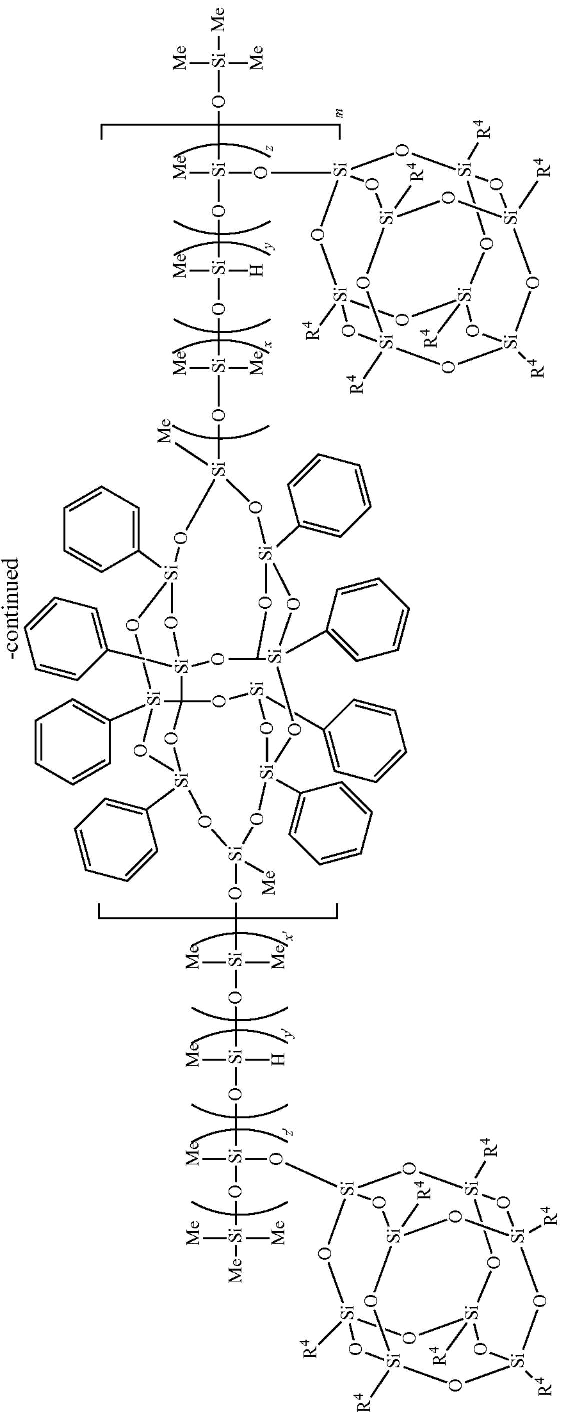

The compound ($\beta_{Cl}$) corresponds to the side chain A, and in this example, the terminal chlorosilane undergoes a dehydrochlorination reaction with the silanol group of the siloxane polymer intermediate ($\alpha_{OH}$). This reaction can be easily promoted by adding a compound having an amino group such as trimethylamine (TEA) or an organic compound exhibiting basicity.

4-1-a. Siloxane Polymer Intermediate ($\alpha$)

The siloxane polymer intermediate ($\alpha$) (hereinafter simply referred to as an "intermediate ($\alpha$)") is useful as a raw material for producing the siloxane polymer of this invention. In addition, as will be described below, the intermediate ($\alpha$) can also be used as a raw material for producing the intermediate ($\alpha_{OH}$) by converting hydrogen atoms of Si—H into silanol groups in the presence of a transition metal catalyst. In addition, the intermediate ($\alpha$) itself is not only an "intermediate" but also a material that is used after being cured. Therefore, the intermediate ($\alpha$) can also be regarded as a useful invention.

Here, when the intermediate ($\alpha$) is regarded as an invention, it is redefined as a siloxane polymer ($\alpha'$) as follows.

[1'] is a siloxane polymer ($\alpha'$) having repeating units represented by Formulae (1), (2) and (4H) and terminal groups represented by Formulae (5L) and (5R) at left and right terminals:

(1)

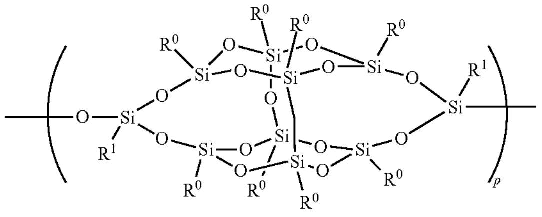

(2)

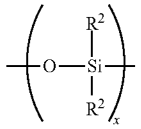

($4_H$)

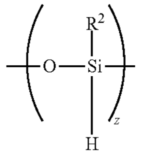

(5L)

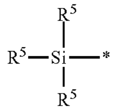

(5R)

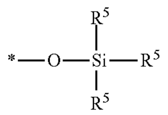

Formula (5L) represents a terminal group bonded to the left side of the formula and Formula (5R) represents a terminal group bonded to the right side;

each $R^0$ independently represents an aryl group having 6 to 20 carbons or a cycloalkyl group having 5 to 6 carbons, and in the aryl group having 6 to 20 carbons and the cycloalkyl group having 5 to 6 carbons, arbitrary hydrogen atom may be independently substituted with a fluorine atom or an alkyl group having 1 to 20 carbons;

each $R^1$ independently represents a hydrogen atom, an aryl group having 6 to 20 carbons, a cycloalkyl group having 5 to 6 carbons, an arylalkyl group having 7 to 40 carbons, or an alkyl group having 1 to 40 carbons, and in the aryl group in the aryl group having 6 to 20 carbons, the cycloalkyl group having 5 to 6 carbons and the arylalkyl group having 7 to 40 carbons, arbitrary hydrogen atom may be independently substituted with a fluorine atom or an alkyl group having 1 to 20 carbons, and in an alkylene group in the arylalkyl group having 7 to 40 carbons, arbitrary hydrogen atom may be substituted with a fluorine atom, and arbitrary $—CH_2—$ may be independently substituted with —O—, —CH═CH—, or a cycloalkylene group having 5 to 20 carbons, and in the alkyl group having 1 to 40 carbons, arbitrary hydrogen atom may be independently substituted with a fluorine atom, and arbitrary $—CH_2—$ may be independently substituted with —O— or a cycloalkylene group having 5 to 20 carbons;

each $R^2$ independently represents a hydroxyl group, an aryl group having 6 to 20 carbons, a cycloalkyl group having 5 to 6 carbons, an arylalkyl group having 7 to 40 carbons, or an alkyl group having 1 to 40 carbons, and in the aryl group in the aryl group having 6 to 20 carbons, the cycloalkyl group having 5 to 6 carbons and the arylalkyl group having 7 to 40 carbons, arbitrary hydrogen atom may be independently substituted with a fluorine atom or an alkyl group having 1 to 20 carbons, and in an alkylene group in the arylalkyl group having 7 to 40 carbons, arbitrary hydrogen atom may be substituted with a fluorine atom, and arbitrary $—CH_2—$ may be independently substituted with —O—, —CH═CH—, or a cycloalkylene group having 5 to 20 carbons, and in the alkyl group having 1 to 40 carbons, arbitrary hydrogen atom may be independently substituted with a fluorine atom, and arbitrary $—CH_2—$ may be independently substituted with —O— or a cycloalkylene group having 5 to 20 carbons;

each $R^5$ independently represents a crosslinkable functional group which is a hydroxyl group, hydrogen or an alkenyl group having 2 to 40 carbons, an alkyl group having 1 to 40 carbons, a halogen atom, an acyl group having 1 to 15 carbons, an alkoxyl group having 1 to 15 carbons, an oxime having 1 to 15 carbons, an amino group which may have a substituent, an amide having 1 to 15 carbons which may have a substituent, an aminoxy group which may have a substituent, or a vinyl alcohol residue having 2 to 15 carbons which may have a substituent, and in the amino and aminoxy groups which have a substituent, the substituent has 1 to 15 carbons;

p represents a real number of 1 or more, and x and z each independently represent a positive real number; and

* indicates a binding position.

[2'] is the siloxane polymer (α') of [1'] which includes repeating unit(s) represented by Formula ($2+4_H$) and/or ($4_H+2$):

($2+4_H$)

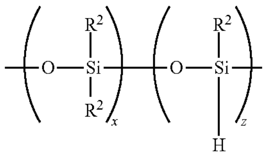

($4_H+2$)

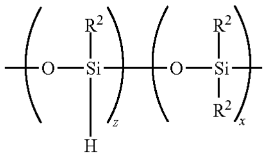

wherein $R^2$ represents the same as $R^2$ in Formula ($4_H$) in [1']; and x independently represents 0 or a positive real number, and z independently represents a positive real number.

[3'] is the siloxane polymer (α') of [1'] or [2'] in which each $R^2$ independently represents methyl or phenyl.

[4'] is the siloxane polymer (α') of any one of [1'] to [3'] which has a weight average molecular weight of 2,000 to 10,000,000.

[5'] is a siloxane polymer composition including: the siloxane polymer (α') of any one of [1'] to [4'], and a solvent.

[6'] is a molded article obtained by curing the siloxane polymer (α') of any one of [1'] to [4'] or the siloxane polymer composition of [5'].

[7'] is the molded article of [6'] which has electric insulation.

[8'] is a molded article including: a cured product obtained by curing the siloxane polymer (α') of any one of [1'] to [4'] or the siloxane polymer composition of [5'], and a base covered by the cured product.

[9'] is the molded article of claim [8'] which has electric insulation.

The effects of the siloxane polymer (α') as an invention may include not only provision of a siloxane polymer (α') containing a silsesquioxane unit and a chain siloxane unit in the main chain and a method of producing the siloxane polymer (α') but also obtaining a cured film having excellent heat resistance by applying a composition in which the siloxane polymer (α') is dissolved in an organic solvent to a base, heating and curing with Si—H groups serving as crosslinking points. In addition, since the siloxane polymer (α') allows functional groups to be introduced into Si—H groups, it is also useful as an intermediate for producing a siloxane polymer of which heat resistance and mechanical properties can be controlled to a high degree.

4-1-b. Method of Producing Intermediate (α)

Regarding the method of producing an intermediate (α), many examples are known, and for example, the following compound <A>, compound <B>, and compound <C> are obtained by equilibrium polymerization in the presence of an acid catalyst. The compound <A> can be obtained by reacting the following compound <D> with the compound <E> or the compound <F>, and additionally performing hydrolysis (for example, refer to paragraph 0032 in Japanese Patent Laid-Open No. 2006-022207). However, specific structures of the intermediate (α) or the siloxane polymer (α') are not known.

<A>

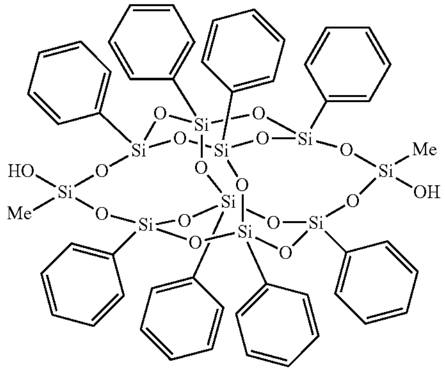

<B>

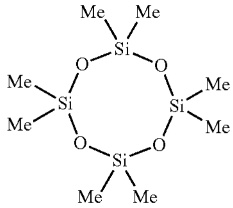

<C>

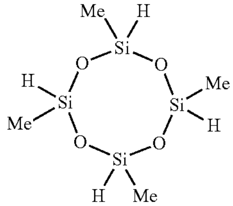

<D>

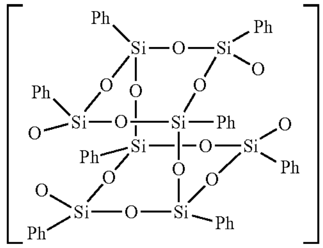

4 Na

<E>

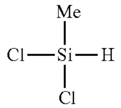

<F>

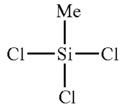

4-2. Method of Producing Intermediate ($\alpha_{OH}$)

Regarding the method of producing an intermediate ($\alpha_{OH}$), and for example, it can be produced by converting the intermediate (α) into silanol groups in the presence of a transition metal catalyst.

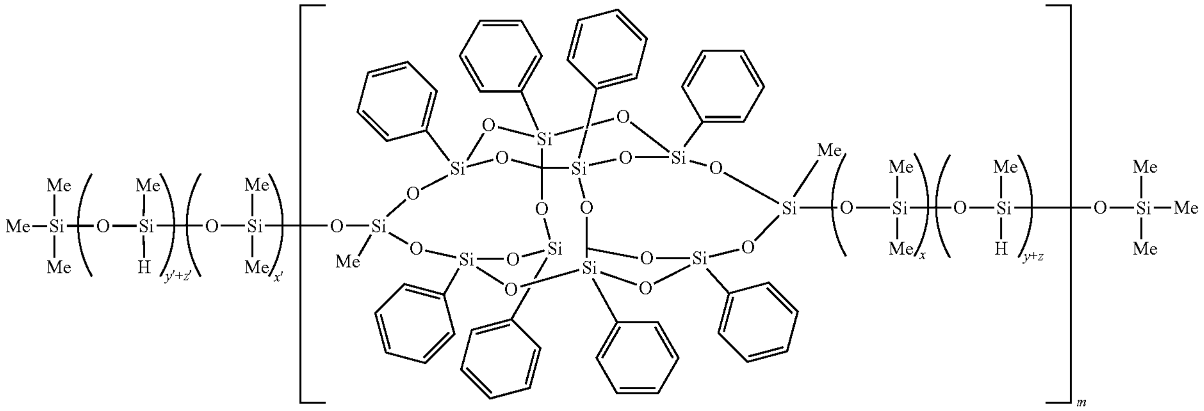
(α)
Pd(OH)$_2$/C
THF/H$_2$O
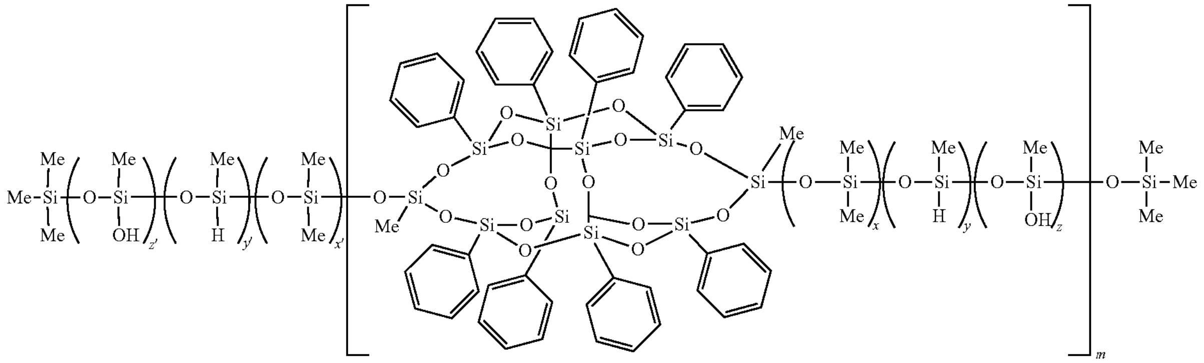
($\alpha_{OH}$)
4-3. Method of Producing Compound (β)
A method of producing a compound (β) will be described.
The compound (β) can be produced by reacting a compound (β-0) with allyltrichlorosilane.
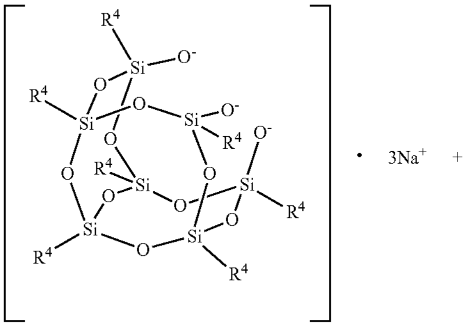
(β-0)
-continued
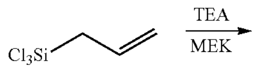
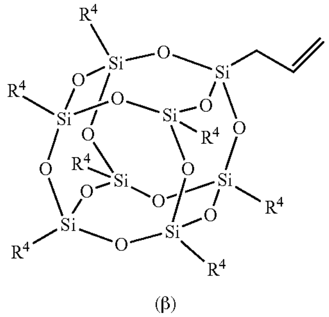
(β)
The compound ($\beta_{OH}$) can be produced by hydrolyzing the compound (β-0).

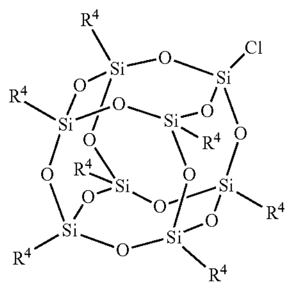

(βCl)

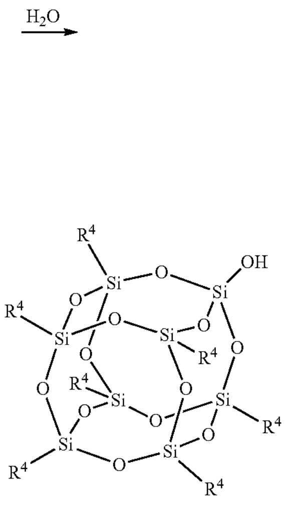

(βOH)

The compound ($\beta_{Cl}$) can be produced by reacting the compound (β-0) with tetrachlorosilane.

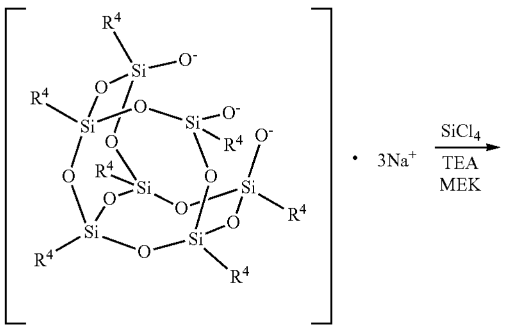

(β-0)

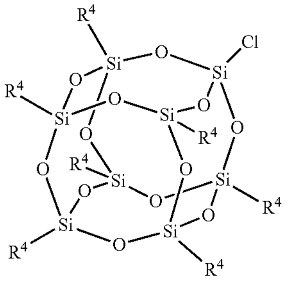

(βCl)

The compound ($\beta_H$) can be produced by reacting the compound (β-0) with trichlorosilane.

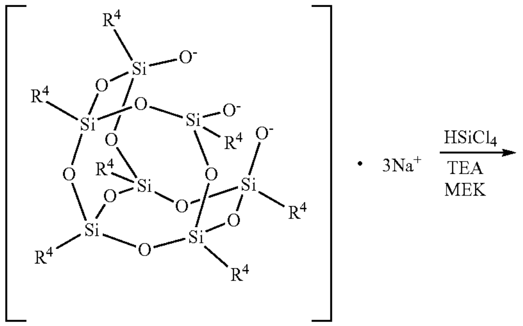

(β-0)

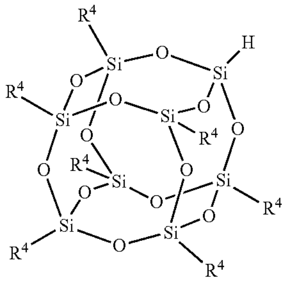

(βH)

Regarding the method of producing a compound (β-0), many examples are known, and for example, the compound (β-0) can be produced by hydrolyzing and polycondensing trifluoropropyltrimethoxysilane in the presence of an alkali metal hydroxide.

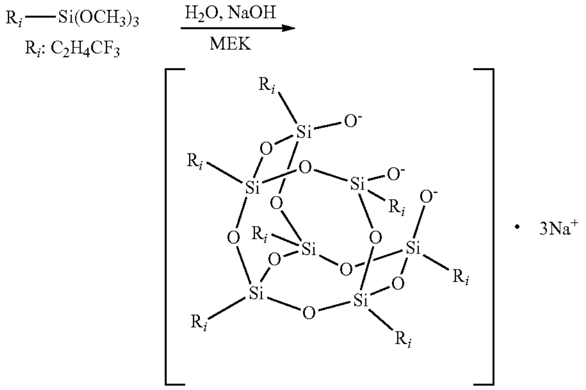

(β-0)

These production methods are described in, for example, paragraph 32 in Japanese Patent Laid-Open No. 2005-15738.

5. Solvent

The siloxane polymer of this invention can be used as a siloxane polymer composition that further contains a solvent. Such a solvent is preferably a solvent that can dissolve the siloxane polymer, which is a solvent that does not condense with a crosslinkable silicon compound or a crosslinkable compound. Examples of such solvents include hydrocarbon solvents such as hexane and heptane, aromatic hydrocarbon solvents such as benzene, toluene, and xylene, ether solvents such as diethyl ether, tetrahydrofuran (THF), and dioxane, halogenated hydrocarbon solvents such as methylene chloride, and carbon tetrachloride, and ester solvents such as ethyl acetate. The solvent may be a single solvent or two or more solvents. For the content of the solvent, for example, in consideration of coatability, the content of the siloxane polymer is preferably an amount of 20 to 80 mass %, more preferably an amount of 30 to 70 mass %, and still more preferably an amount of 40 to 60 mass %.

6. Fired Product and Film

When the siloxane polymer composition containing the siloxane polymer of this invention or a solvent is fired, a highly transparent and flexible fired product with a low coefficient of thermal expansion can be obtained. The firing temperature is preferably 150 to 250° C. This fired product can be used as a film.

For firing, specifically, after the siloxane polymer composition is applied to the base, heating may be performed using an oven or the like.

The firing temperature and time are not particularly limited as long as the siloxane polymer can be made into a film (self-supporting film). The fired siloxane polymer can be cooled and then peeled off from the base as a film.

The base is not particularly limited as long as it can withstand the firing temperature, and the film formed on the base can be peeled off from the base and taken out as a self-supporting film, and for example, glass substrates such as quartz, barium borosilicate glass, and aluminoborosilicate glass; calcium fluoride substrates; metal oxide substrates such as ITO (indium oxidetin); ceramic substrates; plastic films such as a polycarbonate (PC) film, a silicone film, a polyethylene terephthalate (PET) film, a polyethylene naphthalate (PEN) film, a cycloolefin polymer (COP) film, a polypropylene film, a polyethylene film, an acrylic polymer film, a polyvinyl alcohol film, a triacetyl cellulose film, and a polyimide (PI) film; fluororesin substrates such as polytetrafluoroethylene (PTFE) and perfluoroalkoxyalkane (PFA); laminated substrates obtained by applying a fluororesin to glass or the like; and metal substrates such as SUS and copper can be used.

EXAMPLES

Hereinafter, this invention will be described in more detail with reference to examples, but the scope of this invention is not limited by these descriptions.

Measurements in examples were performed as follows.

GPC gel Permeation Chromatography

<Measurement Conditions>

- column: Shodex KF-804L 300×8.0 mm (commercially available from Showa Denko K.K.) Shodex KF-805L 300×8.0 mm two columns in series (commercially available from Showa Denko K.K.)
- mobile phase: THF
- flow rate: 1.0 ml/min
- temperature: 40° C.
- detector: RI
- molecular weight standard sample: polymethyl methacrylate resin (PMMA) with a known molecular weight DMA Dynamic Viscoelasticity Measurement <Measurement Conditions>

- Hitachi High-Tech Corporation DMS6100
- 5° C./min, sample area 10 mm×1 mm
- load 10 mN, measurement frequency 10 Hz TMA Thermomechanical Analysis <Measurement Conditions>

- Hitachi High-Tech Corporation SS/TMA6100
- tension mode, 10° C./min, length 20 mm, cross-sectional area 0.3 $mm^2$
- load 9.8 mN TG-DTA Thermogravimetric Differential Thermal Analysis <Measurement Conditions>

- measurement device: Seiko Instruments EXSTAR6000 TG/DTA6300
- pan: Pt
- standard sample: aluminium oxide (10 mg)
- sample mass: about 10 mg
- temperature program: 25 to 800° C.
- temperature increase rate: 10° C./min Total light transmittance: the total light transmittance was measured using a haze meter NDH5000 (commercially available from Nippon Denshoku Industries Co., Ltd.) according to JISK 7361-1.

HAZE: the HAZE (cloudiness, haze) was measured using a haze meter NDH5000 (commercially available from Nippon Denshoku Industries Co., Ltd.) according to JIS K7136.

Glass transition temperature: the temperature at the peak top of the loss elastic modulus (E") in dynamic viscoelasticity measurement by DMA.

Crosslink density: the crosslink density was calculated by the calculation formula represented by Formula (1).

$$n=E'/3RT \qquad (1)$$

In Formula (1), n: crosslink density (mol/m3), E': storage modulus (Pa), R: gas constant ((Pa·m3)/K·mol)), T: temperature (K)

Coefficient of linear expansion (CTE): measured by TMA. Coefficient of linear expansion calculated from the results of the 1st scan (first temperature increase, temperature increase rate: 10° C./min) TMA in a temperature range of 40° C. to 250° C.

Thermal decomposition temperature (To): measured by TG-DTA. The temperature at which 5% weight loss occurred.

Elastic modulus: measured using a tensilon universal testing machine RTF-1310 (commercially available from A&D Co., Ltd.) according to a tensile test at a tensile speed of 5 mm/min and room temperature. The tangent to the maximum slope of the stress/strain curve before the film was plastically deformed, using No. 8 dumbbell for test piece preparation.

Maximum stress: measured using a tensilon universal testing machine RTF-1310 (commercially available from A&D Co., Ltd.) according to a tensile test at a tensile speed of 5 mm/min and room temperature. The maximum value of stress measured until the test piece broken, using No. 8 dumbbell for test piece preparation.

Volume resistivity: using Femto/Picoammeter B2981A, controller GP-32, controller GP-HV, and test fixture N1259A (commercially available from Keysight Technologies), the volume resistivity was calculated from the resistance value when the applied voltage was 250 V. As the test piece, a substrate obtained by forming a siloxane polymer into a film on a Cr-plated substrate using a spin coater and performing firing, and then vapor-depositing Al was used.

Siloxane polymers were produced according to the following reaction formulae (Examples 1 to 3), and physical properties were evaluated. A solution of the obtained siloxane polymer with the composition shown in Table 3 was prepared, applied onto the base coated with a fluororesin, and heated at a temperature of 180° C. or higher for 3 hours or longer, and the cooled film was then peeled off from the base to obtain a self-supporting film.

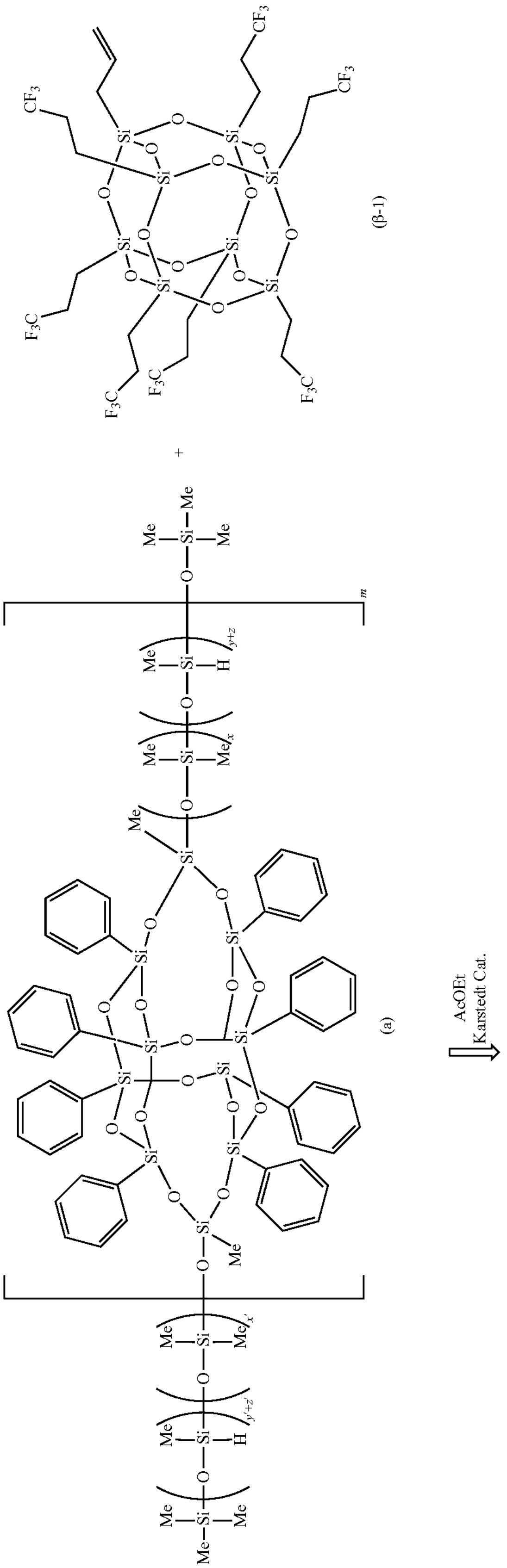
(a)
(β-1)

-continued
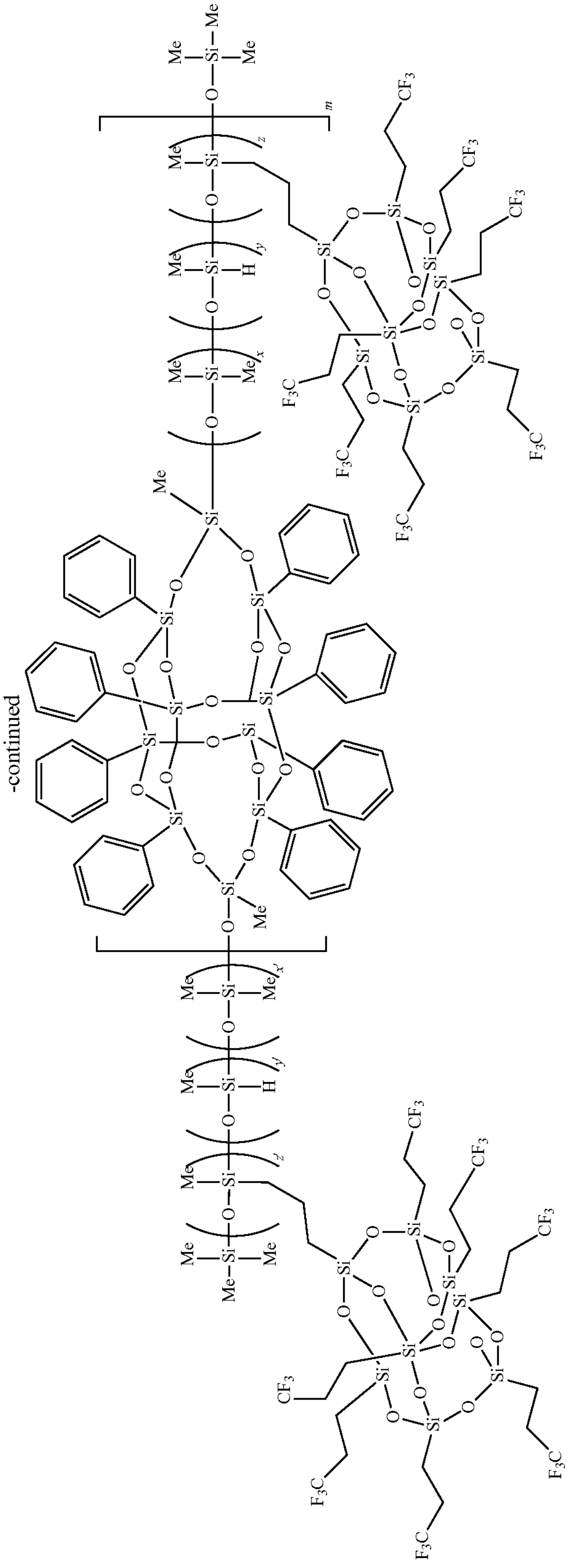

Table 1 shows the relationship of x, y and z in the intermediate (α), the compound (β-1) and the product in Examples 1 to 3.

TABLE 1

| Example | (α) | (β-1) | product |
|---|---|---|---|
| 1 | x = 3.2 on average, y + z = 0.8 on average | 0.5 times mol of y + z of intermediate (α) | (x = 3.2, y: 0.41, z: 0.39) z: 7.6% of all units |
| 2 | Same as above | 0.7 times mol of y + z of intermediate (α) | (x = 3.2, y: 0.24, z: 0.56) z: 11.2% of all units |
| 3 | x = 2.1 on average, y + z = 2.0 on average | 0.6 times mol of y + z of intermediate (α) | (x = 2.1, y: 0.79, z: 1.21) z: 23.7% of all units |

Example 1

5 g of the compound (α), 1.5 g of the compound (β-1), and 15.0 g of ethyl acetate were put into a 100 mL 4-necked round-bottom flask, a thermometer, a reflux tube, a stirrer, and an oil bath were set, and stirring was performed and nitrogen was flowed. At 70° C., 2.1 μL of Pt-VTSC×3.0 (commercially available from Umicore Japan) was added, and the mixture was stirred at a reflux temperature for 5 hours. After cooling to room temperature, 2.8 g of activated carbon was added, and the mixture was stirred overnight. The activated carbon was filtered off and the filtrate was concentrated at 50° C. PGMEA was added to the concentrate, ethyl acetate was removed by concentration under a reduced pressure to obtain 10.9 g of a solution (A) having a solid content concentration of 60%.

The molecular weight of (A) was measured through GPC. The weight average molecular weight Mw was 47,000, and the polydispersity Mw/Mn was 4.0. Average values of (x, y, z) were calculated through $^1$H-NMR and $^{29}$Si-NMR measurement, and x was 3.2 on average, y was 0.41 on average, and z was 0.39 on average.

($^1$H-NMR Measurement Results)

$^1$H-NMR (400 MHz, $CO(CD_3)_2$) δ: 7.17 to 7.66 (Ph), 4.65 to 4.74 (Si—H), 2.34 ($CF_3C\underline{H_2}$), 1.51 to 1.60 ($CH_2$), 1.02 ($CF_3CH_2C\underline{H_2}$), 0.65 to 0.87 ($CH_2$), 0.27 to 0.41 ($O_3SiMe$), −0.04 to 0.13 ($O_2SiMe_2$).

($^{29}$Si-NMR Measurement Results)

$^{29}$Si-NMR (99 MHz, $CO(CD_3)_2$) δ: 9.9, −21.9 to −18.3, −37.6.9 to −34.8, −65.0 to −64.0, −67.2 to −66.8, −67.6 to −67.2, −70.1, −79.6 to −78.6

Example 2

5 g of the compound (α), 2.2 g of the compound (β-1), and 16.0 g of ethyl acetate were put into a 100 mL 4-necked round-bottom flask, a thermometer, a reflux tube, a stirrer, and an oil bath were set, and stirring was performed and nitrogen was flowed. At 70° C., 2.1 μL of Pt-VTSC×3.0 (commercially available from Umicore Japan) was added, and the mixture was stirred at a reflux temperature for 5 hours. After cooling to room temperature, 5.0 g of activated carbon was added, and the mixture was stirred overnight. The activated carbon was filtered off and the filtrate was concentrated at 50° C. PGMEA was added to the concentrate, ethyl acetate was removed by concentration under a reduced pressure to obtain 11.6 g a solution (B) having a solid content concentration of 60%.

The molecular weight of (B) was measured through GPC. The weight average molecular weight Mw was 128,000, and the polydispersity Mw/Mn was 4.0. Average values of (x, y, z) were calculated through $^1$H-NMR and $^{29}$Si-NMR measurement, and x was 3.2 on average, y was 0.24 on average, and z was 0.56 on average.

($^1$H-NMR Measurement Results)

$^1$H-NMR (400 MHz, $CO(CD_3)_2$) S: 7.17 to 7.65 (Ph), 4.64 to 4.82 (Si—H), 2.33 ($CF_3C\underline{H_2}$), 1.49 to 1.58 ($CH_2$), 1.01 ($CF_3CH_2C\underline{H_2}$), 0.61 to 0.89 ($CH_2$), 0.26 to 0.39 ($O_3SiMe$), −0.06 to 0.12 ($O_2SiMe_2$).

($^{29}$Si-NMR Measurement Results)

$^{29}$Si-NMR (99 MHz, $CO(CD_3)_2$) δ: 9.9, −21.9 to −18.5, −37.6.9 to −34.8, −65.0 to −64.0, −66.4 to −66.1, −67.7 to −67.2, −70.1, −79.6 to −78.6

Example 3

5 g of the compound (α), 4.4 g of the compound (β-1), and 22.0 g of ethyl acetate were put into a 100 mL 4-necked round-bottom flask, a thermometer, a reflux tube, a stirrer, and an oil bath were set, and stirring was performed and nitrogen was flowed. At 70° C., 6.0 μL of Pt-VTSC×3.0 (commercially available from Umicore Japan) was added, and the mixture was stirred at a reflux temperature for 5 hours. After cooling to room temperature, 8.0 g of activated carbon was added, and the mixture was stirred overnight. The activated carbon was filtered off and the filtrate was concentrated at 50° C. PGMEA was added to the concentrate, ethyl acetate was removed by concentration under a reduced pressure to obtain 15.5 g of a solution (C) having a solid content concentration of 60%.

The molecular weight of (C) was measured through GPC. The weight average molecular weight Mw was 163,000, and the polydispersity Mw/Mn was 4.8. Average values of (x, y, z) were calculated through $^1$H-NMR and $^{29}$Si-NMR measurement, and x was 2.1 on average, y was 0.79 on average, and z was 1.21 on average.

($^1$H-NMR Measurement Results)

$^1$H-NMR (400 MHz, $CO(CD_3)_2$) δ: 7.23 to 7.69 (Ph), 4.67 to 4.86 (Si—H), 2.36 ($CF_3C\underline{H_2}$), 1.52 to 1.62 ($CH_2$), 1.04 ($CF_3CH_2C\underline{H_2}$), 0.64 to 0.89 ($CH_2$), 0.29 to 0.43 ($O_3SiMe$), 0.00 to 0.17 ($O_2SiMe_2$).

($^{29}$Si-NMR Measurement Results)

$^{29}$Si-NMR (99 MHz, $CO(CD_3)_2$) δ: 9.9, −21.9 to −18.3, −36.3 to −34.7, −65.0 to −64.0, −66.1 to −66.3, −67.9 to −67.2, −70.1, −79.4 to −78.9

Example 4
(β-5) was used as the compound (β)
(β-5)
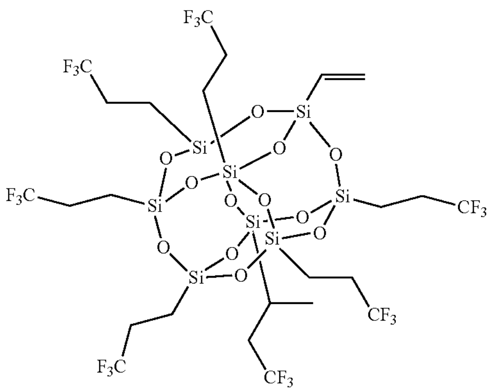
A siloxane polymer of the following formula was obtained by the same production method as in Example 1.

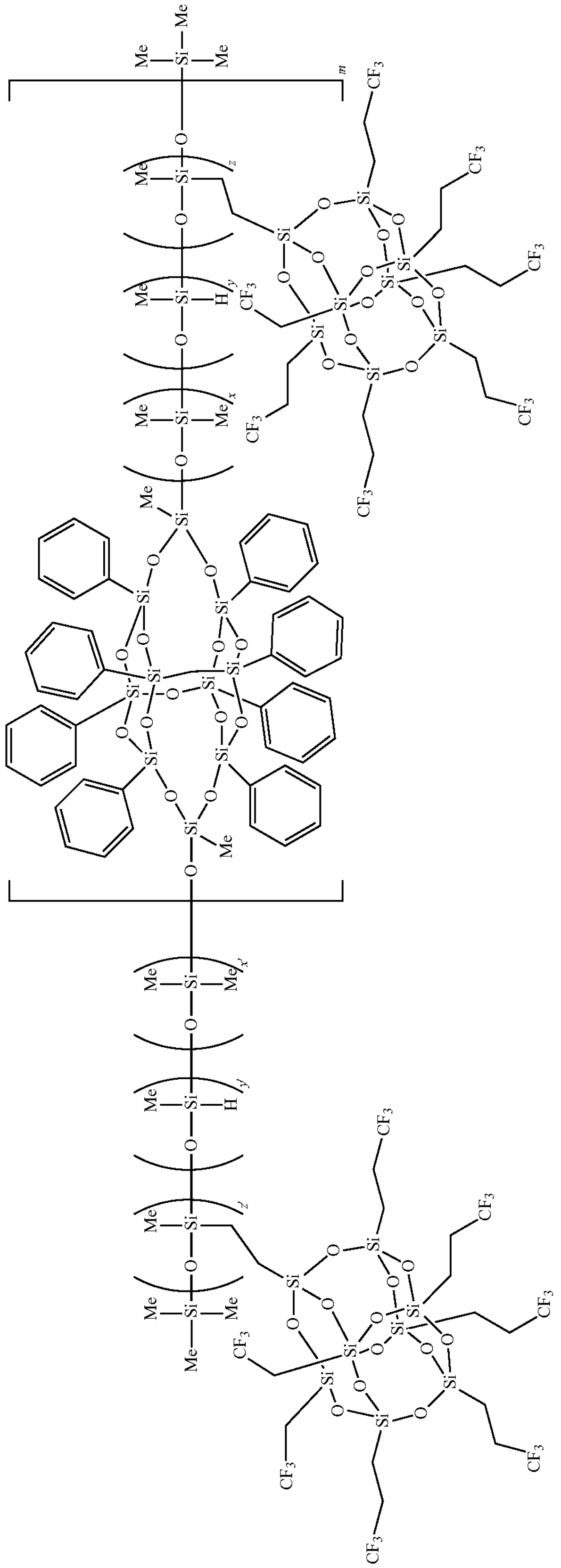

Siloxane polymers were produced according to the following reaction formulae (Examples 4 to 9), and physical properties were evaluated. A solution of the obtained siloxane polymer with the composition shown in Tables 3 and 4 was prepared, applied onto a base coated with a fluororesin, and heated at a temperature of 180° C. or higher for 3 hours or longer, and the cooled film was then peeled off from the base to obtain a self-supporting film

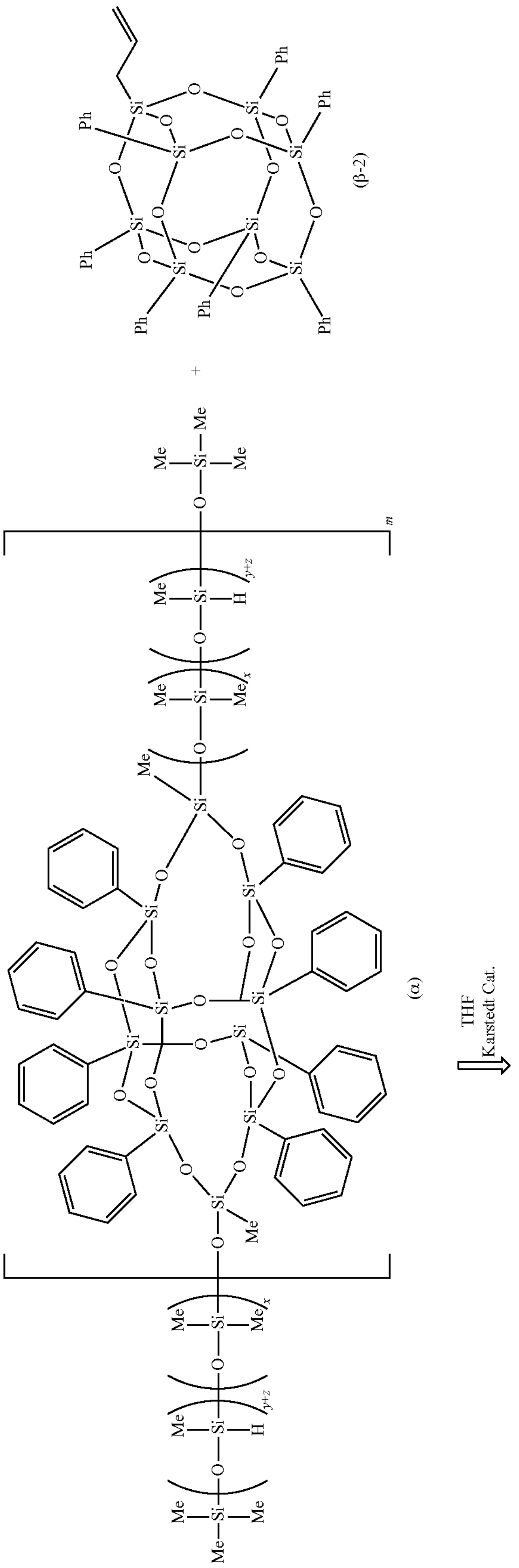
(α)
(β-2)

-continued
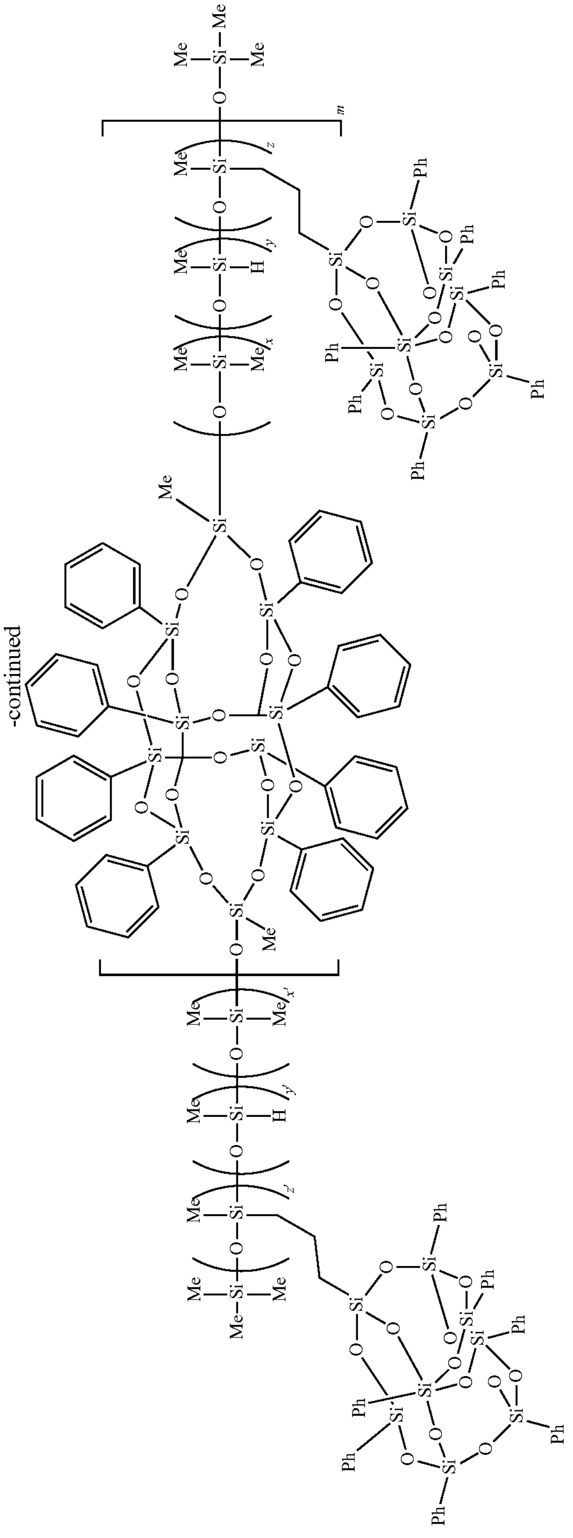

Table 2 shows the relationship of x, y and z in the intermediate (α), the compound (β-2) and the product in Examples 4 to 9.

TABLE 2

| Example | (α) | (β-1) | Product |
|---|---|---|---|
| 4 | x = 3.6 on average, y + z = 0.8 on average | 0.4 times mol of y of intermediate (α) | (x = 3.6, y: 0.48, z: 0.32) z: 6.0% of all units |
| 5 | x = 3.3 on average, y + z = 1.1 on average | 0.4 times mol of y of intermediate (α) | (x = 3.3, y: 0.68, z: 0.42) z: 7.7% of all units |
| 6 | x = 2.8 on average, y + z = 1.6 on average | 0.3 times mol of y of intermediate (α) | (x = 2.8, y: 1.12, z: 0.48) z: 8.9% of all units |
| 7 | Same as above | 0.2 times mol of y of intermediate (α) | (x = 2.8, y: 1.33, z: 0.27) z: 5.1% of all units |
| 8 | Same as above | 0.4 times mol of y of intermediate (α) | (x = 2.8, y: 0.91, z: 0.69) z: 12.7% of all units |
| 9 | x = 3.8 on average, y + z = 1.2 on average | 0.4 times mol of y of intermediate (α) | (x = 3.8, y: 0.78, z: 0.42) z: 7.0% of all units |

Example 4

5 g of the compound (α), 1.3 g of the compound (β-2), and 14.7 g of THF were put into a 50 mL 4-necked round-bottom flask, a thermometer, a reflux tube, a stirrer, and an oil bath were set, and stirring was performed and nitrogen was flowed. At 60° C., 2.1 μL of Pt-VTSC×3.0 (commercially available from Umicore Japan) was added, and the mixture was stirred at a reflux temperature for 3 hours. In addition, 2.1 μL of Pt-VTSC×3.0 was added, and stirring was continued at a reflux temperature for 3 hours. After cooling to room temperature, 1.8 g of activated carbon was added, and the mixture was stirred overnight. The activated carbon was filtered off and the filtrate was concentrated at 50° C. This concentrate was added dropwise to 200 mL of heptane to obtain 4.2 g of a white polymer precipitate.

The molecular weight of the polymer was measured through GPC, and as a result, the weight average molecular weight Mw was 115,000, and the polydispersity Mw/Mn was 2.1. Average values of (x, y, z) were calculated through $^1$H-NMR, and x was 3.6 on average, y was 0.48 on average, and z was 0.32 on average.

($^1$H-NMR Measurement Results)

$^1$H-NMR (400 MHz, $CO(CD_3)_2$) δ: 7.17 to 7.66 (Ph), 4.65 to 4.74 (Si—H), 1.51 to 1.60 ($CH_2$), 0.65 to 0.87 ($CH_2$), 0.27 to 0.41 ($O_3SiMe$), −0.04 to 0.13 ($O_2SiMe_2$).

Example 5

5.25 g of the compound (α), 1.33 g of the compound (β-2), and 15.8 g of THF were put into a 50 mL 4-necked round-bottom flask, a thermometer, a reflux tube, a stirrer, and an oil bath were set, and stirring was performed and nitrogen was flowed. At 60° C., 3.0 μL of Pt-VTSC×3.0 (commercially available from Umicore Japan) was added, and the mixture was stirred at a reflux temperature for 3 hours. In addition, 3.0 μL of Pt-VTSC×3.0 was added, and stirring was continued at a reflux temperature for 4 hours. After cooling to room temperature, 2.5 g of activated carbon was added, and the mixture was stirred overnight. The activated carbon was filtered off and the filtrate was concentrated at 50° C. This concentrate was added dropwise to 200 mL of heptane to obtain 4.7 g of a white polymer precipitate.

The molecular weight of the polymer was measured through GPC, and as a result, the weight average molecular weight Mw was 88,000, and the polydispersity Mw/Mn was 2.4. Average values of (x, y, z) were calculated through $^1$H-NMR, and x was 3.3 on average, y was 0.68 on average, and z was 0.42 on average.

($^1$H-NMR Measurement Results)

$^1$H-NMR (400 MHz, $CO(CD_3)_2$) δ: 7.17 to 7.66 (Ph), 4.65 to 4.74 (Si—H), 1.51 to 1.60 ($CH_2$), 0.65 to 0.87 ($CH_2$), 0.27 to 0.41 ($O_3SiMe$), −0.04 to 0.13 ($O_2SiMe_2$).

Example 6

30 g of the compound (α), 7.6 g of the compound (β-2), and 87.8 g of THF were put into a 200 mL 4-necked round-bottom flask, a thermometer, a reflux tube, a stirrer, and an oil bath were set, and stirring was performed and nitrogen was flowed. At 60° C., 14 μL of Pt-VTSC×3.0 (commercially available from Umicore Japan) was added, and the mixture was stirred at a reflux temperature for 3.5 hours. In addition, 14 μL of Pt-VTSC×3.0 was added and stirring was continued at a reflux temperature for 3 hours. After cooling to room temperature, 7.5 g of activated carbon was added, and the mixture was stirred overnight. The activated carbon was filtered off and the filtrate was concentrated at 50° C. This concentrate was added dropwise to 1.5 L of heptane to obtain 33.7 g of a white polymer precipitate.

The molecular weight of the polymer was measured through GPC, and as a result, the weight average molecular weight Mw was 100,000, and the polydispersity Mw/Mn was 2.9. Average values of (x, y, z) were calculated through $^1$H-NMR, and x was 2.8 on average, y was 1.12 on average, and z was 0.48 on average.

($^1$H-NMR Measurement Results)

$^1$H-NMR (400 MHz, $CO(CD_3)_2$) δ: 7.17 to 7.66 (Ph), 4.65 to 4.74 (Si—H), 1.51 to 1.60 ($CH_2$), 0.65 to 0.87 ($CH_2$), 0.27 to 0.41 ($O_3SiMe$), −0.04 to 0.13 ($O_2SiMe_2$).

Example 7

6 g of the compound (α), 0.9 g of the compound (β-2), and 16.1 g of THF were put into a 50 mL 4-necked round-bottom flask, a thermometer, a reflux tube, a stirrer, and an oil bath were set, and stirring was performed and nitrogen was flowed. At 60° C., 2.5 μL of Pt-VTSC×3.0 (commercially available from Umicore Japan) was added, and the mixture was stirred at a reflux temperature for 1.5 hours. After cooling to room temperature, 2.5 g of activated carbon was added, and the mixture was stirred overnight. The activated carbon was filtered off and the filtrate was concentrated at 50° C. This concentrate was added dropwise to 300 mL of heptane to obtain 6.1 g of a white polymer precipitate.

The molecular weight of the polymer was measured through GPC, and as a result, the weight average molecular weight Mw was 112,000, and the polydispersity Mw/Mn was 2.6. Average values of (x, y, z) were calculated through $^1$H-NMR, and x was 2.8 on average, y was 1.33 on average, and z was 0.27 on average.

($^1$H-NMR Measurement Results)

$^1$H-NMR (400 MHz, $CO(CD_3)_2$) δ: 7.17 to 7.66 (Ph), 4.65 to 4.74 (Si—H), 1.51 to 1.60 ($CH_2$), 0.65 to 0.87 ($CH_2$), 0.27 to 0.41 ($O_3SiMe$), −0.04 to 0.13 ($O_2SiMe_2$).

Example 8

6 g of the compound (α), 2.0 g of the compound (β-2), and 19.5 g of THF were put into a 50 mL 4-necked round-bottom flask, a thermometer, a reflux tube, a stirrer, and an oil bath were set, and stirring was performed and nitrogen was flowed. At 60° C., 3.3 μL of Pt-VTSC×3.0 (commercially available from Umicore Japan) was added, and the mixture was stirred at a reflux temperature for 3 hours. In addition, 3.3 μL of Pt-VTSC×3.0 was added, and stirring was continued at a reflux temperature for 2 hours. After cooling to room temperature, 2.5 g of activated carbon was added, and the mixture was stirred overnight. The activated carbon was filtered off and the filtrate was concentrated at 50° C. This concentrate was added dropwise to 300 mL of heptane to obtain 7.4 g of a white polymer precipitate.

The molecular weight of the polymer was measured through GPC, and as a result, the weight average molecular weight Mw was 92,000, and the polydispersity Mw/Mn was 2.9. Average values of (x, y, z) were calculated through $^1$H-NMR, and x was 2.8 on average, y was 0.91 on average, and z was 0.69 on average.

($^1$H-NMR Measurement Results)

$^1$H-NMR (400 MHz, $CO(CD_3)_2$) δ: 7.17 to 7.66 (Ph), 4.65 to 4.74 (Si—H), 1.51 to 1.60 ($CH_2$), 0.65 to 0.87 ($CH_2$), 0.27 to 0.41 ($O_3SiMe$), −0.04 to 0.13 ($O_2SiMe_2$).

Example 9

6 g of the compound (α), 1.4 g of the compound (β-2), and 17.9 g of THF were put into a 50 mL 4-necked round-bottom flask, a thermometer, a reflux tube, a stirrer, and an oil bath were set, and stirring was performed and nitrogen was flowed. At 60° C., 2.7 μL of Pt-VTSC×3.0 (commercially available from Umicore Japan) was added, and the mixture was stirred at a reflux temperature for 7 hours. After cooling to room temperature, 2.5 g of activated carbon was added, and the mixture was stirred overnight. The activated carbon was filtered off and the filtrate was concentrated at 50° C. This concentrate was added dropwise to 200 mL of heptane to obtain 5.4 g of a white polymer precipitate.

The molecular weight of the polymer was measured through GPC, and as a result, the weight average molecular weight Mw was 116,000, and the polydispersity Mw/Mn was 2.8. Average values of (x, y, z) were calculated through $^1$H-NMR, and x was 3.8 on average, y was 0.78 on average, and z was 0.42 on average.

($^1$H-NMR Measurement Results)

$^1$H-NMR (400 MHz, $CO(CD_3)_2$) δ: 7.17 to 7.66 (Ph), 4.65 to 4.74 (Si—H), 1.51 to 1.60 ($CH_2$), 0.65 to 0.87 ($CH_2$), 0.27 to 0.41 ($O_3SiMe$), −0.04 to 0.13 ($O_2SiMe_2$).

Comparative Example 1

A polymer solution composed of Formulae (1), (2), and (3) (excluding Formula (4)) described in the above [1] and [2] was applied onto a base coated with a fluororesin, and heated at a temperature of 180° C. or higher for 3 hours or longer and the cooled film was then peeled off from the base to obtain a self-supporting film.

Comparative Example 2

MKC™ Silicate MS51 (product name, commercially available from Mitsubishi Chemical Corporation), dibutyltin dilaurate (DBTL) was added to a polymer solution, the solution was applied onto an AFLEX (product name, commercially available from AGC) base, and the sample was fired at 70° C. for 10 minutes, at 90° C. for 1 hour, at 110° C. for 40 minutes, and at 220° C. for 2 hours, and the cooled film was then peeled off from the base to obtain a self-supporting film.

Comparative Example 3

A polymer solution composed of Formulae (1), (2), and (3) (excluding Formula (4)) described in the above [1] and [2] was mixed with the compound (β-5) and stirred, and then applied onto a base coated with a fluororesin, and the sample was fired at 70° C. for 10 minutes, at 90° C. for 1 hour, at 110° C. for 40 minutes, and at 220° C. for 2 hours, but it became cloudy, self-retaining properties were poor, and a transparent film was not obtained.

Tables 3 and 4 summarize the results of the above Examples 1 to 9 and Comparative Examples 1 to 3.

TABLE 3

| Item | | Unit | Example 1 | 2 | 3 | 4 | 5 | 6 |
|---|---|---|---|---|---|---|---|---|
| Siloxane polymer | | | | | | | | |
| $M_W$ | | g/mol | 47,000 | 128,000 | 163,000 | 115,000 | 88,000 | 100,000 |
| $M_W/M_N$ | | — | 4 | 4 | 4.8 | 2.1 | 2.4 | 2.9 |
| x | | unit | 3.2 | 3.2 | 2.1 | 3.2 | 3.2 | 2.8 |
| y | | unit | 0.4 | 0.2 | 0.8 | 0.5 | 0.7 | 1.0 |
| z | | unit | 0.4 | 0.6 | 1.2 | 0.3 | 0.4 | 0.6 |
| Content of compound (β-1) | | % | 8 | 11 | 24 | — | — | — |
| Content of compound (β-2) | | % | — | — | — | 6 | 8 | 9— |
| Siloxane polymer composition | | | | | | | | |
| Siloxane polymer | | g | 0.6 | 0.6 | 0.6 | 0.5 | 0.5 | 0.5 |
| Compound (β-1) | | g | — | — | — | — | — | — |
| Crosslinking agent | MS51 | μl | — | — | — | — | — | — |

TABLE 3-continued

| Item | | Unit | Example 1 | 2 | 3 | 4 | 5 | 6 |
|---|---|---|---|---|---|---|---|---|
| Catalyst | DBTL | ppm | — | — | — | — | — | — |
| Solvent | PGMEA | g | 0.4 | 0.4 | 0.4 | 0.5 | 0.5 | 0.5 |
| Optical properties | | | | | | | | |
| Total light transmittance | | % | 93.2 | 92.5 | 93.7 | 92.3 | 92.8 | 92.5 |
| Haze | | % | 0.4 | 0.9 | 0.7 | 0.5 | 0.4 | 0.3 |
| DMA | | | | | | | | |
| Glass transition temperature | | ° C. | 69.6 | 69.5 | 83.7 | 111.6 | 97.7 | 103.9 |
| Crosslink density_200° C. | | mmol/cc | 0.09 | 0.11 | 0.21 | 0.12 | 2.77 | 11.7 |
| Crosslink density_250° C. | | mmol/cc | 0.08 | 0.08 | 0.13 | 0.09 | 0.77 | 5.6 |
| TMA | | | | | | | | |
| CTE | 40-250° C. | ppm/K | 142 | 194 | 181 | 161 | 155 | 171 |
| | 40-100° C. | | — | — | — | — | — | — |
| TG-DTA | | | | | | | | |
| $T_{d5}$ | | ° C. | 417 | 381 | 372 | 432 | 425 | 421 |
| Mechanical properties | | | | | | | | |
| Elastic modulus | | GPa | 0.69 | 0.86 | 0.80 | 0.91 | 0.98 | 1.12 |
| Maximum stress | | MPa | 16 | 16 | 23 | 25 | 28 | 33 |

TABLE 4

| Item | | Unit | Example 7 | Example 8 | Example 9 | Comparative Example 1 | Comparative Example 2 | Comparative Example 3 |
|---|---|---|---|---|---|---|---|---|
| Siloxane polymer | | | | | | | | |
| $M_W$ | | g/mol | 112,000 | 92,000 | 116,000 | 29,000 | 39,000 | 26,000 |
| $M_W/M_N$ | | — | 2.6 | 2.9 | 2.8 | 1.9 | 1.9 | 1.7 |
| x | | unit | 2.8 | 2.8 | 3.8 | 3.2 | 4.3 | 2.5 |
| y | | unit | 1.3 | 0.9 | 0.8 | 0.8 | 0 | 0.6 |
| z | | unit | 0.3 | 0.7 | 0.4 | — | — | — |
| Content of compound (β-1) | | % | — | — | — | — | — | 7 |
| Content of compound (β-2) | | % | 5 | 13 | 7 | — | — | — |
| Siloxane polymer composition | | | | | | | | |
| Siloxane polymer | | g | 0.5 | 0.5 | 0.5 | 0.6 | 2.6 | 0.6 |
| Compound (β-1) | | g | — | — | — | — | — | 0.15 |
| Crosslinking agent | MS51 | μl | — | — | — | — | 270 | — |
| Catalyst | DBTL | ppm | — | — | — | — | 2500 | — |
| Solvent | PGMEA | g | 0.5 | 0.5 | 0.5 | 0.4 | 1.8 | 0.4 |
| Optical properties | | | | | | | | |
| Total light transmittance | | % | 92.5 | 92.4 | 92.5 | 91.4 | 91 | Not measurable |
| Haze | | % | 0.8 | 0.4 | 0.3 | 2.5 | 11.8 | Not measurable |
| DMA | | | | | | | | |
| Glass transition temperature | | ° C. | 104.8 | 115.7 | 91.7 | 49.7 | 61.4 | Not measurable |
| Crosslink density_200° C. | | mmol/cc | 8.8 | 5.2 | 0.6 | 0.07 | 0.10 | Not measurable |
| Crosslink density_250° C. | | mmol/cc | 4.5 | 1.1 | 0.4 | 0.07 | 0.09 | Not measurable |
| TMA | | | | | | | | |
| CTE | 40-250° C. | ppm/K | 164 | 155 | 139 | — | 238 | Not measurable |
| | 40-100° C. | | — | — | — | 4018 | — | Not measurable |
| TG-DTA | | | | | | | | |
| $T_{d5}$ | | ° C. | 420 | 421 | 436 | 484 | 479 | — |
| Mechanical properties | | | | | | | | |
| Elastic modulus | | GPa | 1.17 | 1.21 | 1.07 | 0.31 | 0.68 | — |
| Maximum stress | | MPa | 32 | 32 | 28 | 8 | 16 | — |

The volume resistivity (Ω·cm) of Example 6 and Comparative Examples 1 and 2 was measured. The results are shown in Table 5.

TABLE 5

| Item | | Unit | Example 6 | Comparative Example 1 | Comparative Example 2 |
|---|---|---|---|---|---|
| **Siloxane polymer** | | | | | |
| $M_W$ | | g/mol | 100,000 | 29,000 | 39,000 |
| $M_W/M_N$ | | — | 2.9 | 1.9 | 1.9 |
| x | | unit | 2.8 | 3.2 | 4.3 |
| y | | unit | 1.0 | 0.8 | 0 |
| z | | unit | 0.6 | | |
| Content of compound (β-1) | | % | — | — | — |
| Content of compound (β-2) | | % | 9 | — | — |
| **Siloxane polymer composition** | | | | | |
| Siloxane polymer | | g | 0.5 | 0.6 | 2.6 |
| Compound (β-1) | | g | — | — | — |
| Crosslinking agent | MS51 | μl | — | — | 270 |
| Catalyst | DBTL | ppm | — | — | 2500 |
| Solvent | PGMEA | g | 0.5 | 0.4 | 1.8 |
| **Electrical properties** | | | | | |
| Volume resistivity_DC205V | | Ω · cm | 2.3 × $10^{16}$ | 1.8 × $10^{16}$ | 1.0 × $10^{16}$ |

Example 10

(β-3) was used as the compound (β).

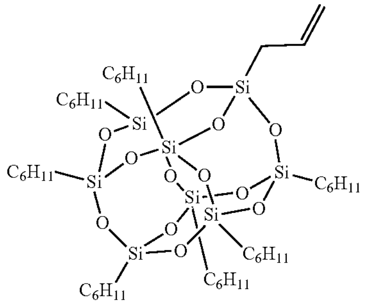

(β-3)

A siloxane polymer of the following formula was obtained by the same production method as in Example 1.

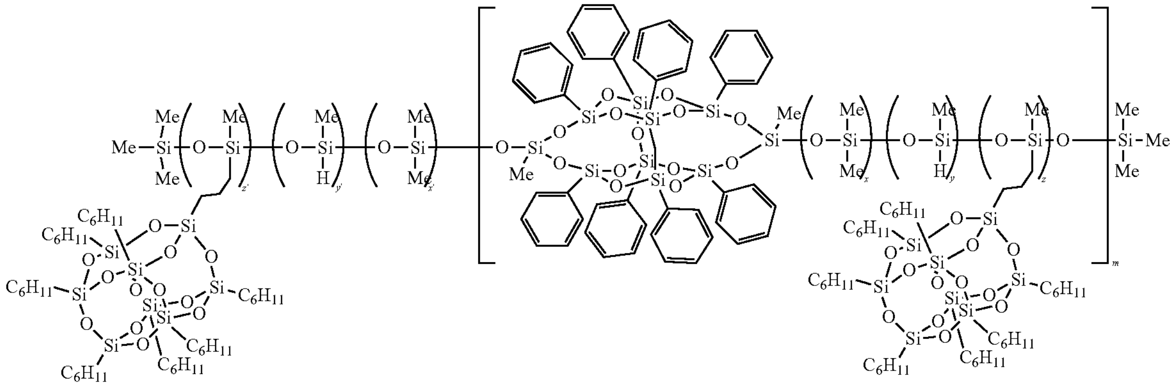

The following examples were examples related to the siloxane polymer (α'). Siloxane polymers were produced according to the following reaction formulae (Examples 1' to 7').

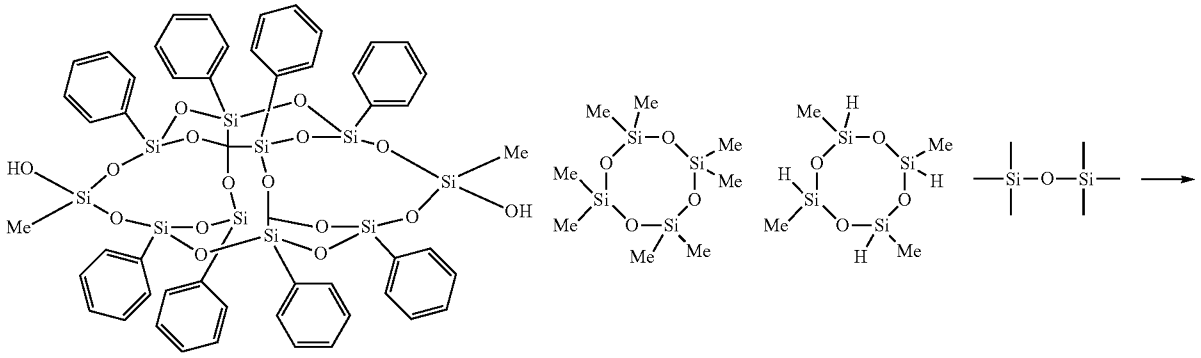

-continued

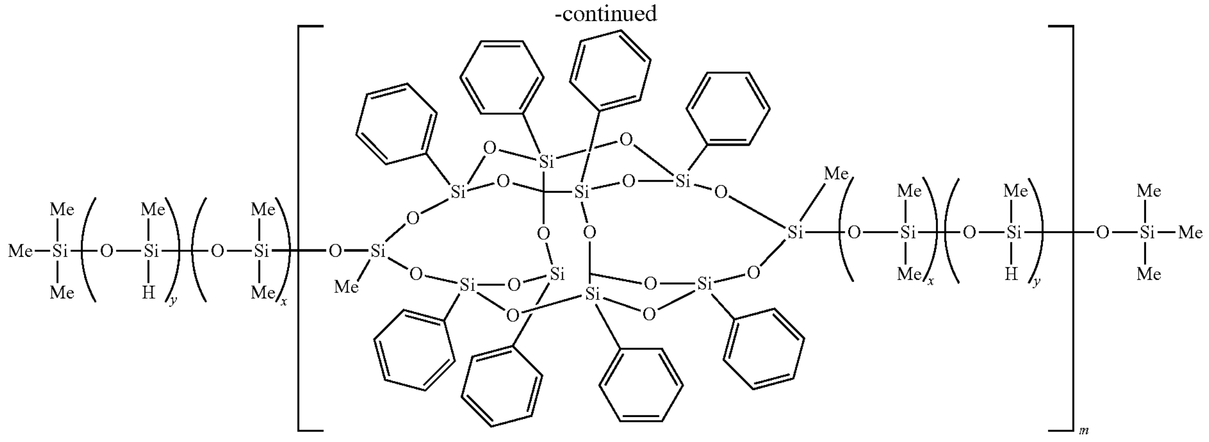

Compound (α')

Table 6 shows synthesis conditions in Examples 1' to 7' and Table 7 shows the weight average molecular weight and polydispersity of the produced compound (α'), and the relationship of x and y.

TABLE 6

| | | Compound <A> | Compound <B> | Compound <C> | Terminal blocking agent | | Catalyst | | | Reaction conditions |
|---|---|---|---|---|---|---|---|---|---|---|
| Example | Compound | XQ1115 [g] | D4 [g] | D'4 [g] | Type | Amount [g] | Type | Amount [g] | Monomer concentration | temperature [° C.]/time [h] |
| 1' | α'-1 | 100.0 | 0.0 | 30.4 | MM | 1.20 | MSA | 6.08 | 50% | 75/2 |
| 2' | α'-2 | 50.0 | 15.0 | 3.0 | MM | 0.47 | MSA | 10.13 | 50% | 80/3 |
| 3' | α'-3 | 50.0 | 9.4 | 7.6 | MM | 0.47 | MSA | 10.13 | 50% | 80/2 |
| 4' | α'-4 | 30.0 | 10.8 | 2.2 | MM | 0.03 | MSA | 2.04 | 50% | 80/10 |
| 5' | α'-5 | 45.0 | 14.8 | 4.0 | MM | 0.20 | MSA | 2.21 | 60% | 80/8 |
| 6' | α'-6 | 150. | 59.1 | 16.0 | MM | 0.01 | sulfuric acid | 5.77 | 50% | 80/3->60/2 |
| 7' | α'-7 | 45.0 | 15.2 | 4.1 | MM | 0.05 | sulfuric acid | 2.09 | 50% | 75/9 |

TABLE 7

| Example | Compound | MW | PDI | Obtained amount [g] | Product |
|---|---|---|---|---|---|
| 1' | α'-1 | 24,700 | 2.0 | 88 | x = 0, y = 3.7 on average |
| 2' | α'-2 | 31,800 | 1.7 | 27.5 | x = 3.2 on average, y = 0.8 on average, |
| 3' | α'-3 | 28,100 | 1.7 | 29 | x = 2.1 on average, y = 2.0 on average, |
| 4' | α'-4 | 74,000 | 2.0 | 19 | x = 3.6 on average, y = 0.8 on average, |
| 5' | α'-5 | 59,400 | 2.0 | 41 | x = 3.2 on average, y = 1.1 on average, |
| 6' | α'-6 | 68,000 | 2.1 | 121 | x = 2.8 on average, y = 1.6 on average, |
| 7' | α'-7 | 91,000 | 2.4 | 36 | x = 3.8 on average, y = 1.2 on average, |

Example 1'

100 g of the compound <A>, 0 g of the compound <B>, 30.4 g of the compound <C>, and 1.20 g of hexamethyldisiloxane (MM) as a terminal blocking agent were put into a 300 mL 4-necked round-bottom flask, and diluted with a solvent in which toluene and 4-methyltetrahydroxypyran were mixed at a ratio of 4:1 so that the monomer concentration was 50 weight %. A thermometer, a reflux tube, and an oil bath were set, and nitrogen was flowed while stirring with a stirring blade. 6.08 g of methanesulfonic acid as an acid catalyst was added, and the mixture was reacted at 75° C. for 2 hours. After cooling to 50° C. or lower, an acid in the system was removed by washing with water. In addition, the acid was completely removed with an adsorbent Kyowaad 500SN (commercially available from Kyowa Chemical Corporation), and a solid was precipitated using heptane as a poor solvent. The precipitated solid was dried under a reduced pressure at 80° C. for 5 hours to obtain 88 g of a white compound (α'-1).

The molecular weight of (α'-1) was measured through GPC, and as a result, the weight average molecular weight Mw was 24,700, and the polydispersity Mw/Mn was 2.0. The average value of (x, y) was calculated through $^{1}$H-NMR and $^{29}$Si-NMR measurement, and x was 0 on average, and y was 3.7 on average.

Examples 2' to 7'

Compound (α'-2) to compound (α'-7) were obtained in the same manner as in Example 1' except that the reaction occurred under conditions shown in Table 6. The weight average molecular weight, the polydispersity, and x, y of the compounds were measured according to the methods as in Example 1, and the results are shown in Table 7.

Self-supporting films were prepared from the obtained siloxane polymers according to the following method, and physical properties were evaluated (Examples 8' to 10').

Example 8'

A solution of the siloxane polymer was prepared with the composition shown in Table 8, applied onto a base coated with a fluororesin, and heated at a temperature of 180° C. or higher for 3 hours or longer, and the cooled film was then peeled off from the base to obtain a self-supporting film.

Examples 9' and 10'

Self-supporting films were obtained in the same manner as in Example 8' except for the composition shown in Table 8.

Comparative Examples 1' and 2'

MKC™ Silicate MS51 (product name, commercially available from Mitsubishi Chemical Corporation), dibutyltin dilaurate (DBTL) was added to a siloxane polymer with the composition shown in Table 8, and applied onto an AFLEX (commercially available from AGC, product name) base, and the sample was fired at 70° C. for 10 minutes, at 90° C. for 1 hour, at 110° C. for 40 minutes, and at 220° C. for 2 hours, and the cooled film was then peeled off from the base to obtain a self-supporting film. "Comparative Example 1" is the same as "Comparative Example 2" described above, but is shown again for comparison with Examples 8' to 10'.

Table 8 summarizes the results of the above Examples 8' to 10', and Comparative Examples 1' and 2'.

TABLE 8

| Item | | Unit | Example 8' | Example 9' | Example 10' | Comparative Example 1' | Comparative Example 2' |
|---|---|---|---|---|---|---|---|
| Siloxane polymer | | | | | | | |
| $M_W$ | | g/mol | 59,400 | 68,000 | 91,000 | 39,000 | 117,000 |
| $M_W/M_n$ | | — | 2.0 | 2.1 | 2.4 | 1.9 | 2.5 |
| x | | unit | 3.2 | 2.8 | 3.8 | 4.3 | 4 |
| y | | unit | 1.1 | 1.6 | 1.2 | 0 | 0 |
| z | | unit | — | — | — | — | — |
| Content of compound (β-1) | | % | — | — | — | — | — |
| Content of compound (β-2) | | % | — | — | — | — | — |
| Siloxane polymer composition | | | | | | | |
| Siloxane polymer | | g | 0.5 | 0.5 | 0.5 | 2.6 | 0.8 |
| Compound (β-1) | | g | — | — | — | — | — |
| Crosslinking agent | MS51 | μl | — | — | — | 270 | 22 |
| Catalyst | Pt-VTSCx3.0 | ppm | 1 | 1 | 1 | — | — |
| | DBTL | ppm | — | — | — | 2500 | 2500 |
| Solvent | PGMEA | g | 0.5 | 0.5 | 0.5 | 1.8 | 0.6 |
| Optical properties | | | | | | | |
| Total light transmittance | | % | 92.9 | 92.9 | 93.2 | 91.0 | 91.8 |
| Haze | | % | 0.8 | 0.5 | 0.5 | 11.8 | 0.6 |
| DMA | | | | | | | |
| Glass transition temperature | | ° C. | 77.6 | 95.5 | 85.7 | 61.4 | 62.5 |
| Crosslink density_200° C. | | mmol/cc | 6.3 | 9.4 | 9.0 | 0.10 | 0.06 |
| Crosslink density_250° C. | | mmol/cc | 3.4 | 6.9 | 6.7 | 0.09 | 0.05 |
| TMA | | | | | | | |
| CTE | 40 to 250° C. | ppm/K | 162 | 156 | 147 | 238 | 250 |
| | 40 to 100° C. | | — | — | — | — | — |
| TG-DTA | | | | | | | |
| $T_{d5}$ | | ° C. | 415 | 419 | 415 | 479 | 476 |
| Mechanical properties | | | | | | | |
| Elastic modulus | | GPa | 0.90 | 0.99 | 0.90 | 0.68 | 0.8 |
| Maximum stress | | MPa | 21 | 25 | 24 | 16 | 19 |

The volume resistivity (Ω·cm) of Example 9' and Comparative Example 1' was measured. The results are shown in Table 9. ("Comparative Example 1'" is the same as "Comparative Example 2" described above, but it is shown again for volume resistivity comparison with Example 9')

TABLE 9

| Item | Unit | Example 9' | Comparative Example 1' |
|---|---|---|---|
| Siloxane polymer | | | |
| $M_W$ | g/mol | 68,000 | 39,000 |
| $M_W/M_N$ | — | 2.1 | 1.9 |
| x | unit | 2.8 | 4.3 |
| y | unit | 1.6 | 0 |
| z | unit | — | — |
| Content of compound (β-1) | % | — | — |
| Content of compound (β-2) | % | — | — |
| Siloxane polymer composition | | | |
| Siloxane polymer | g | 0.5 | 2.6 |
| Compound (β-1) | g | — | — |
| Crosslinking agent MS51 | μl | — | 270 |
| Catalyst DBTL | ppm | — | 2500 |
| Solvent PGMEA | g | 0.5 | 1.8 |
| Electrical properties | | | |
| Volume resistivity_DC205V | Ω · cm | $1.7 \times 10^{16}$ | $1.0 \times 10^{16}$ |

INDUSTRIAL APPLICABILITY

The film obtained by firing the siloxane polymer according to this invention is a material that has both heat resistance, transparency, and a coefficient of thermal expansion, and can be particularly suitably used as an electronic member. In addition, the siloxane polymer (α') of this invention is useful as an intermediate for producing the siloxane polymer, and additionally, the cured film of the siloxane polymer (α') itself also exhibits an excellent heat resistance property so that it can be particularly suitably used as an electronic member.

The invention claimed is:

1. A siloxane polymer, having repeating units represented by Formulae (1) and (4) and terminal groups represented by Formulae (5L) and (5R) at left and right terminals:

(1)

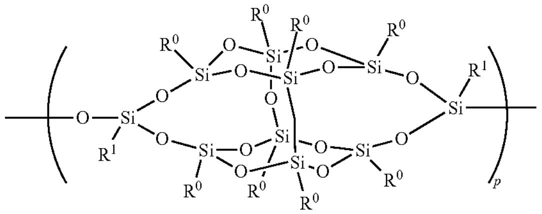

($4_H$)

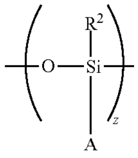

(5L)

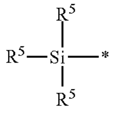

-continued (5R)

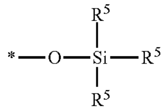

wherein Formula (5L) represents a terminal group bonded to a left side of the formula, and Formula (5R) represents a terminal group bonded to a right side of the formula, A represents the following structure,

A

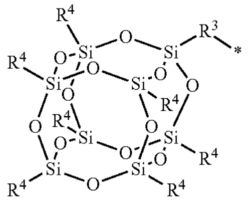

each $R^0$ independently represents an aryl group having 6 to 20 carbons or a cycloalkyl group having 5 to 6 carbons, and in the aryl group having 6 to 20 carbons and the cycloalkyl group having 5 to 6 carbons, arbitrary hydrogen atom may be independently substituted with a fluorine atom or an alkyl group having 1 to 20 carbons, each $R^1$ independently represents a hydrogen atom, an aryl group having 6 to 20 carbons, a cycloalkyl group having 5 to 6 carbons, an arylalkyl group having 7 to 40 carbons, or an alkyl group having 1 to 40 carbons, and in the aryl group in the aryl group having 6 to 20 carbons, the cycloalkyl group having 5 to 6 carbons and the arylalkyl group having 7 to 40 carbons, arbitrary hydrogen atom may be independently substituted with a fluorine atom or an alkyl group having 1 to 20 carbons, and in an alkylene group in the arylalkyl group having 7 to 40 carbons, arbitrary hydrogen atom may be substituted with a fluorine atom, and arbitrary $—CH_2—$ may be independently substituted with —O—, —CH═CH—, or a cycloalkylene group having 5 to 20 carbons, and in the alkyl group having 1 to 40 carbons, arbitrary hydrogen atom may be independently substituted with a fluorine atom, and arbitrary $—CH_2—$ may be independently substituted with —O— or a cycloalkylene group having 5 to 20 carbons, each $R^2$ independently represents a hydroxyl group, an aryl group having 6 to 20 carbons, a cycloalkyl group having 5 to 6 carbons, an arylalkyl group having 7 to 40 carbons, or an alkyl group having 1 to 40 carbons, and in the aryl group having 6 to 20 carbons, the cycloalkyl group having 5 to 6 carbons and an aryl group in the arylalkyl group having 7 to 40 carbons, arbitrary hydrogen atom may be independently substituted with a fluorine atom or an alkyl group having 1 to 20 carbons, and in an alkylene group in the arylalkyl group having 7 to 40 carbons, arbitrary hydrogen atom may be substituted with a fluorine atom, and arbitrary $—CH_2—$ may be independently substituted with —O—, —CH═CH—, or a cycloalkylene group having 5 to 20 carbons, and in the alkyl group having 1 to 40 carbons, arbitrary hydrogen atom may be independently substituted with a fluorine atom, and arbitrary —$CH_2$— may be independently substituted with —O— or a cycloalkylene group having 5 to 20 carbons, each $R^3$ independently represents an alkylene group having 1 to 40 carbons, and in the alkylene group having 1 to 40 carbons, arbitrary —$CH_2$— may be independently substituted with —O— or a cycloalkylene group having 5 to 20 carbons, each $R^4$ independently represents an aryl group having 6 to 20 carbons, a cycloalkyl group having 5 to 6 carbons, an arylalkyl group having 7 to 40 carbons, or an alkyl group having 1 to 40 carbons, and in the aryl group having 6 to 20 carbons, the cycloalkyl group having 5 to 6 carbons and an aryl group in the arylalkyl group having 7 to 40 carbons, arbitrary hydrogen atom may be independently substituted with a fluorine atom or an alkyl group having 1 to 20 carbons, and in an alkylene group in the arylalkyl group having 7 to 40 carbons, arbitrary hydrogen atom may be substituted with a fluorine atom, and arbitrary —$CH_2$— may be independently substituted with —O—, —CH=CH—, or a cycloalkylene group having 5 to 20 carbons, and in the alkyl group having 1 to 40 carbons, arbitrary hydrogen atom may be independently substituted with a fluorine atom, and arbitrary —$CH_2$— may be independently substituted with —O— or a cycloalkylene group having 5 to 20 carbons, each $R^5$ independently represents a crosslinkable functional group which is a hydroxyl group, hydrogen or an alkenyl group having 2 to 40 carbons, an alkyl group having 1 to 40 carbons, a halogen atom, an acyl group having 1 to 15 carbons, an alkoxyl group having 1 to 15 carbons, an oxime having 1 to 15 carbons, an amino group which may have a substituent, an amide having 1 to 15 carbons which may have a substituent, an aminoxy group which may have a substituent, or a vinyl alcohol residue having 2 to 15 carbons which may have a substituent, and in the amino and aminoxy groups which have a substituent, the substituent has 1 to 15 carbons, each p independently represents a real number of 1 or more, and z represents a positive real number, and

* indicates a binding position.

2. The siloxane polymer of claim 1, further comprising repeating unit(s) represented by Formula (2) and/or (3):

(2)

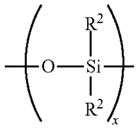

(3)

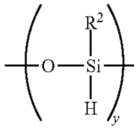

wherein $R^2$ represents the same as $R^2$ in Formula (4) in claim 1, and x and y each independently represent a positive real number.

3. The siloxane polymer of claim 1, comprising repeating unit(s) represented by Formula (2+4) and/or (4+2):

(2+4)

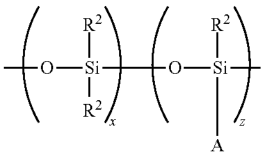

(4+2)

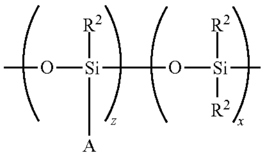

wherein $R^2$ represents the same as $R^2$ in Formula (4) in claim 1, and x and z each independently represent a positive real number.

4. The siloxane polymer of claim 1, comprising at least one selected from the group consisting of repeating units represented by Formula (4+2+3), (2+4+3), (2+3+4), (4+3+2), (3+4+2) and (3+2+4):

(4+2+3)

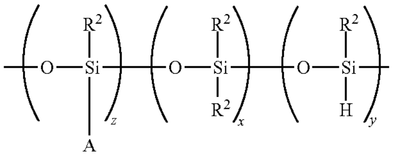

(2+4+3)

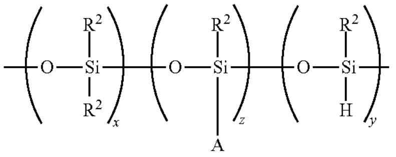

(2+3+4)

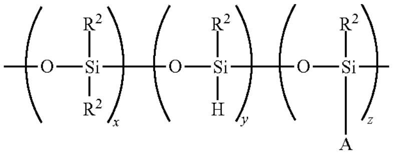

(4+3+2)

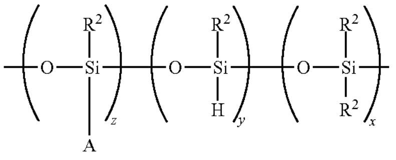

(3+4+2)

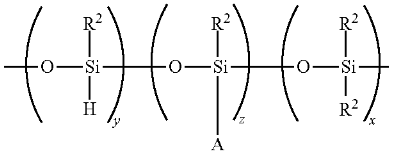

-continued (3+2+4)

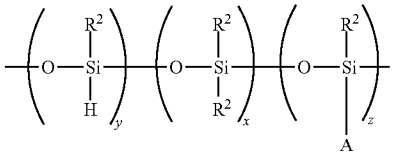

wherein $R^2$ represents the same as $R^2$ in Formula (4) in claim 1, and x, y and z each independently represent a positive real number.

5. The siloxane polymer of claim 1, wherein each $R^2$ independently represents methyl or phenyl, and each $R^4$ independently represents phenyl, isobutyl, cyclopentyl, cyclohexyl, trifluoropropyl, nonafluorohexyl or pentafluorophenyl.

6. The siloxane polymer of claim 1, which has a weight average molecular weight of 2,000 to 10,000,000.

7. A siloxane polymer composition, comprising: the siloxane polymer of claim 1, and a solvent.

8. A molded article, obtained by curing the siloxane polymer of claim 1.

9. The molded article of claim 8, which has a haze value of 1% or less, a thermal decomposition temperature in a range of 350 to 450° C., and a coefficient of linear expansion of 200 ppm or less.

10. The molded article of claim 8, which has electric insulation.

11. A molded article, comprising: a cured product obtained by curing the siloxane polymer of claim 1, and a base covered by the cured product.

12. The molded article of claim 11, which has a coefficient of linear expansion of 200 ppm or less, wherein a difference in haze value between the molded article and the base is 1% or less.

13. The molded article of claim 11, which has electric insulation.

14. A molded article, obtained by curing the siloxane polymer composition of claim 7.

15. The molded article of claim 14, which has a haze value of 1% or less, a thermal decomposition temperature in a range of 350 to 450° C., and a coefficient of linear expansion of 200 ppm or less.

16. The molded article of claim 14, which has electric insulation.

17. A molded article, comprising: a cured product obtained by curing the siloxane polymer composition of claim 7, and a base covered by the cured product.

18. The molded article of claim 17, which has a coefficient of linear expansion of 200 ppm or less, wherein a difference in haze value between the molded article and the base is 1% or less.

19. The molded article of claim 17, which has electric insulation.

* * * * *